MOTION CONTROLS FOR DATA INPUT-OUTPUT DEVICE

Filed Dec. 31, 1953 27 Sheets-Sheet 1

INVENTORS
JOHN E. BARTELT
MAX E. FEMMER
BY P. E. Henninger
ATTORNEY

INVENTORS
JOHN E. BARTELT
MAX E. FEMMER
BY P. E. Henninger
ATTORNEY

INVENTORS
JOHN E. BARTELT
MAX E. FEMMER
BY P. E. Henninger
ATTORNEY

Jan. 12, 1960 J. E. BARTELT ET AL 2,921,293

MOTION CONTROLS FOR DATA INPUT-OUTPUT DEVICE

Filed Dec. 31, 1953 27 Sheets-Sheet 4

INVENTORS
JOHN E. BARTELT
MAX E. FEMMER
BY P. E. Henninger
ATTORNEY

Jan. 12, 1960 J. E. BARTELT ET AL 2,921,293

MOTION CONTROLS FOR DATA INPUT-OUTPUT DEVICE

Filed Dec. 31, 1953 27 Sheets-Sheet 5

INVENTORS
JOHN E. BARTELT
MAX E. FEMMER
BY P. C. Henninger
ATTORNEY

INVENTORS
JOHN E. BARTELT
MAX E. FEMMER
BY P. E. Henninger
ATTORNEY

INVENTORS
JOHN E. BARTELT
MAX E. FEMMER
BY P. C. Henninger
ATTORNEY

Jan. 12, 1960 J. E. BARTELT ET AL 2,921,293

MOTION CONTROLS FOR DATA INPUT-OUTPUT DEVICE

Filed Dec. 31, 1953 27 Sheets-Sheet 8

INVENTORS
JOHN E. BARTELT
MAX E. FEMMER
BY P. E. Henninger
ATTORNEY

INVENTORS
JOHN E. BARTELT
MAX E. FEMMER
BY P. E. Henninger
ATTORNEY

*INVENTORS*
JOHN E. BARTELT
MAX E. FEMMER
BY *P. E. Henninger*
ATTORNEY

INVENTORS
JOHN E. BARTELT
MAX E. FEMMER
BY
P. E. Henninger
ATTORNEY

INVENTORS
JOHN E. BARTELT
MAX E. FEMMER
BY P. E. Henninger
ATTORNEY

INVENTORS
JOHN E. BARTELT
MAX E. FEMMER
BY
P. C. Hessinger
ATTORNEY

Jan. 12, 1960 J. E. BARTELT ET AL 2,921,293

MOTION CONTROLS FOR DATA INPUT-OUTPUT DEVICE

Filed Dec. 31, 1953 27 Sheets-Sheet 14

INVENTORS
JOHN E. BARTELT
MAX E. FEMMER

BY P. E. Henninger

ATTORNEY

INVENTORS
JOHN E. BARTELT
MAX E. FEMMER
BY P. E. Henninger
ATTORNEY

Jan. 12, 1960 J. E. BARTELT ET AL 2,921,293

MOTION CONTROLS FOR DATA INPUT-OUTPUT DEVICE

Filed Dec. 31, 1953 27 Sheets-Sheet 16

INVENTORS
JOHN E. BARTELT
MAX E. FEMMER

BY P. C. Henninger

ATTORNEY

*INVENTORS*
JOHN E. BARTELT
MAX E. FEMMER
*BY* P. E. Henninger
ATTORNEY

INVENTORS
JOHN E. BARTELT
MAX E. FEMMER
BY *P. C. Henninger*
ATTORNEY

*INVENTORS*
JOHN E. BARTELT
MAX E. FEMMER

*BY* P.E. Henninger

ATTORNEY

INVENTORS
JOHN E. BARTELT
MAX E. FEMMER

BY P. E. Henninger

ATTORNEY

*INVENTORS*
JOHN E. BARTELT
MAX E. FEMMER
*BY* P. E. Henninger
ATTORNEY

Jan. 12, 1960 J. E. BARTELT ET AL 2,921,293

MOTION CONTROLS FOR DATA INPUT-OUTPUT DEVICE

Filed Dec. 31, 1953 27 Sheets-Sheet 22

INVENTORS
JOHN E. BARTELT
MAX E. FEMMER

BY P. C. Henninger

ATTORNEY

*INVENTORS*
JOHN E. BARTELT
MAX E. FEMMER
*BY* P. E. Henninger
ATTORNEY

Jan. 12, 1960 J. E. BARTELT ET AL 2,921,293

MOTION CONTROLS FOR DATA INPUT-OUTPUT DEVICE

Filed Dec. 31, 1953 27 Sheets-Sheet 24

INVENTORS
JOHN E. BARTELT
MAX E. FEMMER
BY
R. E. Henninger
ATTORNEY

INVENTORS
JOHN E. BARTELT
MAX E. FEMMER
BY
P. E. Henninger
ATTORNEY

INVENTORS
JOHN E. BARTELT
MAX E. FEMMER
BY
P. E. Henninger
ATTORNEY

Jan. 12, 1960 J. E. BARTELT ET AL 2,921,293

MOTION CONTROLS FOR DATA INPUT-OUTPUT DEVICE

Filed Dec. 31, 1953 27 Sheets-Sheet 27

INVENTORS
JOHN E. BARTELT
MAX E. FEMMER
BY *P. C. Henninger*
ATTORNEY

United States Patent Office 2,921,293
Patented Jan. 12, 1960

2,921,293

MOTION CONTROLS FOR DATA INPUT-OUTPUT DEVICE

John E. Bartelt, Poughkeepsie, and Max E. Femmer, Hopewell Junction, N.Y., assignors to International Business Machines Corporation, New York, N.Y., a corporation of New York Application December 31, 1953, Serial No. 401,502

25 Claims. (Cl. 340—174)

This invention relates to an input-output device for an electronic data processing machine.

More particularly, the invention relates to the control of a magnetic tape input-output device capable of rendering data available for use in a computer and for recording computer data on a magnetic tape.

In its most specific aspect, this invention relates to the control of magnetic tape motion through tape reading and tape writing heads in response to computer signals.

The automatic control of magnetic tape motion through the read-write heads of an input-output device of the kind stated is complicated by the fact that the last previous status, or even the present status, of a tape unit may be incompatible with a particular operational command. It is, therefore, an important object of this invention to provide a memory of tape status and a system of controls which will reject operational demands on the input-output device whenever they are inconsistent with a particular tape status and/or change the status of the unit to render it compatible with instruction.

It is an object of this invention to provide a tape motion control system adapted to drive a magnetic tape through the tape read-write heads in a forward direction upon receipt of a signal calling upon the tape drive unit to prepare to read tape if all conditions for the performance of such operation are satisfactory; to reject the instruction if the status of the unit is entirely incompatible, or to condition the unit to accept the instruction if the status of the last operation was merely contrary to that required by the instruction.

It is a further object of this invention to provide a tape motion control system adapted to drive a magnetic tape through tape read-write heads in a backward direction upon receipt of a signal calling upon the tape drive unit to prepare to read tape backward if all conditions for the performance of such operation are satisfactory; to reject the instruction if the status of the unit is entirely incompatible or to condition the unit to accept the instruction if the status of the last operation was merely contrary to that required by the instruction.

It is a further object of the invention to provide a tape motion control system adapted to drive a magnetic tape through the tape-readwrite heads in a forward direction upon receipt of a signal calling upon the tape drive unit to prepare to write on tape if all conditions for the performance of such operation are satisfactory; to reject the instruction if the status of the unit is entirely incompatible, or to condition the unit to accept the instruction if the status of the last operation was merely contrary to that required by the instruction.

It is a still further object of this invention to provide a tape motion control system adapted to drive a magnetic tape through tape read-write heads in a forward direction upon receipt of a signal calling upon the tape drive unit to prepare to write an end of file signal upon the tape if all conditions for the performance of this operation are satisfactory; to reject the instruction if the status of the unit is entirely incompatible, or to condition the unit to accept the instruction if the status of the last operation was merely contrary to that required by the instruction.

It is a further object of this invention to provide a tape motion control system adapted to drive a magnetic tape through tape read-write heads in a backward direction for the purpose of rewinding the tape upon receipt of a signal calling upon the tape drive unit to prepare to rewind the tape if all conditions for the performance of the rewinding operation are satisfactory; to reject the instruction if the status of the unit is entirely incompatible, or to condition the unit to accept the instruction if the status of the last operation was merely contrary to that required by the instruction.

It is a further object of the invention to provide a tape motion control system having means therein for sensing the end of a tape being driven through the read-write heads of the unit and upon sensing of a tape end to emit a signal indicating that the tape is at one extreme or the other and to disable the tape drive mechanism upon generation of such signal.

Further objects and advantages of the invention will appear as the description thereof is read in light of the drawings in which.

Figure 1:
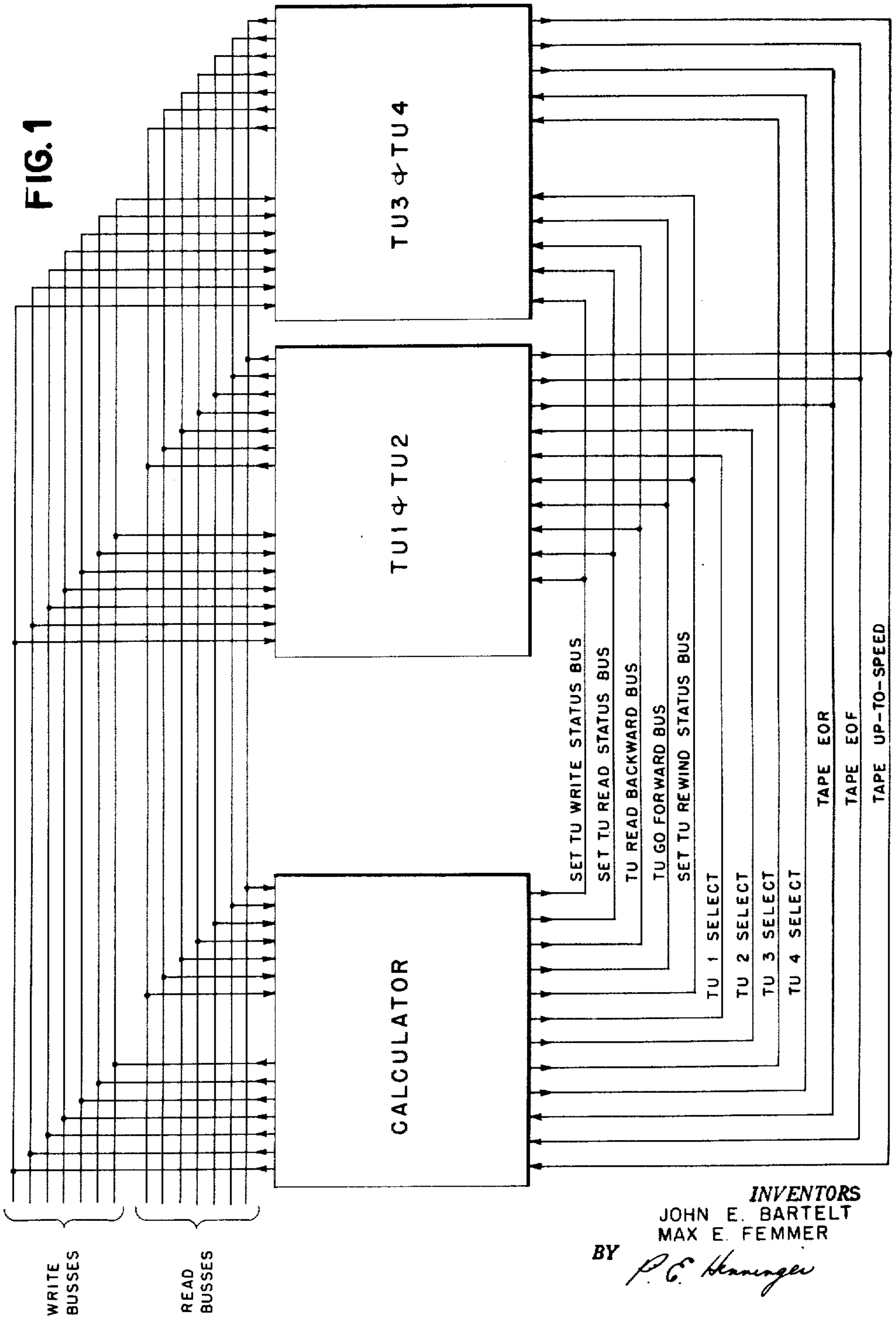
Fig. 1 is a block diagram representing a calculator and four magnetic tape input-output units and showing the flow of signals from the calculator to the tape input-output units and from the tape input-output units to the calculator.
Figure 2:
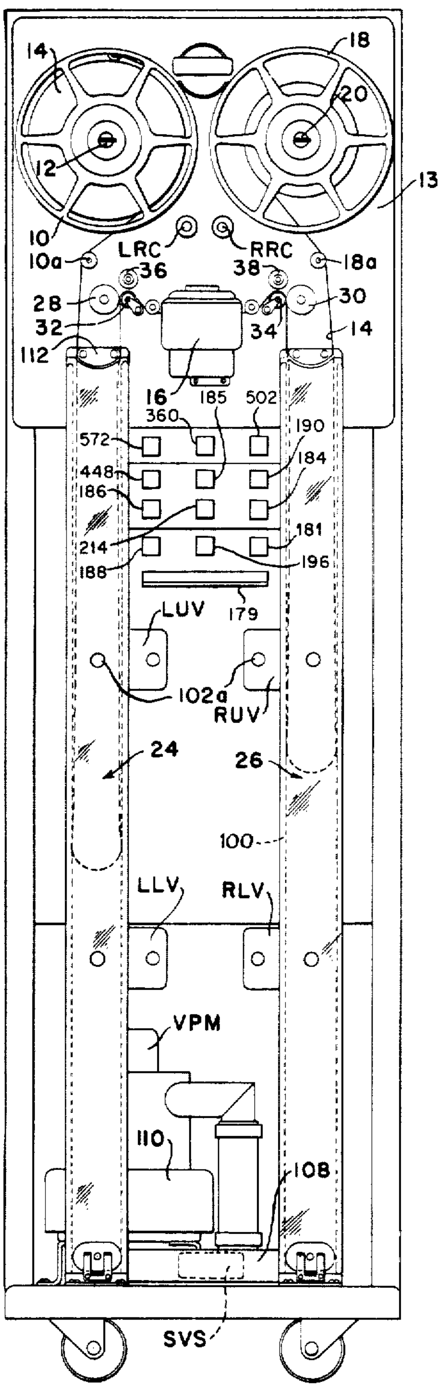
Fig. 2 is a front, elevational view of a single tape unit of which a plurality may be employed in the system.
Figure 2A:
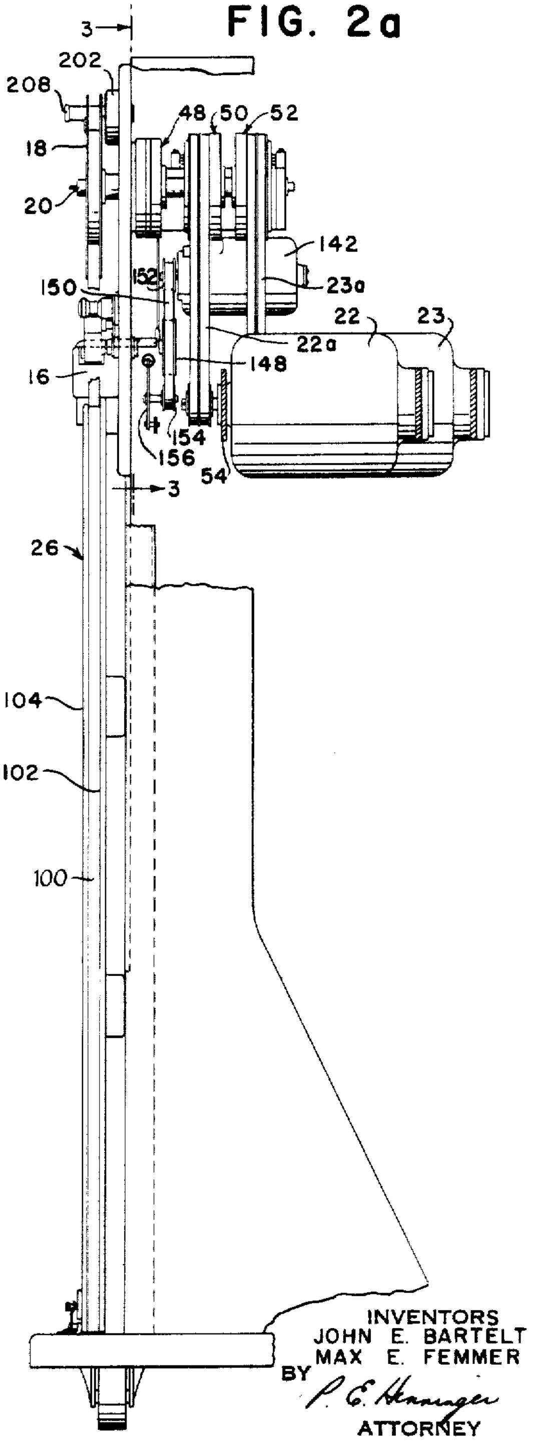
Figure 3:
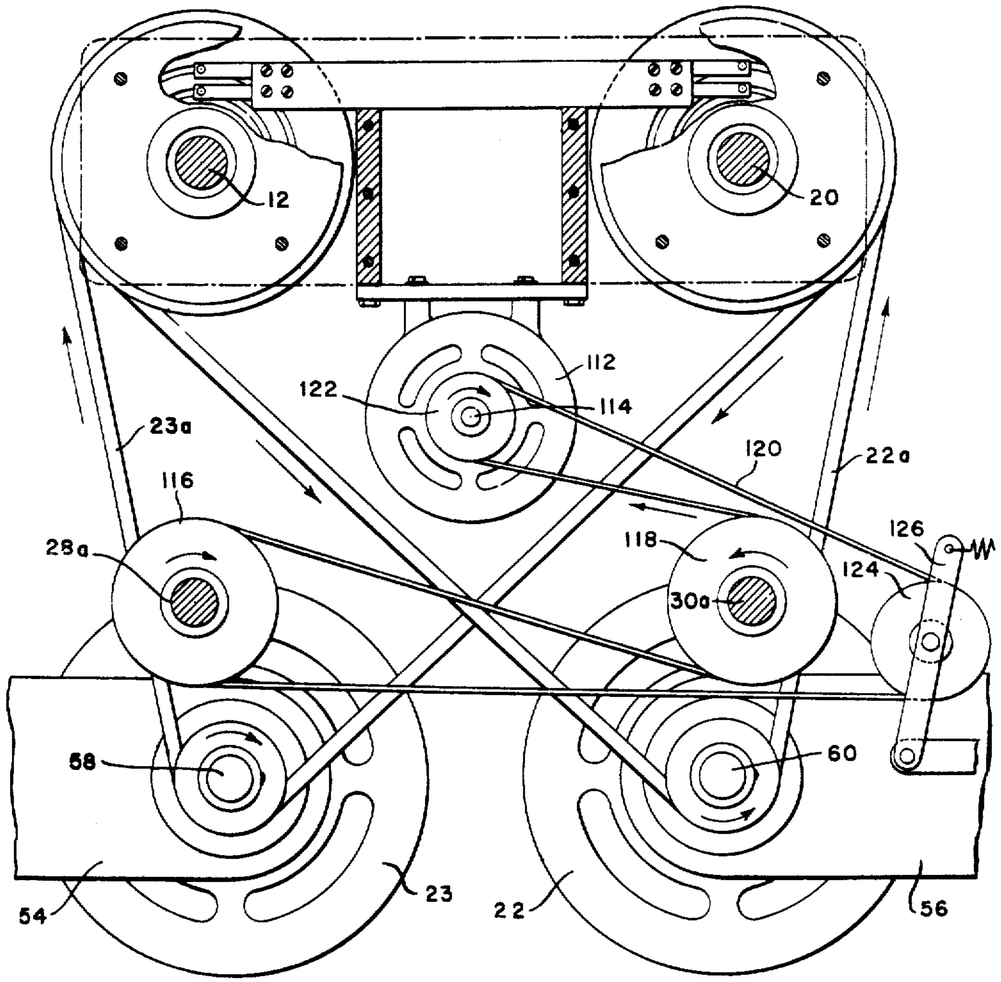
Figures 4, 5:
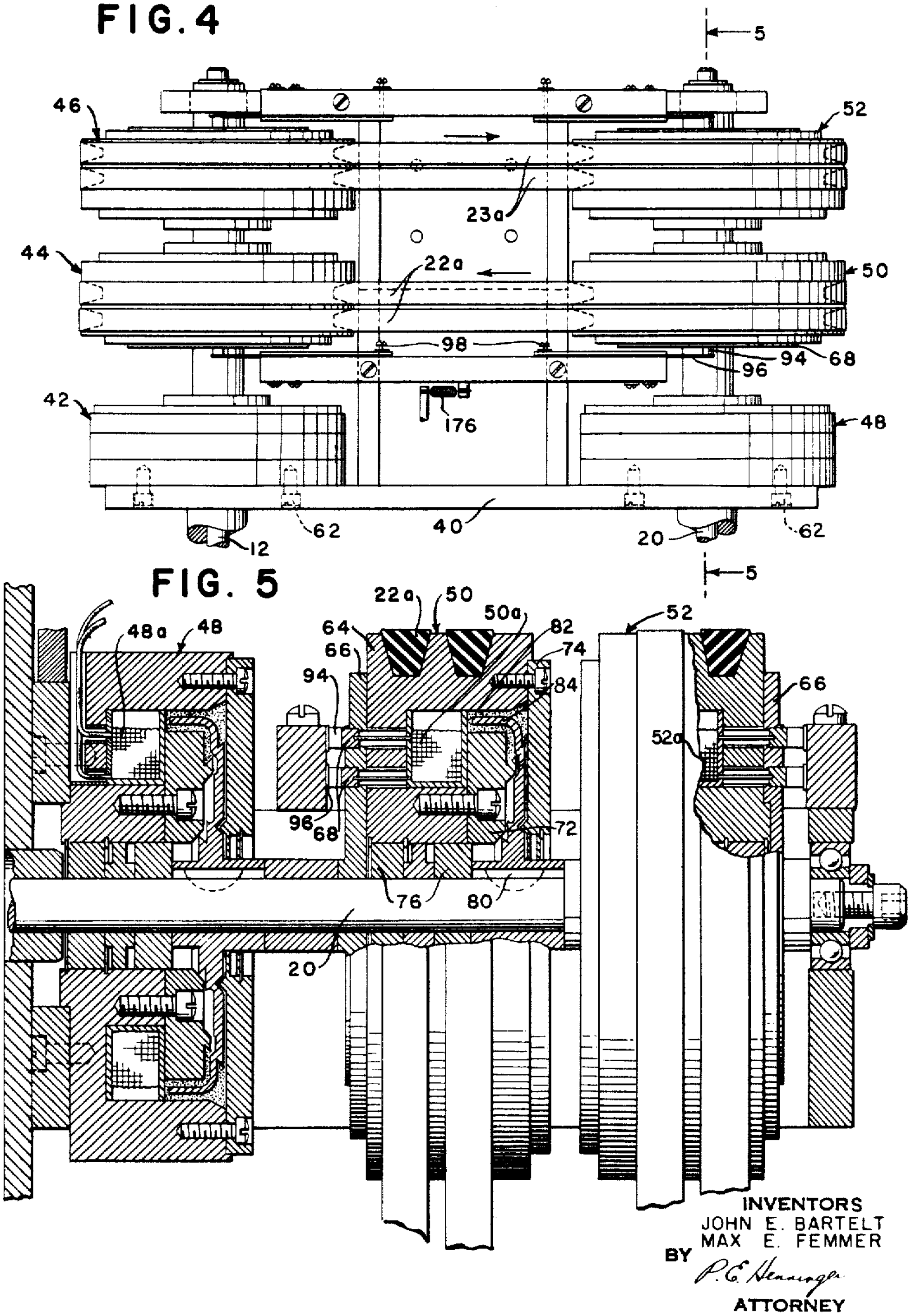
Figure 6:
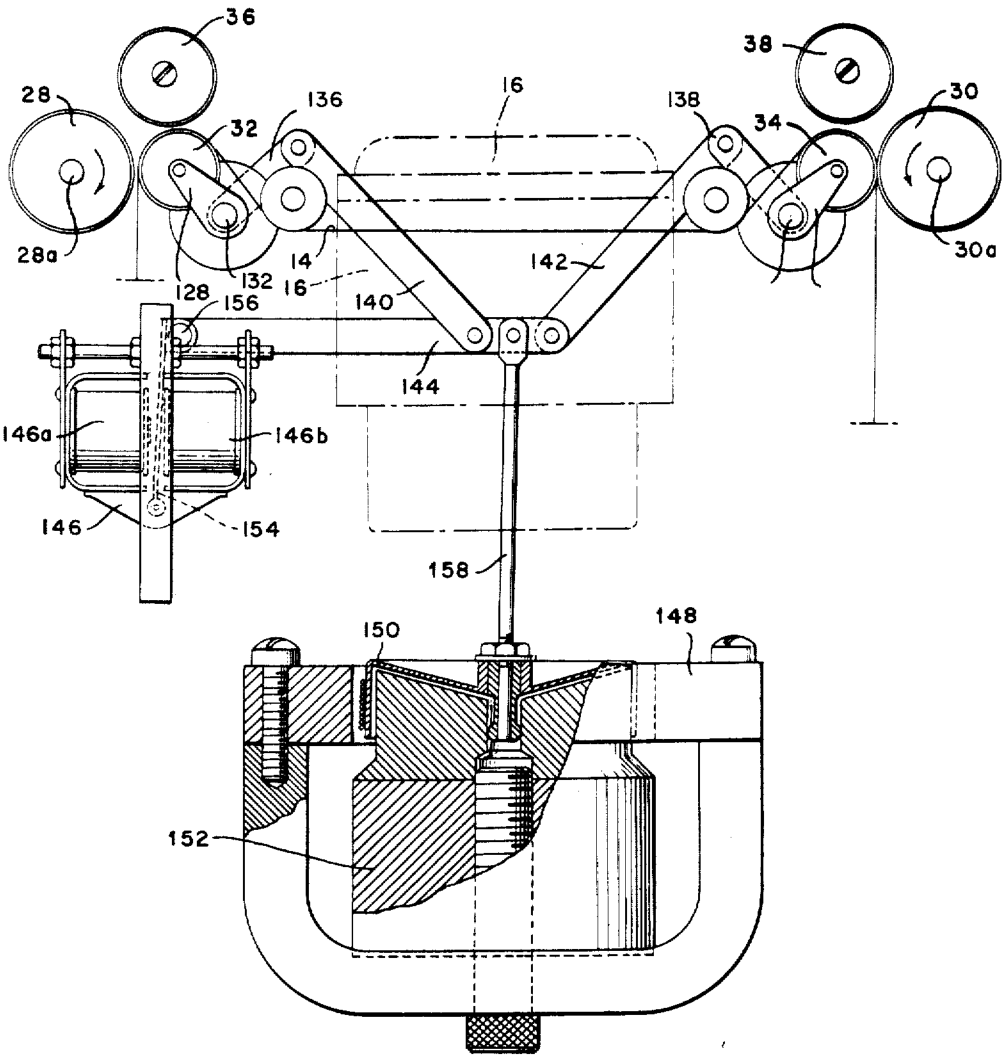
Figures 7, 8:
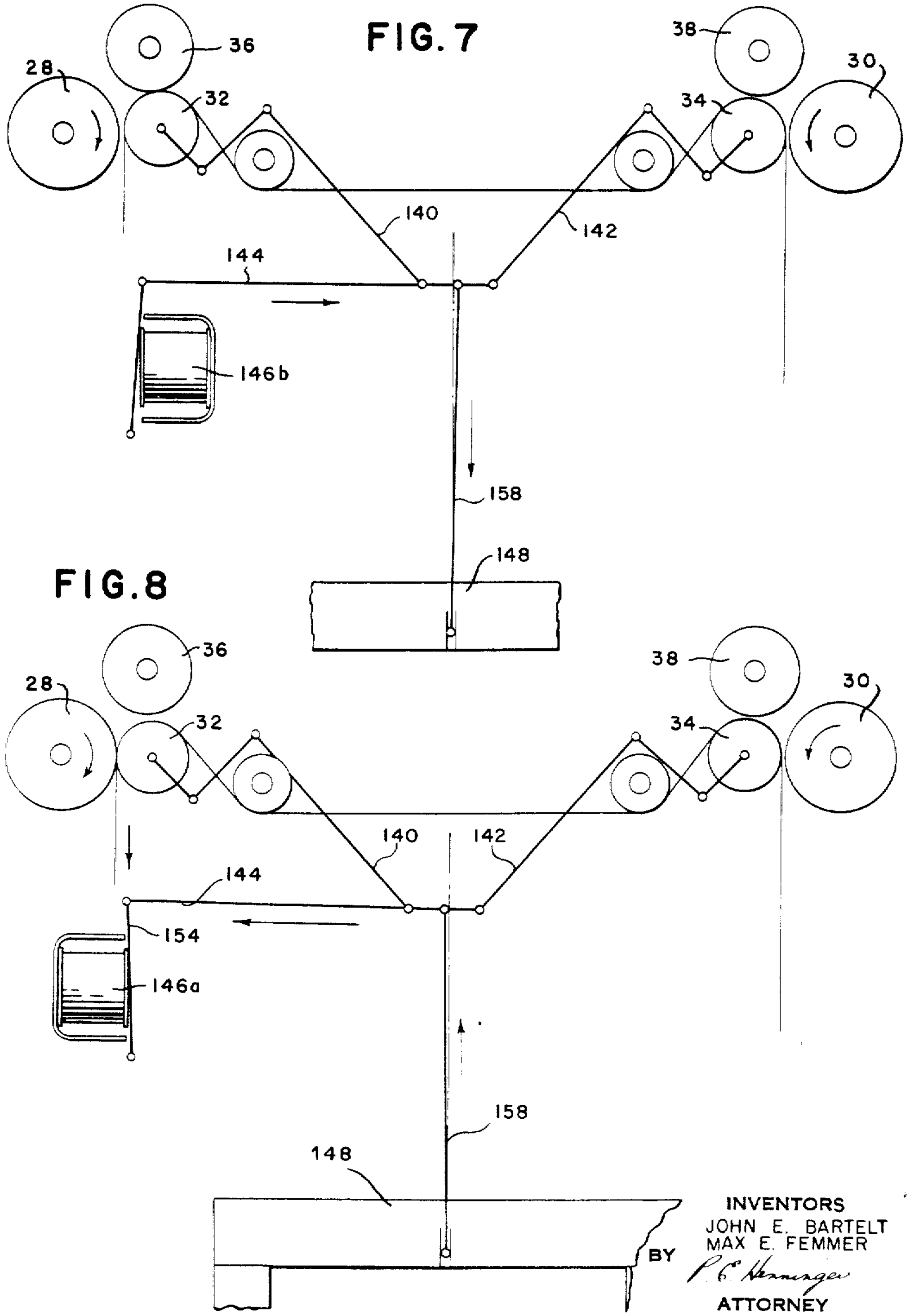
Figure 9:
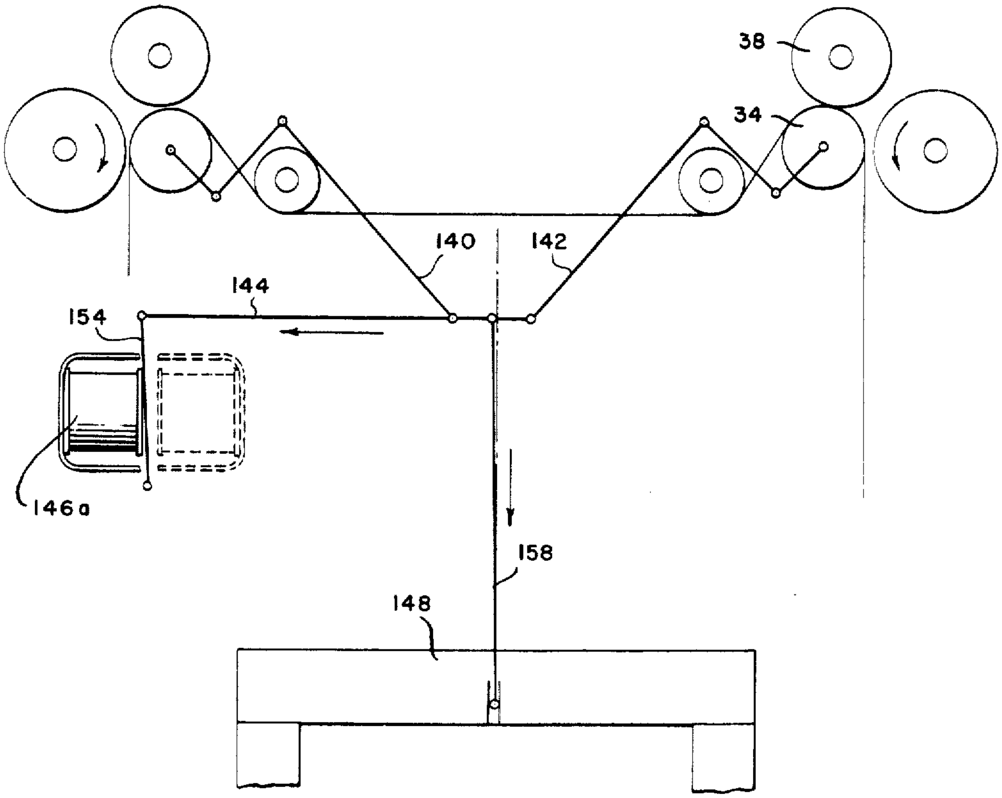
Figure 10:
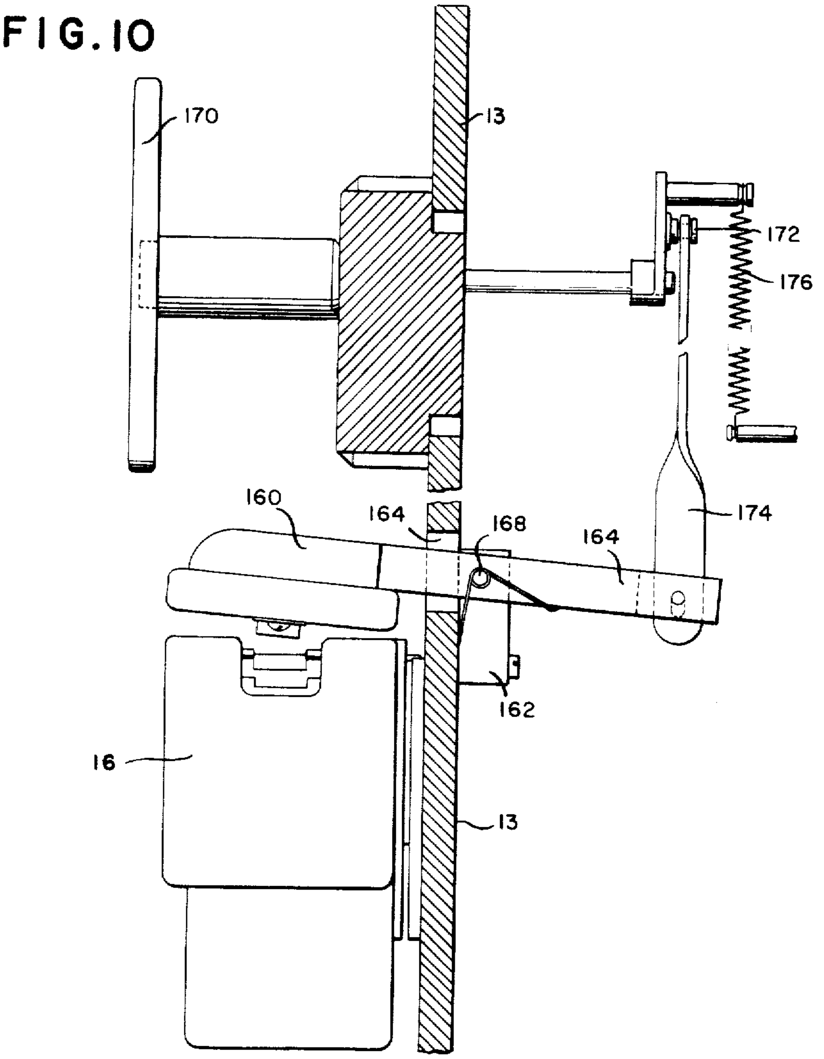
Figure 11:
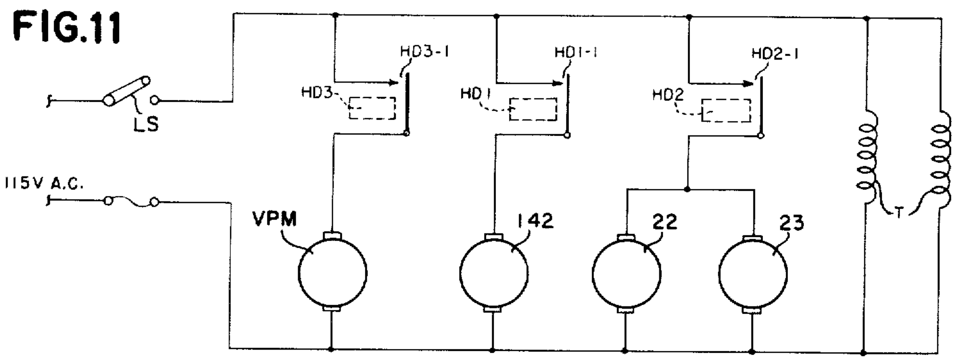
Figure 12:
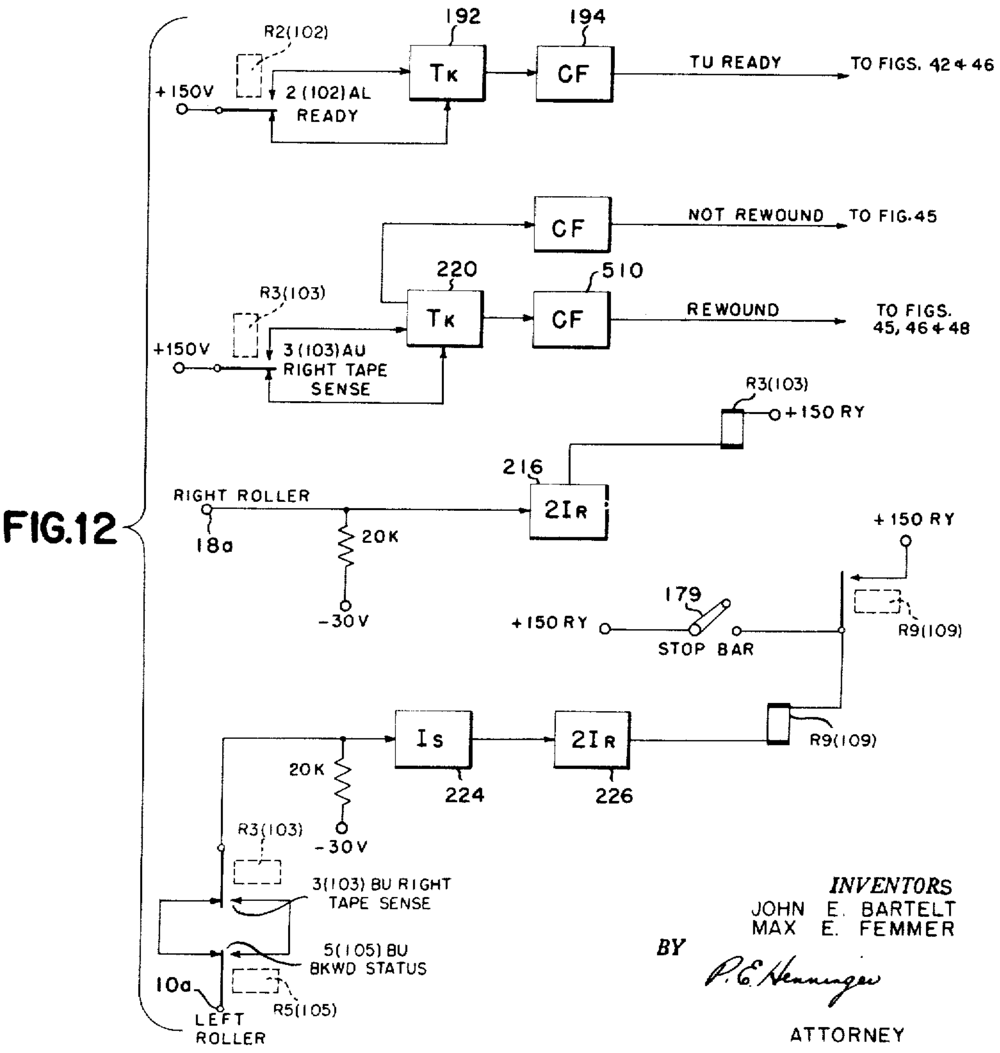
Figure 13:
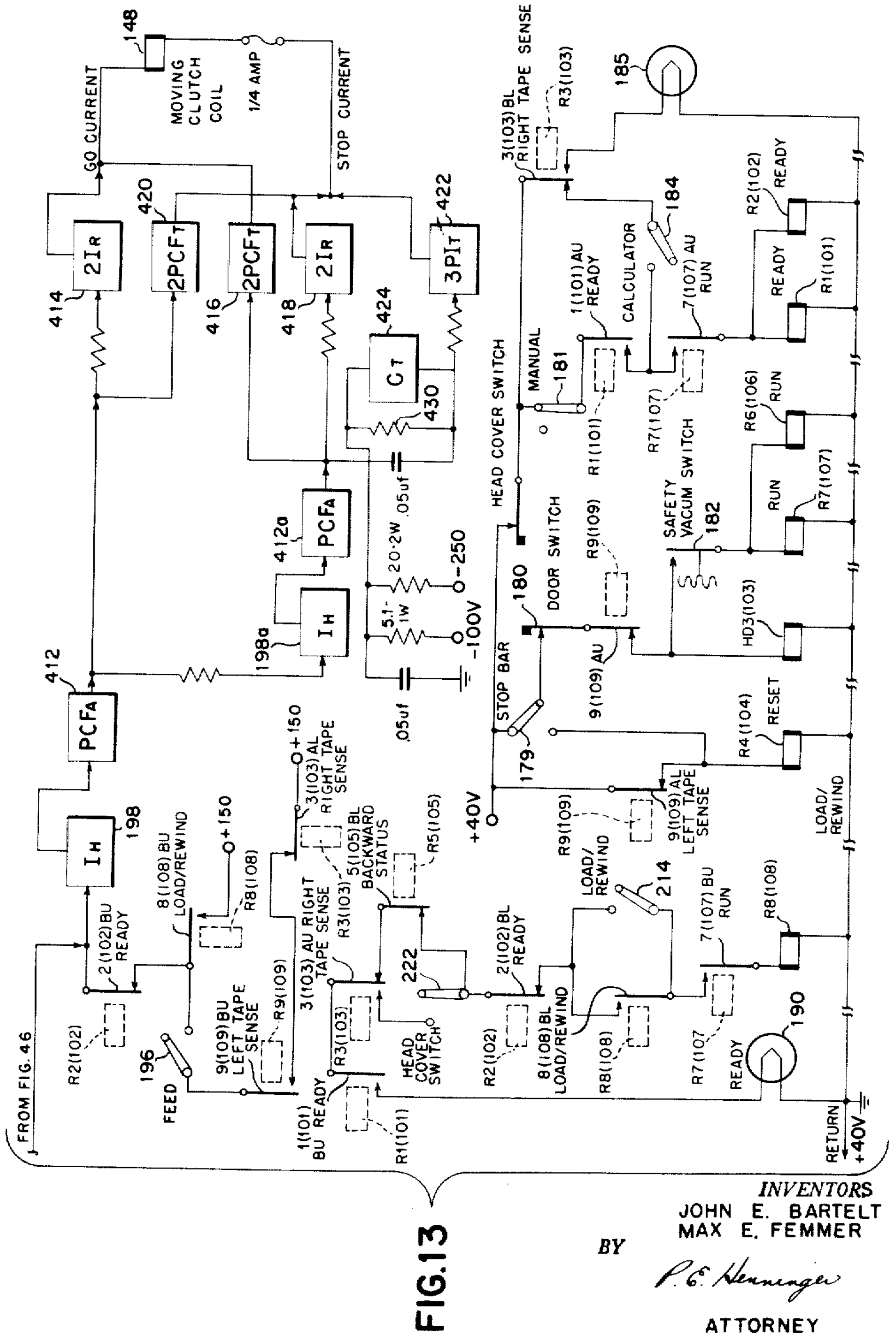
Figure 14:
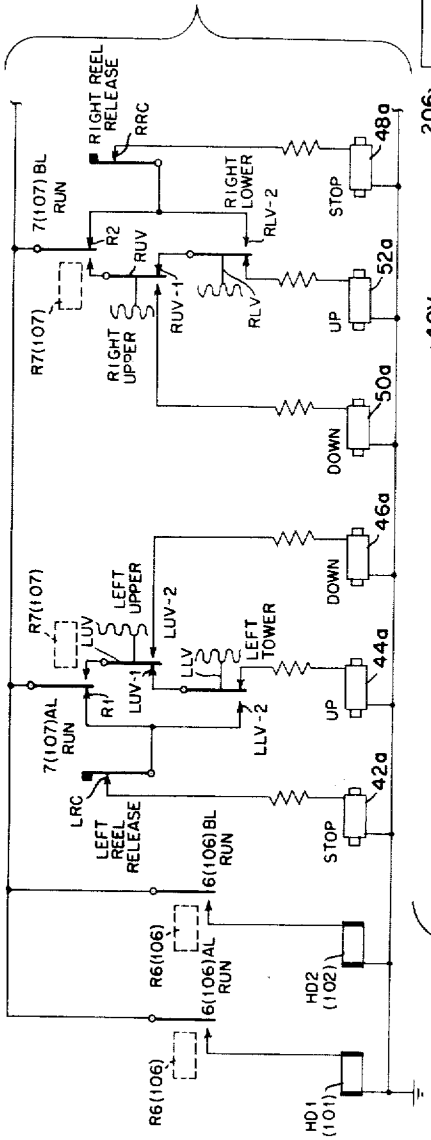
Figure 15:
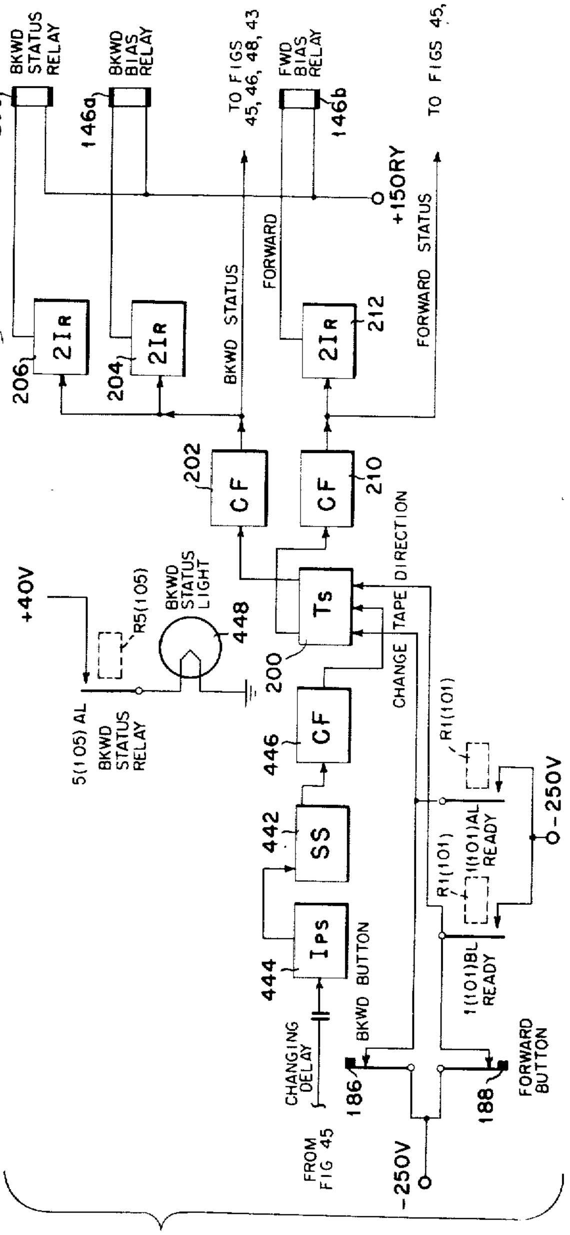
Figure 16:
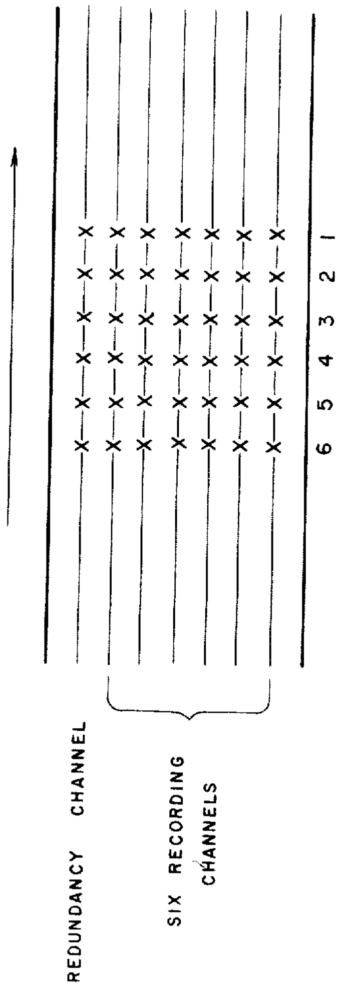
Figure 17:
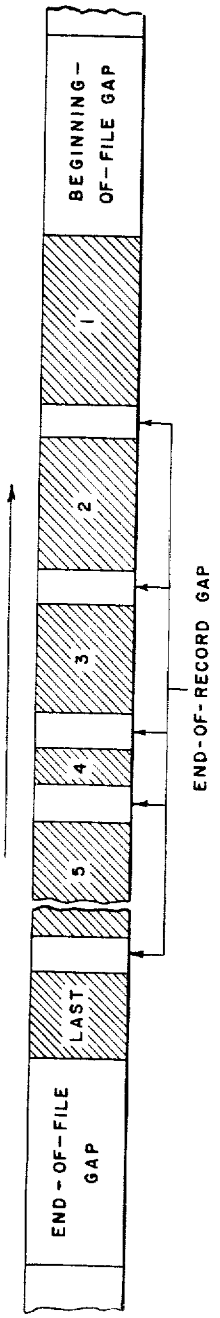
Figures 18, 22:
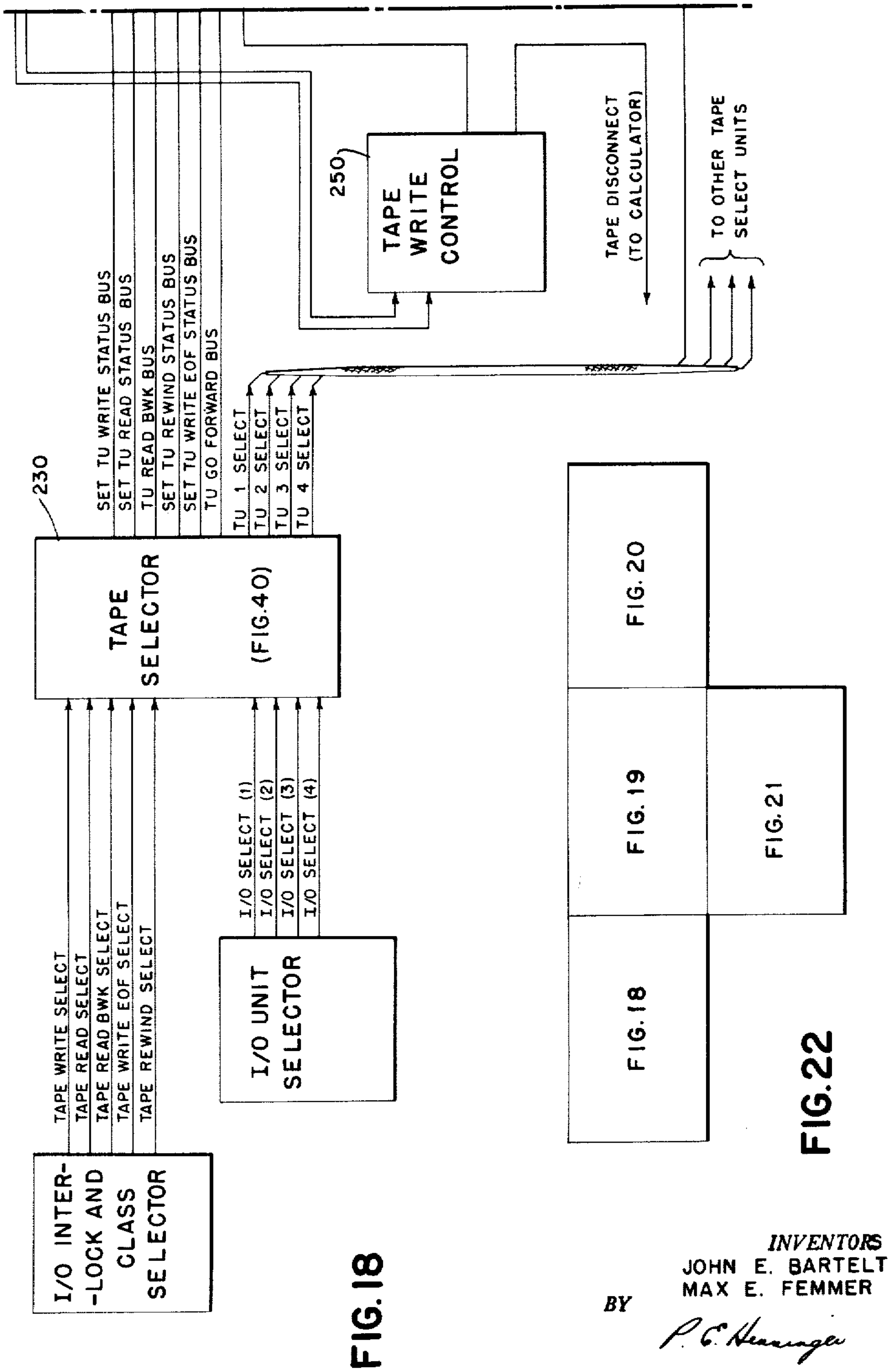
Figure 19:
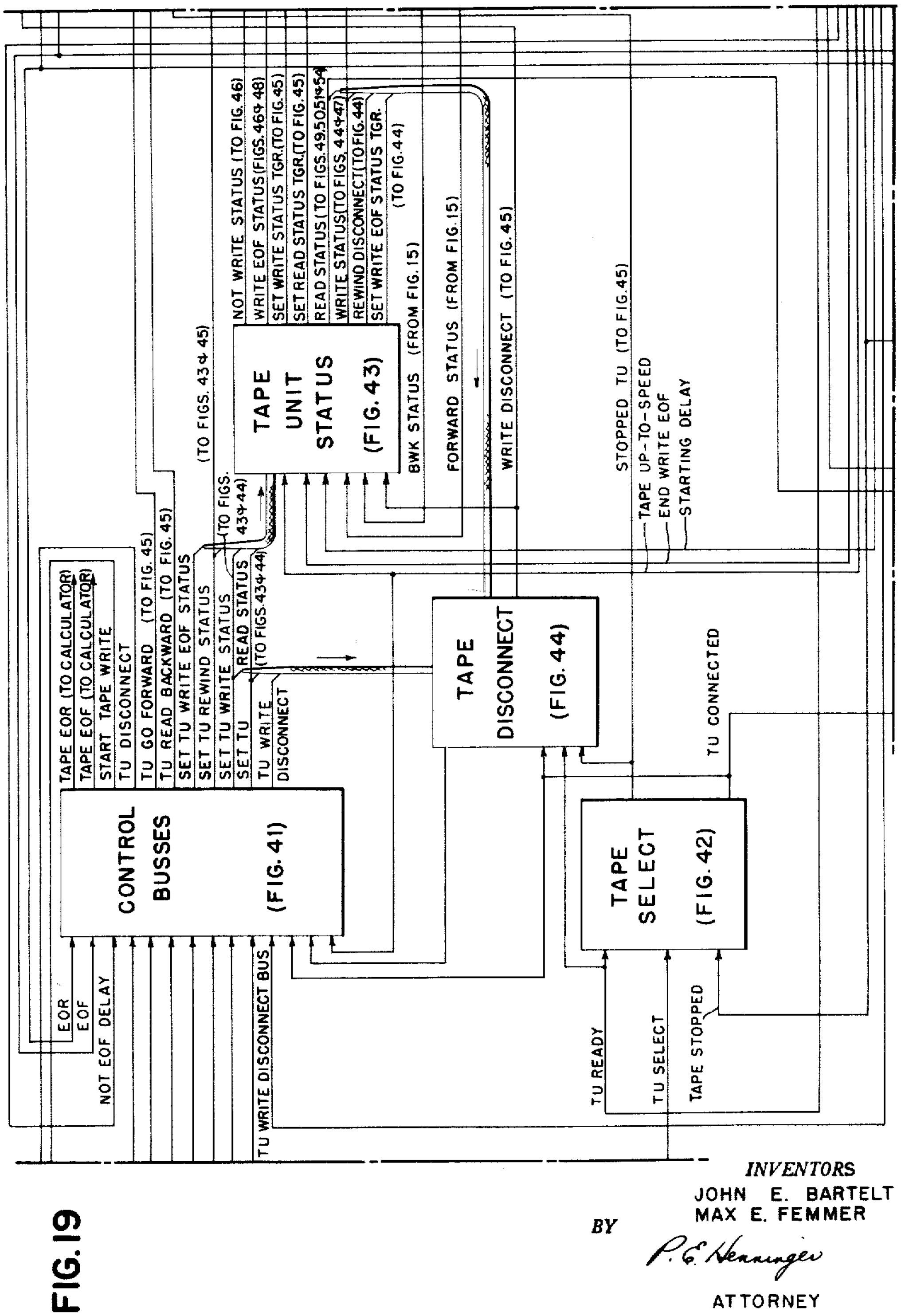
Figure 20:
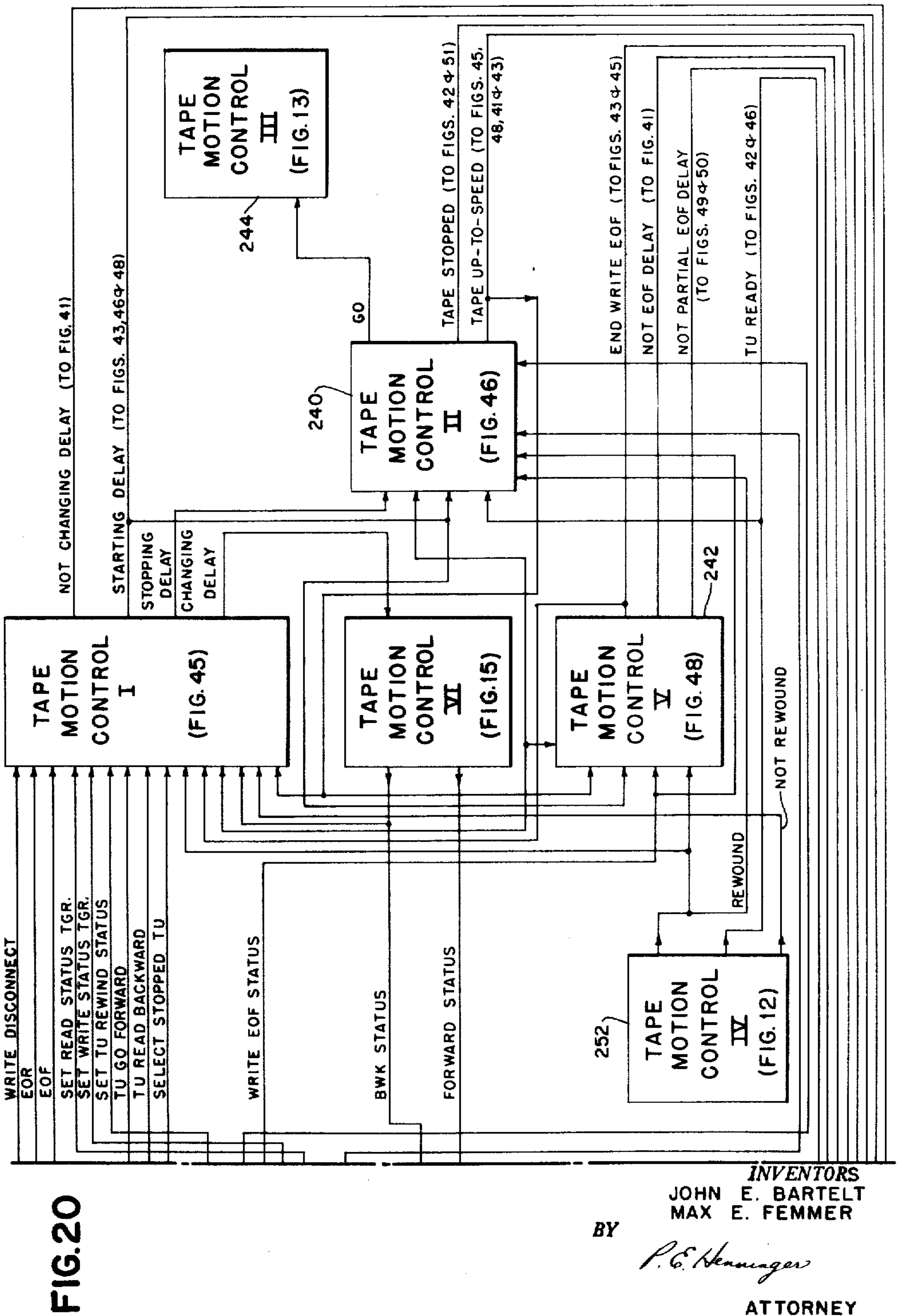
Figure 21:
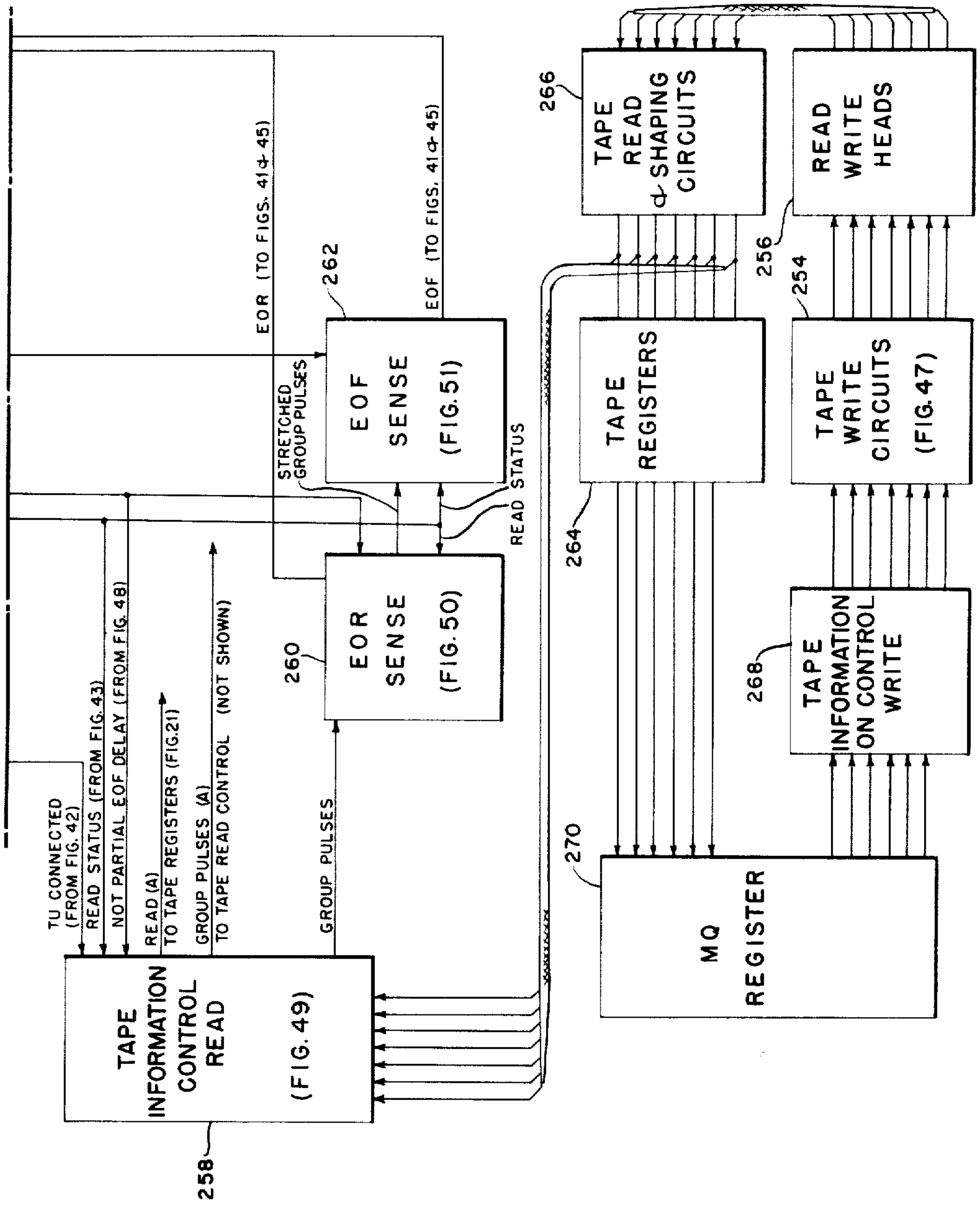
Figure 24:
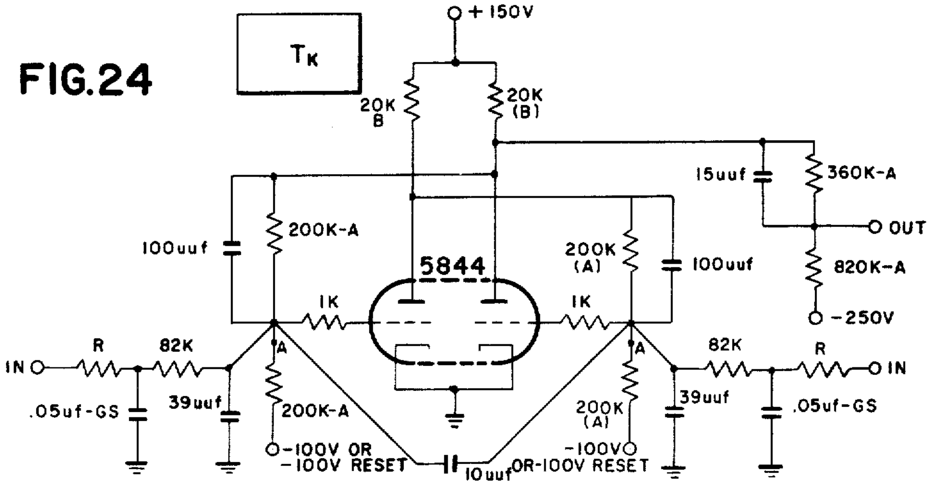
Figure 23:
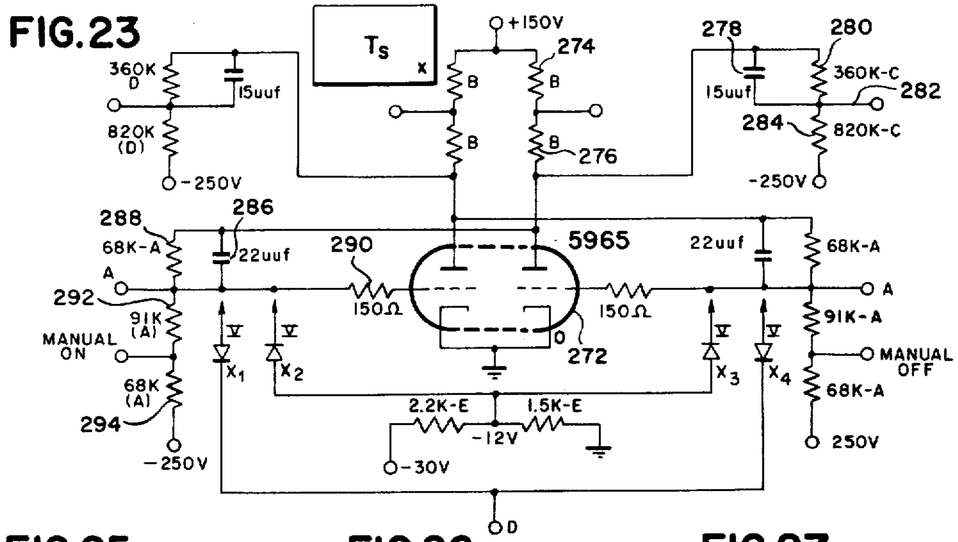
Figure 25:
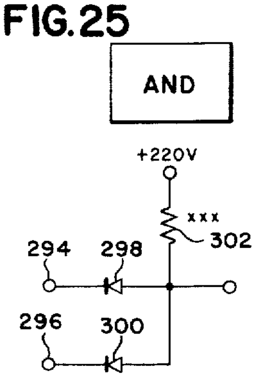
Figure 26:
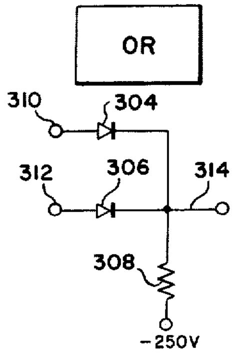
Figure 27:
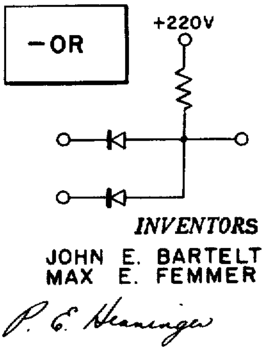
Figure 28:
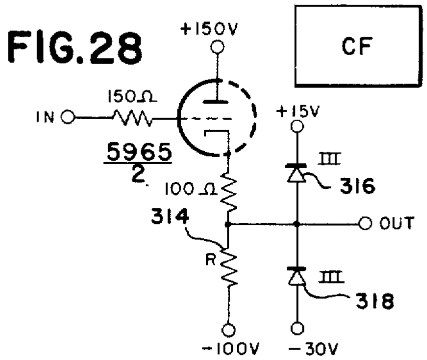
Figure 29:
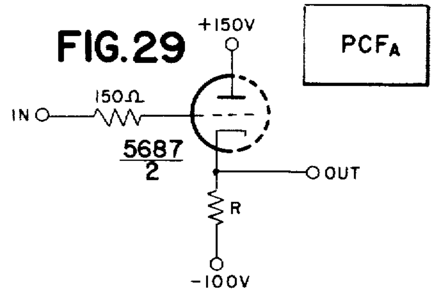
Figures 30, 31:
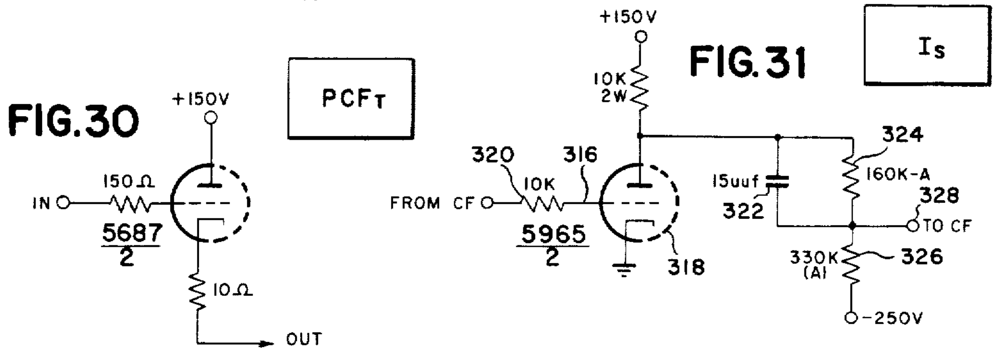
Figure 32:
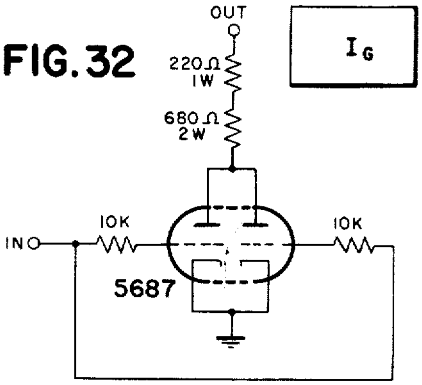
Figure 33:
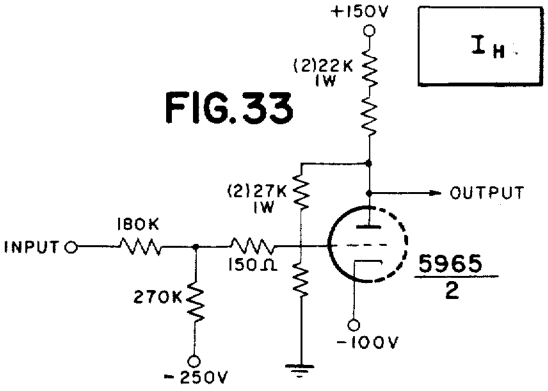
Figure 34:
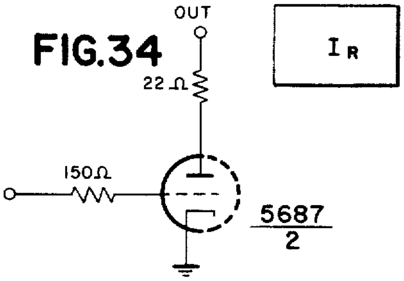
Figure 35:
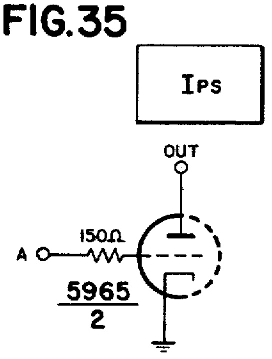
Figure 36:
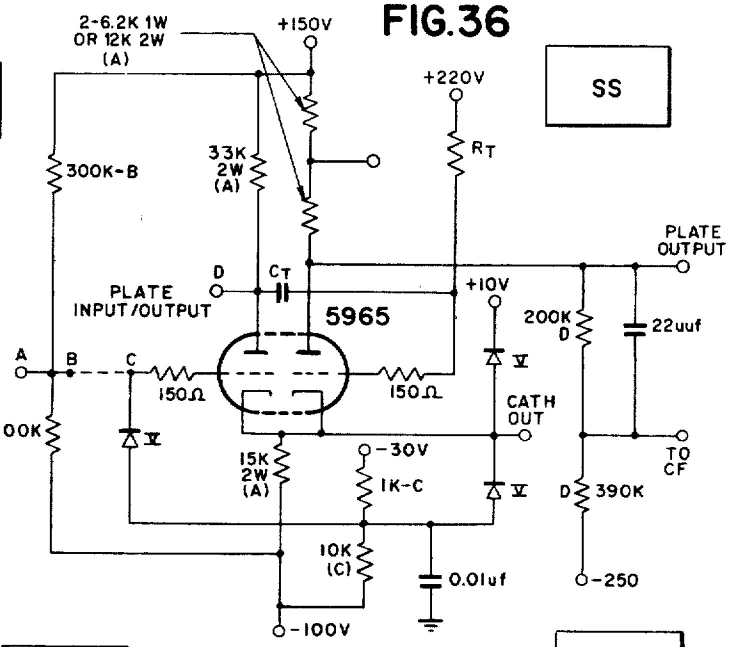
Figure 37:
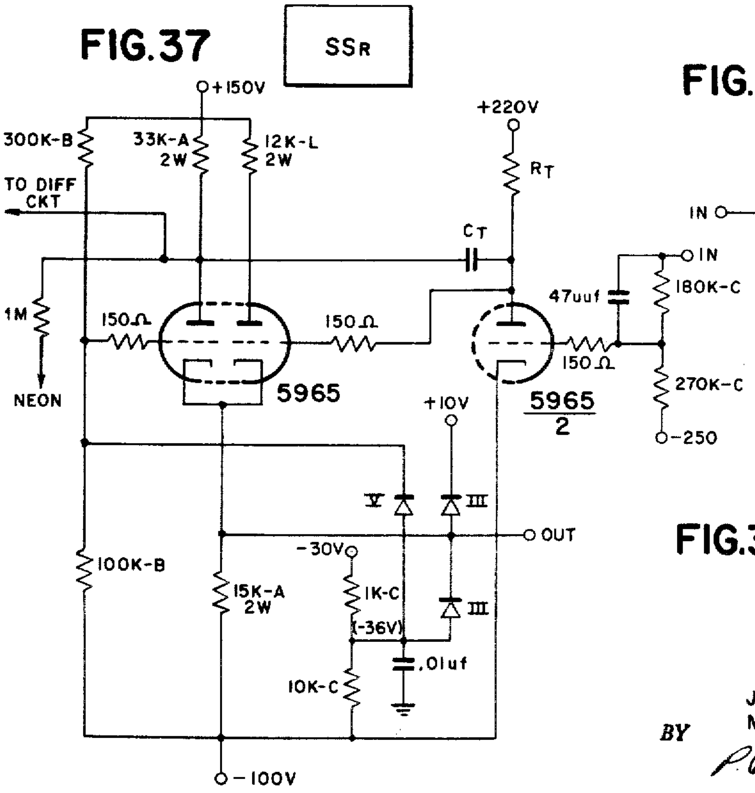
Figure 38:
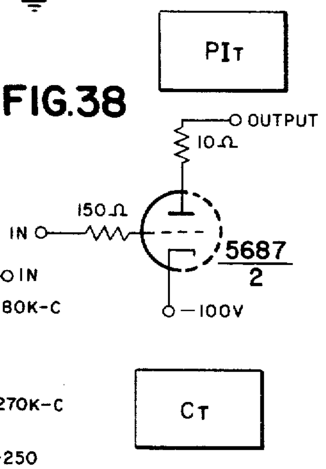
Figure 39:
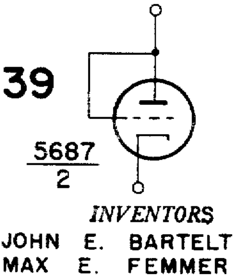
Figure 40:
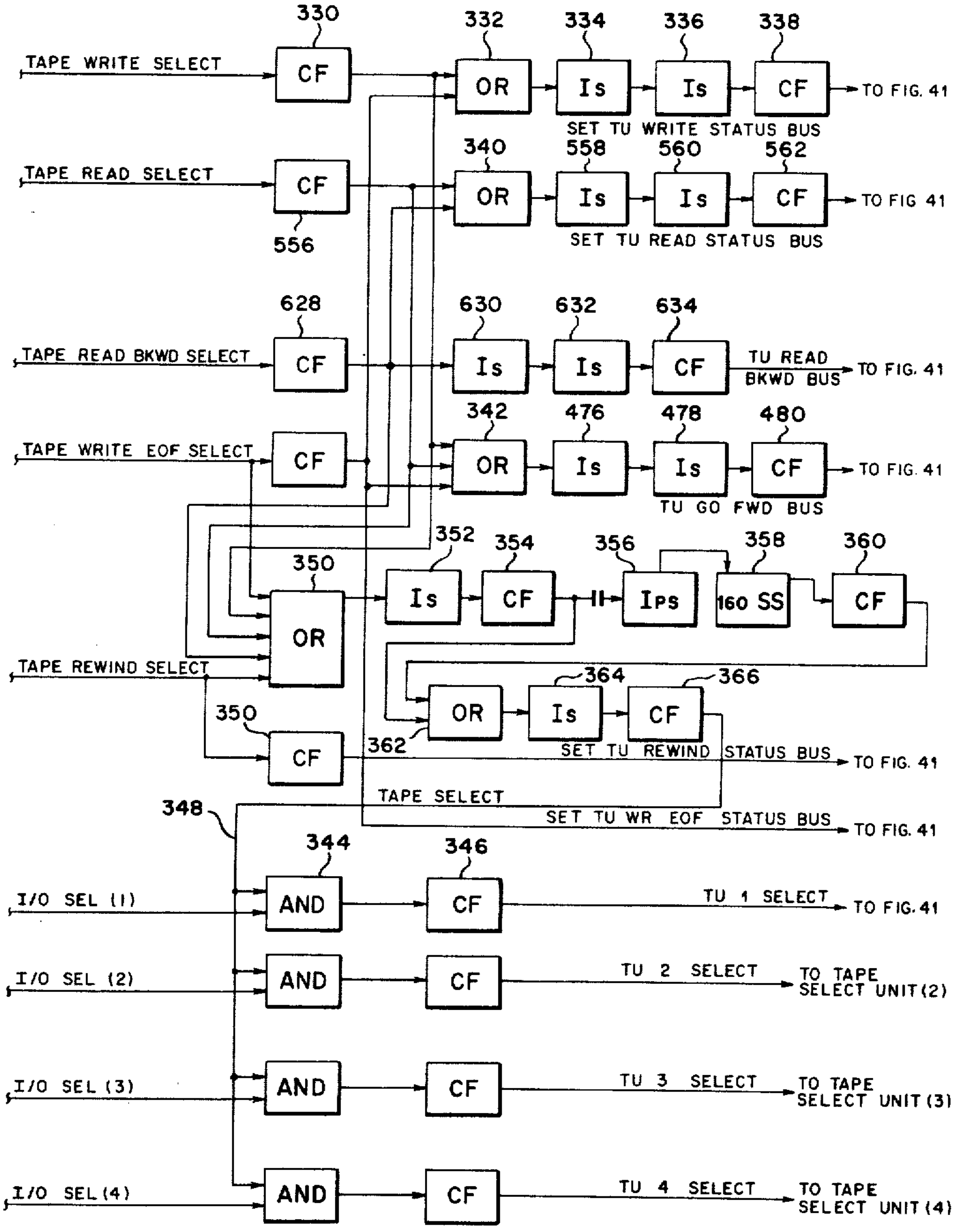
Figure 41:
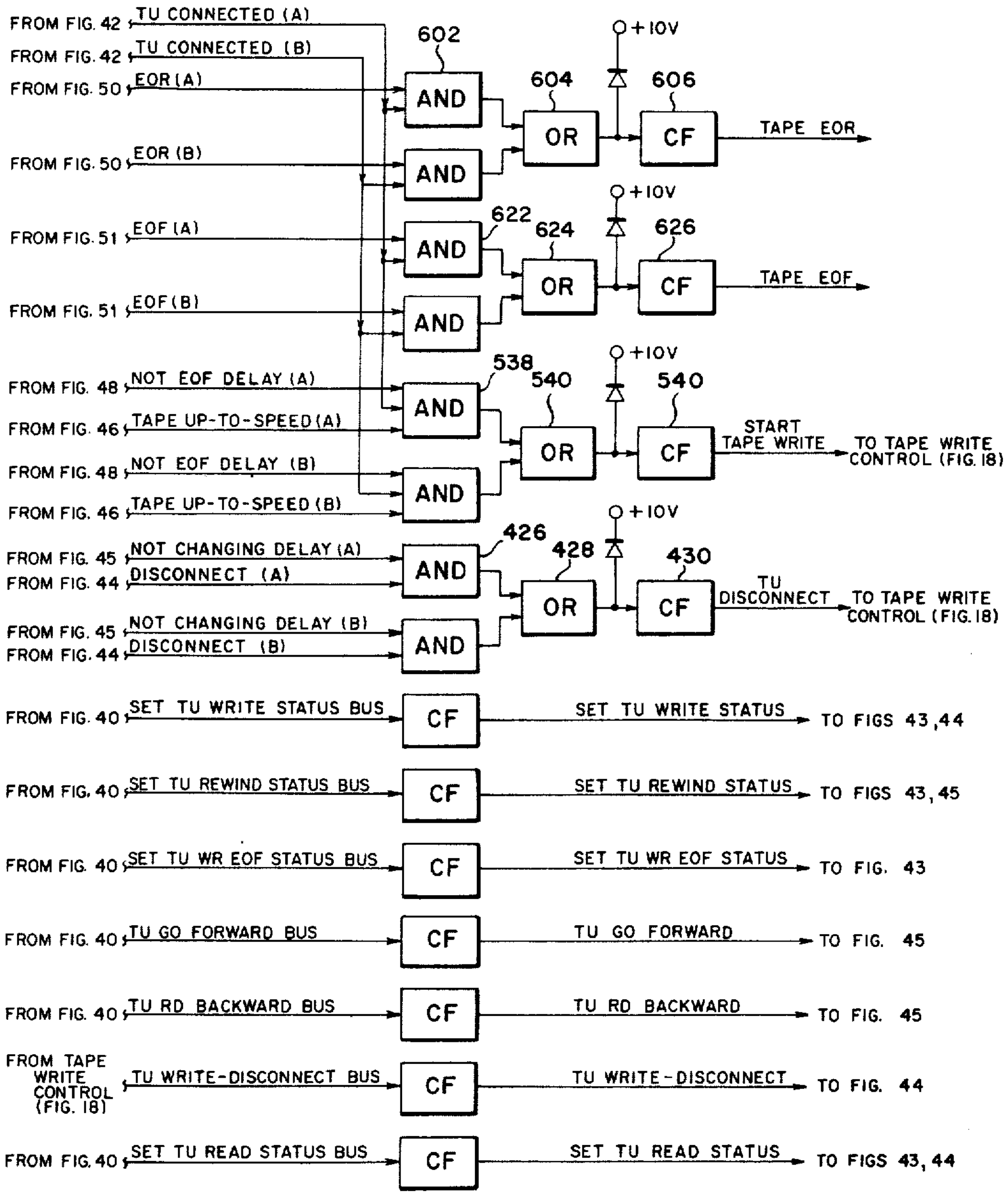
Figure 42:
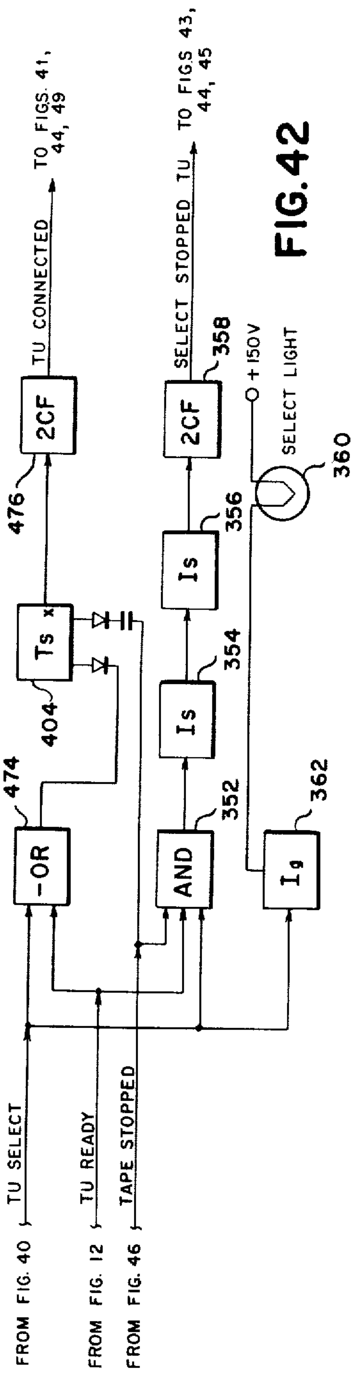
Figure 44:
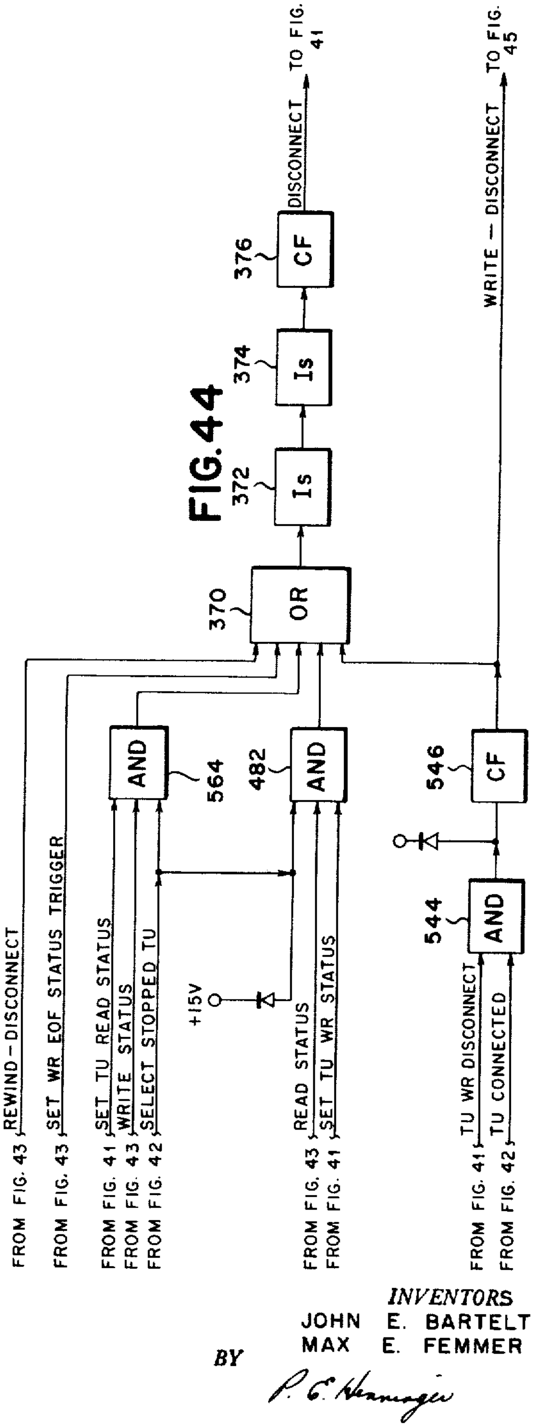
Figure 43:
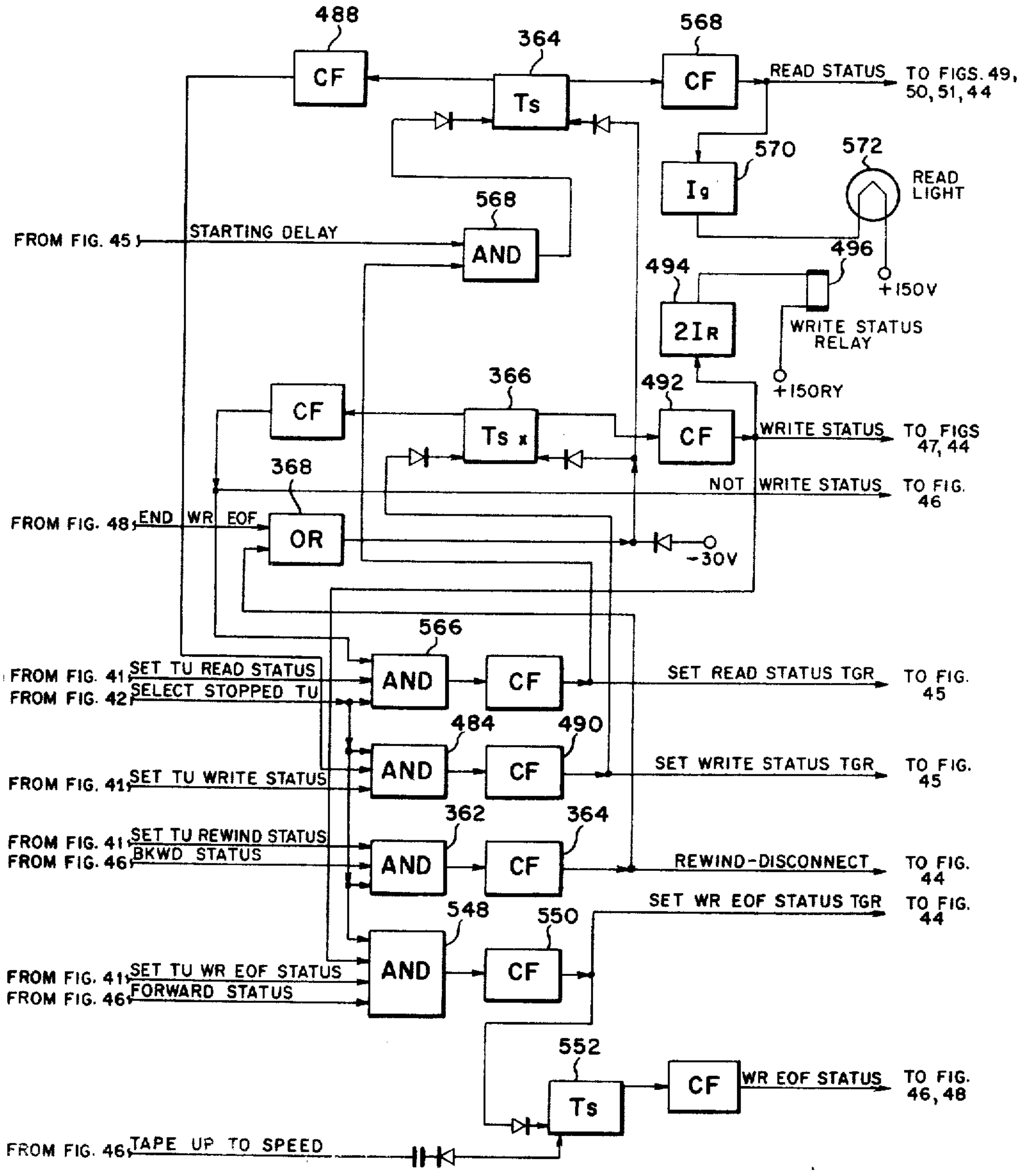
Figure 45:
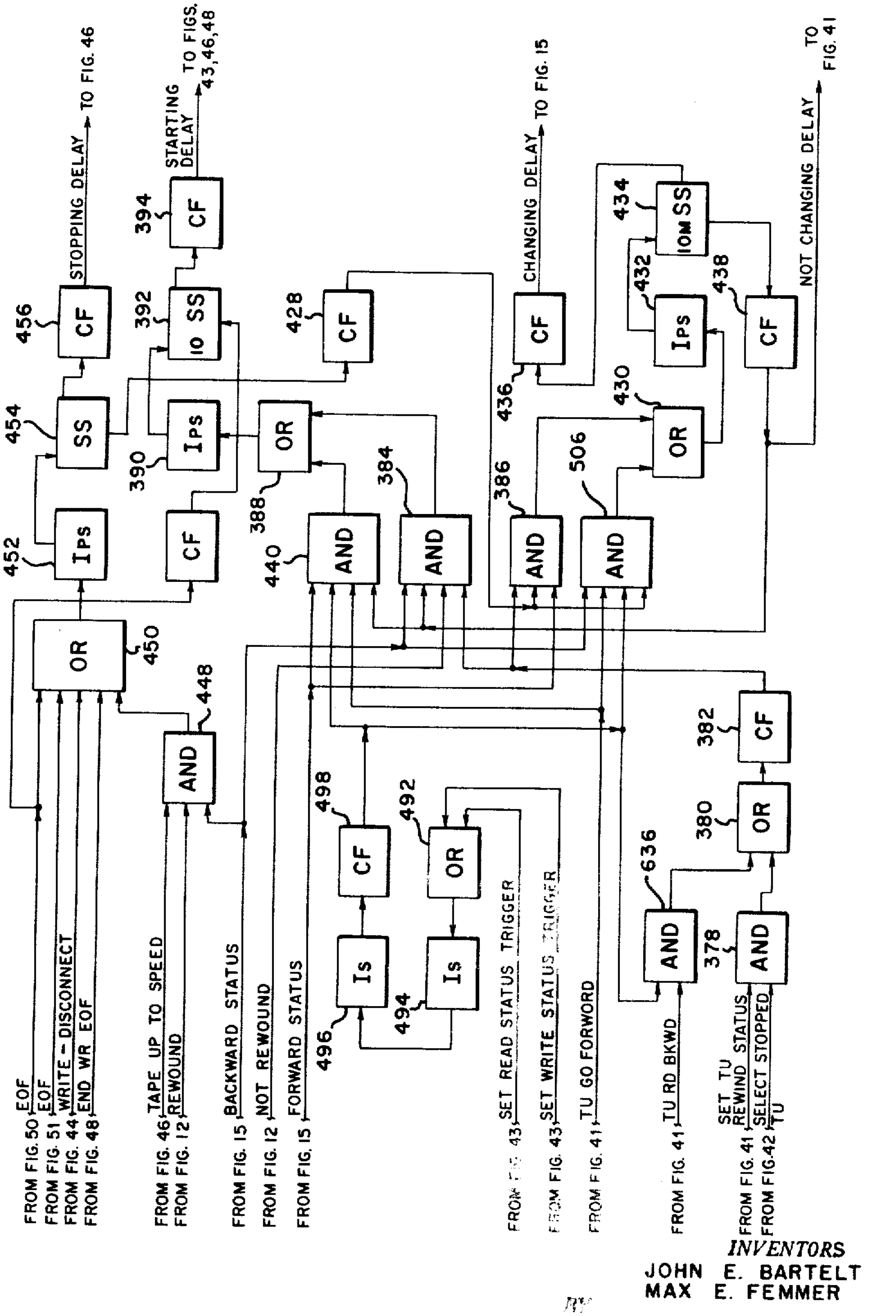
Figures 46, 47:
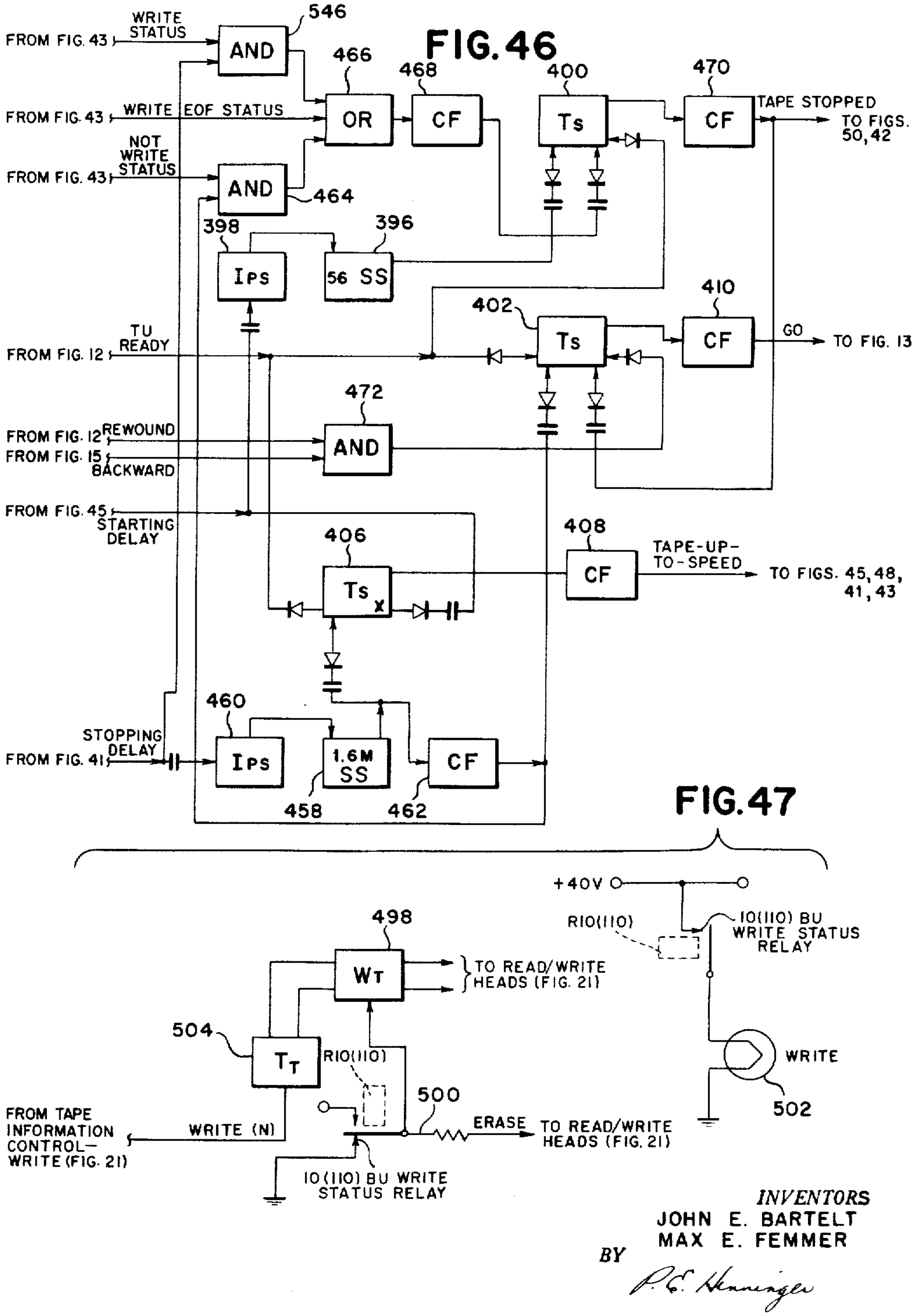
Figures 47A, 48:
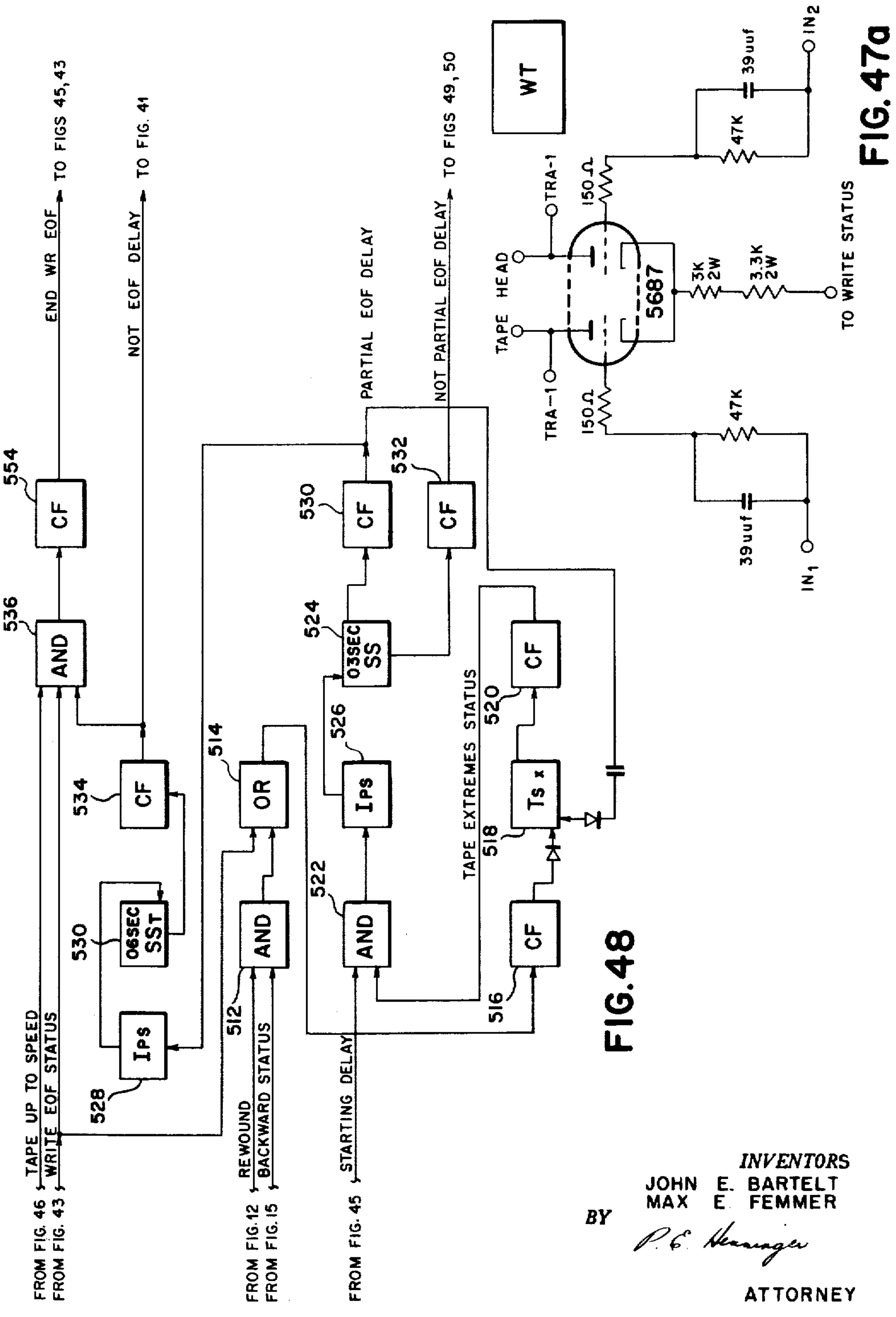
Figures 49, 50, 51:
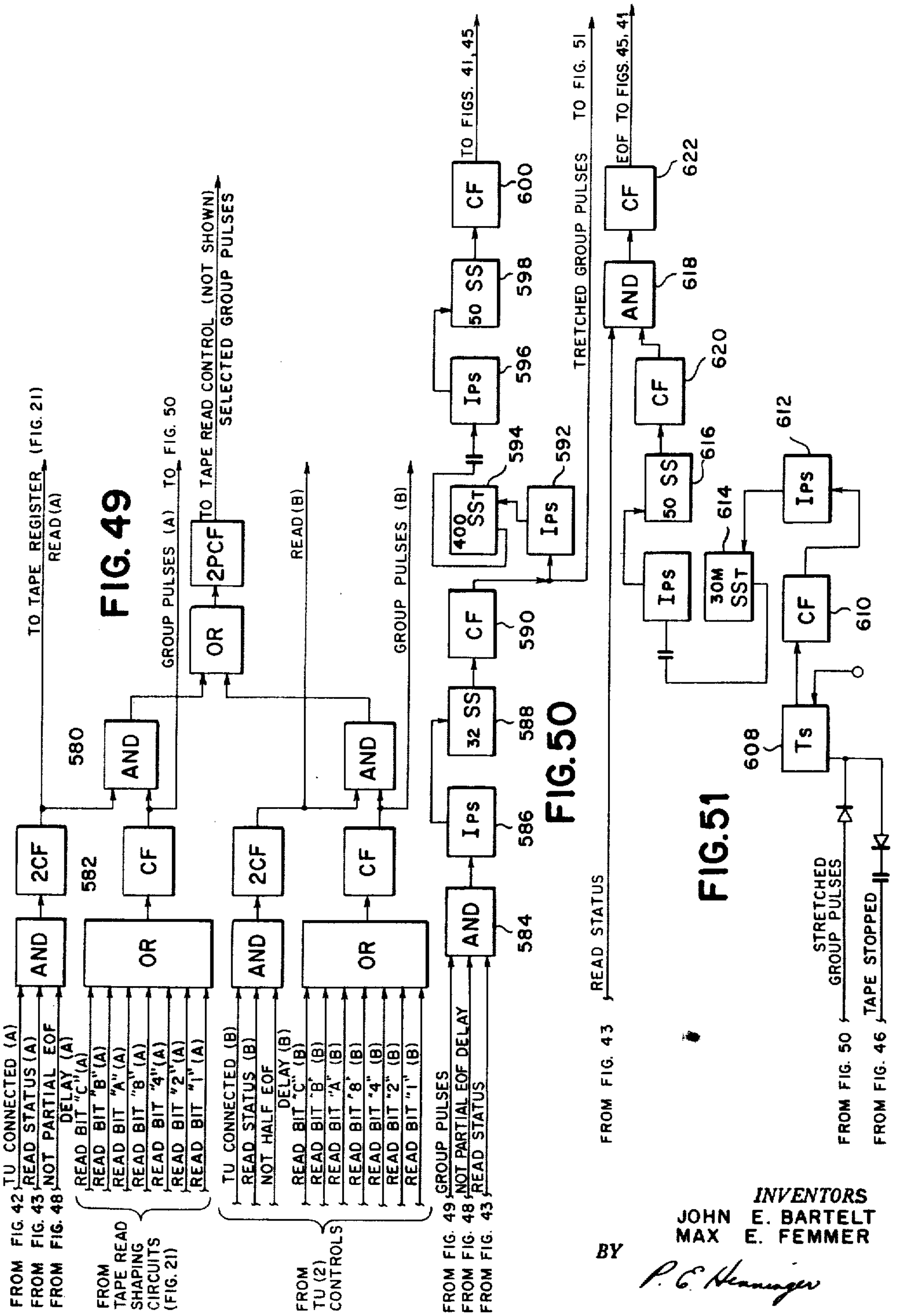

Fig. 2*a* is a side, elevational view of the tape unit of Fig. 1 with parts of the casing broken away to show the disposition and nature of underlying structure;

Fig. 3 is a sectional view on line 3—3 of Fig. 2;

Fig. 4 is a plan view of the tape reel drive mechanism comprising electromagnetic clutches and brakes;

Fig. 5 is a view on line 5—5 of Fig. 4 showing parts in cross-section and other parts in full line;

Fig. 6 illustrates the tape drive mechanism and the means for biasing the mechanism into tape driving position, the view showing the parts biased into position for driving the tape in a forward direction;

Fig. 7 is a diagrammatic view of the mechanism shown in Fig. 6 with the parts thereof biased into position to stop tape movement following feed of a tape in a forward direction;

Fig. 8 is a diagrammatic view such as that in Fig. 7 and shows the mechanism biased into position to effect backward feed of the tape;

Fig. 9 is a diagrammatic view such as those shown in Figs. 7 and 8 with the parts biased into position to halt tape feed following backward feed of the tape;

Fig. 10 is a view of the read-write head cover control mechanism, whereby relative separation between a tape reading head and its cover may be effected;

Fig. 11 is a diagram of the motor control and power supply circuit for a tape drive unit;

Fig. 12 is a diagram, pricipally in block form, showing the Tape Motion IV Unit;

Fig. 13 is a diagram principally in block form, showing the Tape Motion Control III Unit;

Fig. 14 is a diagrammatic illustration of the magnetic clutch control circuits;

Fig. 15 is a diagram, principally in block form, showing the Tape Motion Control VI Unit;

Fig. 16 is a schematic diagram of a word recorded on magnetic tape;

Fig. 17 is a schematic diagram of a file of information recorded on magnetic tape;

Figs. 18, 19, 20 and 21, when disposed in relation to each other as shown in Fig. 22, constitute the overall block diagram showing the transmission of signals between the respective control unit blocks as contemplated by the present invention;

Fig. 22 is a drawing lay-out diagram showing the manner in which Figs. 18 through 21 can be arranged to form an overall block diagram;

Fig. 23 illustrates both the block symbol and the detailed wiring diagram of a slow speed electronic trigger;

Fig. 24 illustrates both the block symbol and the detailed wiring diagram of an electronic key trigger;

Fig. 25 illustrates both the block symbol and the detailed wiring diagram of a crystal diode AND coincidence circuit having two inputs;

Fig. 26 illustrates both the block symbol and the detailed wiring diagram of a crystal diode +OR circuit having a pair of inputs;

Fig. 27 illustrates both the block symbol and the detailed wiring diagram of a crystal diode —OR circuit having a pair of inputs;

Fig. 28 illustrates both the block symbol and the detailed wiring diagram of a standard cathode follower;

Fig. 29 illustrates both the block symbol and the detailed wiring diagram of a special power cathode follower;

Fig. 30 illustrates both the block symbol and the detailed wiring diagram of still another special cathode follower;

Fig. 31 illustrates both the block symbol and the detailed wiring diagram of a slow speed inverter;

Fig. 32 illustrates both the block symbol and the detailed wiring diagram of a special inverter;

Fig. 33 illustrates both the block symbol and the detailed wiring diagram of another special inverter;

Fig. 34 illustrates both the block symbol and the detailed wiring diagram of a still further special inverter;

Fig. 35 illustrates both the block symbol and the detailed wiring diagram of a pull-over inverter;

Fig. 36 illustrates both the block symbol and the detailed wiring diagram of a single shot multivibrator;

Fig. 37 illustrates both the block symbol and the detailed wiring diagram of a special single shot multivibrator;

Fig. 38 illustrates both the block symbol and the detailed wiring diagram of a special inverter;

Fig. 39 illustrates both the block symbol and the detailed wiring diagram of a special clamping circuit;

Fig. 40 illustrates in block diagram form the Tape Selector Unit;

Fig. 41 illustrates in block diagram form the Control Buses;

Fig. 42 illustrates, principally in block diagram form, the Tape Select Unit;

Fig. 43 illustrates principally in block diagram form the Tape Unit Status Network;

Fig. 44 illustrates in block diagram form a Tape Disconnect Unit;

Fig. 45 illustrates in block diagram form the Tape Motion Control I Unit;

Fig. 46 illustrates in block diagram form the Tape Motion Control II Unit;

Fig. 47 illustrates principally in block diagram form the Tape Write Circuits;

Fig. 47*a* illustrates both the block symbol and the detailed wiring diagram of a write tube used in the tape writing circuits;

Fig. 48 illustrates in block form the Tape Motion Control V Unit;

Fig. 49 illustrates in block form the Tape Information Control-Read circuits;

Fig. 50 illustrates in block form the End of Record Sense circuits; and

Fig. 51 illustrates in block form the End of File Sense circuits.

The very broad aspects of this invention can be appreciated by a study of Fig. 1 of the drawings and a more detailed understanding may be obtained by reference to the composite of Figs. 18 through 21, which represent in block form the overall circuit herein involved.

In Fig. 1 is represented a calculator and two blocks, each of which represents a magnetic tape unit which constitutes input-output devices for the calculator. At the top of the figure it will be seen that a plurality of write buses are provided for the conveyance of data to each one of the four tape units. By means of these buses, data may be taken from the calculator and written on tape in any one of the four units illustrated in the figure. Likewise, it will be noted that directly under the write buses are a plurality of read buses, whereby data read from a tape in any one of the tape units TU1 through TU4 is conveyed to the calculator for use therein. The circuits which control reading from tape and transfer of such information to the calculator or the writing on tape under control of the calculator data is the subject matter of United States Patent 2,805,234, issued to John E. Bartelt and Max E. Femmer on September 2, 1958, and will not be discussed herein.

The tape unit control signals and their use, which forms the basis for the present invention, are shown at the bottom of Fig. 1, where it is seen that certain calculator originated signals are sent to the tape units and certain tape unit originated signals are sent to the calculator. The signals Set TU Write Status Bus, Set TU Read Status Bus, TU Read Backward Bus, TU Go Forward Bus and Set TU Rewind Status Bus are signals which originate in the calculator and are each sent to each of the four tape units herein illustrated. The foregoing signals are, however, not effective in any of the tape units until a particular tape unit has been selected by the calculator originated signals TU1 Select, TU2 Select, TU3 Select and TU4 Select. Whereas the functional signals first enumerated are sent to each of the tape units, the TU Select signals are sent only to the particular tape unit designated. Thus, TU1 Select is effective in tape unit #1 only, TU2 Select is effective in tape unit #2 only, TU3 Select is effective in tape unit #3 only, and TU4 Select is effective in tape unit #4 only. Thus, while the functional signals are impressed on all of the tape units, they are not gated into said units for operation therein unless one of the tape units has been selected by the TU Select signals.

Each of the tape units TU1 through TU4 is capable of generating therein certain signals which are transmitted to the calculator. These signals are Tape EOR, Tape EOF and Tape to Speed. These last three signals will be dealt with only insofar as their generation is concerned, since their eventual function in the calculator forms no part of this invention.

As shown in Fig. 1, for example, there are seven read busses and seven write busses. The system is, therefore, able to read from and write into seven channels of tape. Ordinarily information is recorded on tape in six channels that run parallel to the length of the tape. A set of six bits recorded in a line perpendicular to the six channels is referred to as a group of bits. The seventh channel on the tape serves to check the reading and writing in the other six channels by the well known redundancy count principle.

In Fig. 16 each "*x*" denotes binary 1 or 0 recorded in that position on the tape. When the tape moves in the direction of the arrow, the group numbered 1 may contain the sign and the first five bits of a word. The remaining five groups may contain following bits of a word in six groups.

The records are arranged on tape as shown in Fig. 17. This figure shows the end-of-file gaps and the end-of-record gaps which are related to the Tape EOF and the Tape EOR signals which are calculator inputs as shown in Fig. 1, for example. The tape file of Fig. 17 utilizes three kinds of gaps in the recording of information:

(1) the normal spacing between successive groups of bits within a unit record (see Fig. 16); (2) the longer gaps between unit records which allow the tape to stop and start between records, if desired; and (3) the still longer gaps at the ends of the file.

In correlating the block diagram of Fig. 1 with the overall block diagram comprising Figs. 18 through 21, it may be assumed that the I/O Interlock and Class Selector, the I/O Unit Selector and Tape Selector are located within the calculator frame and that the remaining units are provided in each of the tape unit frames TU1 through TU4. Thus the control system illustrated in Figs. 19, 20 and 21 may be deemed to relate to TU1 while the three lines terminating on Fig. 18 may be deemed to relate to TU2, TU3 and TU4 respectively of Fig. 1.

*Tape drive mechanism*

A general understanding of the tape drive mechanism may be attained by reference to Figs. 1 and 2 of the drawings. A pair of tape reels adapted to hold a coil of record tape are intermittently driven to provide a pair of tape loops upon which the mechanism for feeding the tape through the tape sensing head may call as the tape is to be fed in either of two directions. A tape reel 10 which shall be designated as a file reel is mounted on a drive spindle 12. It may be assumed that the reel 10 has thereon a coil of tape 14 on which data has been recorded and from which the tape is to be fed through a tape reading and recording head 16. In its forward feed direction, the tape will pass through the tape reading head 16 and will be coiled on a second reel 18 which may be designated herein as a machine reel. The machine reel 18 is mounted on a drive spindle 20.

The file reel drive spindle 12 and the machine reel drive spindle 20 are selectively rotated in either direction by a pair of motors 22 and 23. The motors 22 and 23 normally impart constant drive to a pair of electromagnetic clutch mechanisms mounted on each of the drive spindles 12 and 20. An electromagnetic brake is mounted on each of the drive spindles so that the spindles 12 and 20 may be locked against rotation. The nature of the electromagnetic clutches and the electromagnetic brake will be developed in greater detail at a later point herein.

Upon selective clutching of the electromagnetic clutch mechanisms in drive relation to the drive spindles 12 and 20, these spindles and consequently the tape reels attached thereto may be caused to reel or unreel tape from the coil thereon.

Since the mechanism is designed for high speed feed of tape through the tape head 16, it is important that a supply of tape be provided with little load or tension thereon, and to this end the driving mechanism for the reels 10 and 18 provides a pair of tape loops disposed in a pair of tape control columns 24 and 26. Each of the columns 24 and 26 has therein vacuum switches responsive to the position of the respective tape loops for maintaining a relatively stable position of these loops within the columns. The vacuum switches within the columns 24 and 26 control the reel drive mechanism in such manner that the loops, so to speak, are self-compensating. The tape reel drive mechanism for each reel operates independently of the other, and both reels are driven independently of feed of tape through the tape head 16.

Tape from the loop supply in the columns 24 and 26 is driven through the tape read-write head 16 by means of a pair of constantly rotating tape drive capstans. In Fig. 2 a tape drive capstan 28 may be deemed to be constantly rotated in a clockwise direction, and may consequently be designated as the backward drive capstan. A similar constantly rotating capstan 30 may be deemed to be driven in a counterclockwise direction and may, therefore, be designated as the forward drive capstan. In connection with the drive capstans 28 and 30, there are provided a pair of tape moving idler pulleys 32 and 34. The pulley 32 is adapted to move a tape trained thereabout into driving contact with the backward drive capstan 28, while the tape moving pulley 34 is adapted to move a tape trained thereabout into driving contact with the forward drive capstan 30. As will be pointed out more fully as the description hereof proceeds, the tape moving idler pulleys 32 and 34 are mounted on a common linkage system which is designed to impart the proper related movement to the pulleys for selectively driving a tape either in a forward or a backward direction through the tape head 16.

A non-rotary stop capstan is also associated with each of the tape moving idler pulleys, so that these pulleys may be moved into contact with their related stop capstans to hold the tape stationary. Thus, the idler pulley 32 has associated therewith a stop capstan 36 which shall be designated herein as the forward stop capstan, and the tape moving idler pulley 34 has associated therewith a stop capstan 38 which shall be designated as the backward stop capstan.

The mechanism for driving the tape reels 10 and 18 may now be referred to in connection with Figs. 3, 4 and 5 of the drawings. The spindles 12 and 20 are mounted for rotation in a frame member 40. The spindle 12 has mounted thereon a file reel brake 42, an electromagnetic reeling clutch 44 and an electromagnetic unreeling clutch 46.

The machine reel spindle 20 has mounted thereon an electromagnetic machine reel brake 48, an electromagnetic unreeling clutch 50 and an electromagnetic reeling clutch 52.

The drive rings of the clutch elements 44—52 are adapted for continuous rotation under the influence of the drive motors 22 and 23.

By reference to Fig. 3 of the drawings it will be seen that the drive motors 22 and 23 are mounted on supporting structures 54 and 56, respectively, in such position that the motor shafts 58 and 60 respectively extend forwardly into substantially vertical alignment with their related magnetic clutch structures.

By reference to Fig. 4 of the drawings it will be seen that the first pair of clutches 44 and 50 are in substantial, transverse alignment on their respective shafts and that the second pair of clutches 46 and 52 are also in substantial, transverse alignment on their respective shafts. The clutches 44 and 50 are driven in a counterclockwise direction by the motor 22 through a drive belt **22*a*, while the clutches 46 and 52 are driven in a clockwise direction by the motor 23 through a drive belt 23*a*, the motor shaft 58 having a normal clockwise rotation and the motor shaft 60** having a normal counterclockwise rotation.

Noting Fig. 2 of the drawings, it may be seen that the file reel 10 is disposed for reeling tape thereon when driven in a counterclockwise direction, while the machine reel 18 is disposed for tape winding upon clockwise rotation. In light of this arrangement, the clutch 44 operates as a reeling clutch for the file reel 10, while the clutch 50 operates as an unreeling clutch for the machine reel 18. By the same token the clutch 46 operates as an unreeling clutch for the file reel 10, while the clutch 52 operates as a reeling clutch for the machine reel 18.

The file reel brake 42 and the machine reel brake 48 each has the outer shell thereof fixed to the frame member 40 by means of machine screws 62, thereby providing an anchor for these shells when either brake is energized to lock its respective shaft against rotation.

Fig. 5 of the drawings illustrates the specific nature of the brake and clutch units. These units are of identical structure, and a description of the clutch 50 will therefore suffice as a description of all. The driving member 64, including the ring or shell 50, is mounted on the shaft 20 for free rotation thereon. The driving member includes an end plate 66 in which is mounted a pair of commutator rings 68 which provide a current path for an electromagnetic coil 50*a* mounted within an annular recess in the driven member 64 and held therein by an annular plate 72. The opposite face of the structure has fixed thereto a closure plate 74. Suitable hub rings 76 support the driving member for rotation on the shaft 20.

A driven member 78 is spaced from and disposed between the annular plate 72 and the closure plate 74. The driven member 78 is keyed to the shaft 20 by means of a suitable keying structure 80.

It will be apparent now that when the driving member 64 and the driven member 78 are caused to rotate in unison, drive will be imparted to the shaft 20. Such drive coupling is achieved through the use of iron powder disposed between the driving member 64 and the driven member 78. The circumference of the annular plate 72 is such that its periphery is spaced from the inner wall of the recess formed in the driving member 64. This in effect forms an annular channel adapted to receive an inturned flange 84 of the driven member 78. The inturned flange 84 is so positioned as to provide a substantially equal space on opposite faces thereof in reference to the oppositely disposed walls of the annular channel. Iron powder in a sufficient amount to substantially fill the remaining space of the channel will serve to "freeze" the iron powder and thereby clutch the inturned flange 84 of the driven member 78 to the driving member 64 of the clutch structure whenever the coil 50*a* is energized.

The commutator rings 68 are in contact with a brush 94 carried on the end of a resilient contact strip 96 which is connected into the control circuit by means of terminal screws 98 (Fig. 4).

The clutches at the rear end of the spindles 12 and 20 are of the same construction as that described hereinabove, and their mounting on their respective shafts is the same except that they are reversed so that the end plate 66 is oppositely disposed to present the commutator rings in a more accessible position. The brake assemblies 42 and 48 are also constructed exactly like the clutch assembly just described, and the manner of mounting these on their respective shafts is also the same with the exception that the end plate 66, and consequently the shell or what would correspond in the clutch assembly to the driven member, is held stationary. It now follows that the energization of the coils in the several clutch assemblies will result in the corresponding forward or backward drive of the respective spindles 12 and 20. By the same token these spindles will be held against rotation whenever the coil in the brake assembly associated therewith is energized. Since the shells of the brakes 42 and 48 are fixed, the leads for energizing the electromagnetic coils therein may be taken through the end wall of the brake assemblies. As will be seen at a later point herein, the control circuit is such that drive through either of the clutches on a drive spindle will take place only upon deenergization of the associated brake assembly coil, and that ordinarily the coil in the brake assembly will be energized to hold its associated spindle against rotation when the clutch coils are deenergized.

It has been mentioned heretofore that the position of the tape loops in control columns 24 and 26 is utilized to control the rotary movement of the tape reels. Herein, by way of example, there has been illustrated a vacuum switch control system for achieving this objective. The control columns 24 and 26 are of the same construction, each comprising a pair of side walls 100, a back panel 102, a transparent face panel 104 and a bottom wall, all joined together in air-tight contact.

At the base of the columns 24 and 26 is a header 108 with which the columns communicate. The header 108 is connected with a vacuum pump 110 adapted to be driven by a suitable motor VPM. The foregoing provides a structure by means of which the control columns 24 and 26 may be evacuated when the upper ends thereof are closed against the atmosphere.

At the upper end of each control column is a guide plate 112, whose arcuate lower face is slightly spaced from a corresponding arcuate upper edge of the transparent face panel 104. The lateral extremities of the guide plate 112 serve to support the opposite bights of a tape loop within the control column and the arcuate slot formed between the lower arcuate face of the guide block, and the upper edge of the face panel constitutes a guide through which a taper loop may be threaded for insertion into the control column.

The side walls 100 of the vacuum columns 24 and 26 are of a width not substantially greater than the width of the tape 14. When a tape loop is formed, therefore, in either of the vacuum columns 24 or 26, the oppositely disposed marginal edges of the loop will be in substantial contact with the base plate 102 and the face plate 104 of the respective vacuum columns. The back of the tape in the tape loop is spaced from the side walls of the vacuum columns through substantially the entire length of the loop but the bight of the loop is in substantial contact with the side wall. This disposition of the tape loop within the vacuum colums 24 and 26 is assured by the tape guide structure.

As the tape comes from the file reel 10, it passes over a guide idler 10*a*. As the tape is fed to and from the machine reel 18, it too passes over a guide idler 18*a*. The idlers 10*a* and 18*a* may be designated the "left tape roller" and the "right taper roller," respectively. The purpose of these rollers will appear when the tape drive controls are more fully described at a later point herein.

Spaced along the length of each of the control columns 24 and 26 are two vacuum operated switches. In Fig. 1 of the drawings the vacuum switch LUV is the left upper vacuum switch, while the switch LLV is the left lower vacuum switch. In similar fashion the control column 26 has a right upper vacuum switch RUV and a right lower vacuum switch RLV.

The vacuum switches have a normally closed contact point and a normally open contact point. The switches communicate with the interior of their respective control columns through apertures 102*a* in the back plate 102 thereof.

During normal operation of the machine, the tape loops in columns 24 and 26 will be disposed between the switches RUV—RLV and LUV—LLV of the respective column pairs. Under these conditions the switches LUV and RUV are subject to atmospheric pressure only, whereas switches LLV and RLV are influenced by vacuum in the columns 24 and 26, the tape loops constituting a column air seal above the switches LLV and RLV.

The device is so designed that the tape loops in the control colums 24 and 26 are maintained between the respective upper and lower vacuum switches. To this end the vacuum switch LUV is in the control circuit of the magnetic coil in the unreeling clutch 46, while the vacuum switch LLV is in the control circuit for the magnetic coil of the reeling clutch 44. In like manner the vacuum switch RUV is in the control circuit of the unreeling clutch 50, while the vacuum switch RLV is in the control circuit for the reeling clutch 52.

Should either tape loop drop below its lower vacuum switch, such switch will be subject to atmospheric pressure, causing the contact point thereof to transfer. Consequently, under such conditions the switch LLV will call into action the file reel reeling clutch 44 and the switch RLV will call into operation the machine reel reeling clutch 52.

Such tape loops will be taken up by the reeling action of the respective reels, or either thereof, until the bight of the loop is above the lower control column switch, whereupon the switch will again transfer its contact points under influence of vacuum within the column.

In like fashion the upper vacuum switches LUV and

RUV which are subjected to atmospheric pressure on both sides during normal operation of the machine will transfer their contact points when the bight of the tape loop rises above these switches. Under these conditions the upper switch will be subject to the vacuum within their respective control columns and the points will transfer. Upon such transfer the switch LUV will serve to energize the coil in the unreeling clutch 46, and the switch RUV will call into action the unreeling clutch 50, whereby the file reel 10 and the machine reel 18 respectively, or either one of them, will be rotated to unreel tape therefrom and thereby lengthen the loop in the control columns 24 and 26 respectively until the bight thereof once more drops below the upper switches LUV and RUV.

From the foregoing it will be seen that the operation of the tape reels 10 and 18 is in effect a self-compensating operation whereby the tape loops in the control columns 24 and 26 are maintained in an optimum position. Furthermore, it is apparent that the controls for the reels 10 and 18 are independent one from the other.

The second contact point of each vacuum switch is used to provide a circuit for their respective brake coils. When the control circuit is described, it will appear that a circuit is established through closed points of switches LUV and LLV to energize the coil of the file reel brake 42 and that a circuit is provided through closed points of switches RUV and RLV to energize the coil in the machine reel brake 48. It is intended that the brake coils be energized whenever the reeling and unreeling clutches are deenergized.

The mechanism, conditioned for driving the tape through the tape head 16 in a forward direction, is shown in Fig. 6 of the drawings. Figs. 7 through 9 diagrammatically illustrate the other drive and stop positions of the mechanism. The drive capstans 28 and 30 are constantly driven by means of a motor 112 (Fig. 3) whose shaft 114 rotates in a clockwise direction. The drive capstans 28 and 30 are journalled for rotation in the face panel 13 of the machine, and the shafts 28*a* and 30*a* extend to the rear of the panel 13, where they have affixed thereto belt pulleys 116 and 118 respectively. A drive belt 120 is trained about the pulleys 116, 118 and about a motor shaft pulley 122, so that upon clockwise rotation of the motor shaft 114 the capstan shaft 28*a* will be rotated in a clockwise direction, while the capstan shaft 30*a* will be rotated in a counterclockwise direction. This is accomplished by the use of an idler pulley 124 mounted on a spring-biased lever 126.

By reference to Fig. 6 of the drawings it will be seen that the tape moving idler pulleys 32 and 34 are mounted for rotation at the free end of levers 128 and 130 respectively. The inner ends of the levers 128 and 130 are fixed to pivot shafts 132 and 134, respectively. The pivot shafts 132 and 134 are journalled for rocking movement in the face panel 13, and each of these shafts has attached thereto a short, upwardly extending link 136 and 138 respectively. The inner, free ends of the links 136 and 138 have pivoted thereto levers 140 and 142 respectively, which have their opposite ends pivoted to a common operating lever 144.

With the foregoing structure the tape moving idler pulleys 32 and 34 may be selectively engaged with their related drive and stop capstans. Thus the tape moving idler pulley 32 may be brought into contact with the backward drive capstan 28 or with the forward stop capstan 36. The tape moving idler pulley 34 may be selectively engaged with the forward drive capstan 30 or with the backward stop capstan 38.

In order to impart controlled movement to the tape moving idler pulleys 32 and 34, there has been provided herein forward-backward control mechanism 146 comprising a high speed forward bias relay 146*b* and a high speed backward bias relay 146*a* and a Stop or Go moving clutch coil 148 which consists of a coil 150 in a field of high flux density caused by a permanent magnet 152. The high speed bias relay coils 146*a* and 146*b* are mounted on a supporting yoke in axial relation to each other and with the provision of a space between the magnets to accommodate a pivoted armature 154 to the free end of which the operating lever 144 is attached by means of a pivot stud 156.

The coil 150 of the moving clutch coil combination has affixed thereto a rod 158 which is connected to the operating lever 144 midway between the connections of the levers 140 and 142.

When the relay magnet 146*b* is energized, the armature 154 will be attracted thereto and the operating lever 144 will be biased to the right in Fig. 6. This elevates the tape moving idler 32 a half gap width above the tape moving idler 34. When the moving clutch coil 148 is energized to repel the coil 150 thereof, an upward thrust will be delivered to the rod 158. This will further move the drive linkage to force the tape moving idler pulleys downwardly and outwardly until the tape moving idler pulley 34 is engaged with the forward drive capstan 30. This will cause the tape 14 to be driven through the head 16 in a forward direction and downwardly into the control column 26.

The foregoing describes one of four stable positions into which the tape moving idler pulleys may be biased. The three other positions are illustrated in Figs. 7, 8 and 9 of the drawings.

Fig. 7 shows the position of the tape moving idler pulleys for stopping tape feed following forward feed of the tape. At this point it may be appropriate to mention that the tape is always pulled through the tape head 16 and is stopped by braking the tape at a position behind the tape head 16. This will insure sufficient tape tension at the tape head 16 at all times.

Reverting to Fig. 7 of the drawings it will be seen that the tape 14 is stopped by engaging the tape between the forward stop capstan 36 and the tape moving idler pulley 32. To achieve this function, the magnet 146*b* must remain energized, but the flow of current through the moving clutch coil 148 is reversed whereby the coil 150 is attracted to the permanent magnet 152. This results in a downward pull on the rod 158. Such pull on the linkage system will tend to raise both tape moving idler pulleys 32 and 34, but since the tape moving idler pulley 32 in the forward drive position was higher than the pulley 34, the idler pulley 32 engages the forward stop capstan 36 to brake tape movement. Engagement between the tape moving idler pulley 32 and its forward stop capstan 36 results from the upward bias given to the tape moving idler pulley 32 under the influence of the magnet 146*b*.

In Fig. 8 of the drawings, the tape 14 is moving in the backward direction. To bias the tape moving idler pulley 32 into contact with the reverse drive capstan 28, it is necessary to energize the magnet 146*a*. This attracts the armature 154 and pulls the operating lever 144 to the left in Fig. 8. This will serve to drop the tape moving idler pulley 32 one half gap below the idler pulley 34 and condition the tape moving idler pulley 32 for engagement with the reverse drive capstan 28 when the moving coil 148 is energized to cause an upward movement of the rod 158. Such movement will serve to project the tape moving idler pulley 32 into engagement with the reverse drive capstan 28, whereby the tape 14 is driven in the backward direction, i.e. from right to left in Fig. 1 of the drawings.

The reverse stop position of the tape drive mechanism is shown in Fig. 9 of the drawings, wherein the tape moving idler pulley 34 is brought into engagement with the reverse stop capstan 38. To achieve this engagement, the magnet 146*a* must remain energized but the current in the moving coil 148 is reversed, whereby the coil is pulled downwardly so that the rod 158 exerts a downward pull on the operating lever 144 with a consequent upward bias of the tape moving idler pulley 34 into contact with the reverse stop capstan 38.

The tape head 16 (see particularly Fig. 10 of the drawings) has a cover 160 pivoted on a block 162 which is attached to the rear face of the machine panel 13. Immediately to the rear of the tape head 16 and slightly thereabove is an aperture 164 through the face panel of the machine, providing passage for a rearwardly projecting extension 166 of the reading head cover 160. By reference to Fig. 10 of the drawings it will be seen that the cover 160 is pivoted on the block 162 by means of a pivot pin 168 about which the cover may rock into open and closed position in respect to the head 16.

From the foregoing it will be apparent that whenever the operating handle 170 is rotated to a vertical position such as that shown in Fig. 10 of the drawings, the tape head cover 160 will be opened through stud 172, operating link 174 and the rearwardly projecting cover extension 164. With the mechanism in open or elevated position, a spring 176 will hold the parts in such position to permit the changing of reels and threading of tape as may be required.

*Manual controls*

It has been stated heretofore that the tape units are adapted for both manual and automatic control. A description of the simpler manual controls at this point will provide an understanding of certain of the tape drive functions which will render easier an understanding of the automatic controls which are more complicated.

Assuming that power has been turned on by closing the line switch LS in Fig. 11, it is necessary to reset the tape unit. Such resetting is accomplished by lowering and raising the stop bar 179 located on the control panel at the front of the unit (Fig. 1). By reference to Fig. 12, it will be seen that manipulation of the stop bar 179 will energize the Left Tape Sense Relay 9(109) which is held in by its own contacts 9(109)BL. If the door switch interlock 180 (Fig. 13) is closed as shown, transfer of the Left Tape Sense Relay contacts 9(109)AU will energize a heavy duty relay HD3.

When the heavy duty relay HD3 is energized, it will close its HD3–1 points (Fig. 11) and thereby energize the vacuum pump motor VPM. At such time that the vacuum in the header and in the vacuum columns reaches its proper level, the safety vacuum switch 182 (Fig. 13) will close to energize a pair of Run Relays 6(106) and 7(107). These relays perform the following functions: (1) Contacts 6(106)AL and 6(106)BL (Fig. 14) will close to thereby energize heavy duty relays HD1(101) and HD2(102). The heavy duty relays are in the control line of the capstan motor and of the reel motors 142 and 22 and 23, respectively (Fig. 11). Therefore, when heavy duty relays HD1(101) and HD2(102) are energized, their points HD1–1 and HD2–1 will close, thereby supplying power to the capstan motor 142 and to the reel motors 22 and 23, thereby causing these motors to run. (2) Contacts 7(107)AL and 7(107)BL (Fig. 14) prepare the magnetic clutch controls for operations. (3) Contacts 7(107)AU (Fig. 13) are closed, thereby preparing the Ready Relays 1(101) and 2(102). (4) Contacts 7(107)BU (Fig. 13) is closed, thereby preparing the Load-Rewind Relay 8(108) for use.

In Fig. 11 there has also been shown only diagrammatically a transformer T, which is supplied by the 115 volt A.C. current and whose output is a +40 volt current from which the various relay and electronic circuits of the tape unit are energized.

After the reel motors 22 and 23 have attained an operating speed, depression of the Calculator button 184 will energize the Ready Relays 1(101) and 2(102). These relays are held in by their hold contacts 1(101)AU (Fig. 13). When the Ready Relays 1(101) and 2(102) are energized, their contact 2(102)BL is opened, which deconditions the Load-Rewind Relay 8(108) since it is not desired to operate this relay when under control of the Calculator.

By reference to Fig. 15 it will be seen that the Ready Relay 1(101) also controls the circuit containing the Backward Run Button 186 and the Forward Run Button 188. When the Ready Relay 1(101) is energized, its points 1(101)BL and 1(101)AL (Fig. 15) are closed. Closure of these points renders effective the Backward Run Button 186 and the Forward Run Button 188. Contact 1(101)BU (Fig. 13) is also closed upon energization of the Ready Relay 1(101), thereby closing the current to a Ready Light 190. Contacts 2(102)BU (Fig. 13) are opened upon energization of the Ready Relay 2(102), thereby placing the moving clutch coil circuit under electronic control responsive to a GO trigger in the Tape Motion Control circuits, as to be more specifically described hereinafter. Energization of the Ready Relay 2(102) also transfers its contact 2(102)AL (Fig. 12) which turns on a trigger 192 which, through its cathode follower 194, has an output signal TU Ready. At this point the tape unit is conditioned for automatic control by the Calculator.

*Manual feeding.*—When the tape unit is under manual control, i.e. Ready Relays 1(101) and 2(102) (Fig. 13) are deenergized, depression of the Feed Button 196 (Fig. 13) will cause +150 volts to be placed on the grid of an inverter 198. This will cause the tape to move in the direction predetermined by the setting of the Backward Bias-Forward Bias Relays (Fig. 15), the energization of which will be described later. The tape will continue to move only so long as the Feed Button 196 is depressed. If the Backward Run Button 198 (Fig. 15) is depressed, it is seen that the −150 volts are removed from the left grid of a trigger 200. This causes the left plate of trigger 200 to conduct which, through its cathode follower 202 and an inverter 204, causes the Backward Bias Relay 146*a* to be energized. At the same time the output of the trigger 200, by way of a cathode follower 202 and an inverter 206, energizes a Backward Status Relay 208. Hence the tape is physically positioned to move in a backward direction through the read-write head 16 upon receipt of a Go signal in the moving clutch coil 148 (Fig. 13).

If the Forward Run Button 188 is depressed, it removes the −150 volts from the right grid of trigger 200 causing the right plate to conduct. This in turn causes the Forward Bias Relay 146 to be energized by way of a cathode follower 210 and an inverter 212. Thus the tape drive mechanism is positioned to move the tape in a forward direction upon receipt of a Go signal at the moving clutch coil 178 (Fig. 13).

*Manual rewinding.*—It may be appropriate to note at this point that the magnetic tape is attached to the file reel by means of a relatively short metal leader and to the machine reel by means of a relatively long metal leader. The short metal leader at the file reel end of the tape must be long enough to reach from the hub of the file reel 14 to a Left Tape Sense Idler 10*a* (Fig. 1). The relatively long metal leader between the hub of the machine reel 18 and the machine reel end of the tape 14 is of such length as to contact not only the Right Tape Sense Idler 18*a* but to extend through the tape columns 24 and 26 and through the intermediate Read-Write Head 16, so that it can contact the Left Tape Sense Idler 10*a* while still maintaining a normal position within the vacuum columns 24 and 26. The full import of this arrangement will be described presently.

Manual rewinding may be regarded as the operation of winding the magnetic tape onto the file reel until such point is reached that the long metal leader on the machine reel touches the Right Tape Sense Idler 18*a*. This is accomplished by placing the tape in Backward Status. If the Load-Rewind Button 214 (Fig. 13) is depressed, the Load-Rewind Relay 8(108) (Fig. 13) will be energized. Contacts 8(108)BL will transfer to hold the Load-Rewind Relay 8(108). Contacts 8(108)BU (Fig. 13) will be transferred to place +150 volts on the input grid of the inverter 198 in the moving clutch coil circuit.

This will result in a Go signal applied to the moving clutch coil 178, and this will cause the tape to move backward since the Backward Bias Relay 146a is energized. When the short metal leader on the machine reel touches the Right Tape Sense Idler 18a (Fig. 12), the grid of an inverter 216 is grounded. This causes a Right Tape Sense Relay 218 to be energized. The Right Tape Sense Relay when energized transfers its contacts 3(103)AL (Fig. 12), causing a trigger 220 to be turned On, thereby generating the signal Rewound. However, it is important to note that this signal plays no part in the stopping of the tape under manual control.

Contacts 3(103)AU (Fig. 13) under control of the Right Tape Sense Relay 218 (Fig. 12) transfer to break the Load-Rewind circuit, causing the relay 8(108) to be deenergized. This causes contacts 8(108)BU (Fig. 13) to be opened, removing the positive potential from the inverter 198 so that the moving clutch coil current switching circuit is energized in the Stop direction, thereby causing the tape to stop. It must be noted that the tape may not be placed under the control of the calculator at this point, due to the Right Tape Sense Relay contact 3(103)BL (Fig. 13) deconditioning the circuits of Ready Relays 1(101) and 2(102).

*Unloading.*—Unloading is the process of preparing the magnetic tape for the changing of a file reel. This is accomplished by threading the long metal leader on the machine reel through the tape read-write head to the Left Tape Sense Idler 10a so that after the reel is changed no rethreading of the tape is required. It is not desired to move the metal leader through the read-write head 16 with the head cover down, because of the danger of damaging the read-write coils; consequently, the head cover becomes a switching medium. In Fig. 13 raising the head cover causes the normally open head cover switch 222 to be closed. Thus, if the Right Tape Sense Relay 218 is energized upon contact of the long metal leader with the Right Tape Sense Roller 18a so that its contact 3(103)AU (Fig. 13) is closed, depression of the Load-Rewind Button 214 (Fig. 13) will cause the Load Rewind Relay 8(108) to be energized. Again, contacts 8(108)BU (Fig. 10) transfer to cause the tape to move, +150 volts being impressed on the inverter 198 and thus on the moving clutch coil circuits of Fig. 16. Assuming the tape to have been in Backward Status, motion will continue until the long metal leader grounds the Left Tape Sense Idler 10a (Fig. 12). Now, since the tape is in Backward Status and the Right Tape Sense Relay is still energized, an inverter 224 (Fig. 12) will be rendered conductive by grounding it through the Left Tape Sense Idler 10a, cutting off an inverter 226, thereby deenergizing the Left Tape Sense Relay 228 (Fig. 12).

The Left Tape Sense Relay 228 controls normally closed contacts 9(109)AU (Fig. 13), and when the relay is energized these contacts are opened, thereby breaking the circuit to the heavy duty relay HD3 as well as the circuit of the two Run Relays 7(107) and 6(106). Dropping of these relays causes the vacuum motor to stop and all running controls to be removed. Thus, the tape unit is conditioned for the removal and replacement of a file reel.

*Loading.*—Loading is the function of moving the tape, after a file reel has been changed, to the position where the head cover may be closed and the tape unit may be put under the control of the calculator, i.e. the position in which neither metal leader touches either of the Tape Sense Idlers 10a or 18a.

Assuming that the Left Tape Sense Relay 228 (Fig. 12) has been deenergized, with the long metal leader still in contact with the Right Tape Sense Idler 18a as a result of the previous unloading function, it is necessary to place the tape in Forward Status to allow the Left Tape Sense Relay to be energized, i.e. negative potential applied to the inverter 224 (Fig. 12) since the metal leader is still touching the left roller. At this time depression and raising of the stop bar 179 will cause the Left Tape Sense Relay 228 to be energized and held through its own 9(109)BL contacts (Fig. 12).

If the Load-Rewind Button 214 (Fig. 13) is depressed, the Load-Rewind Relay will be energized from the +40 volt line through the transferred contacts of the Right Tape Sense Relay points 3(103)AU, through the now closed head cover switch 222, through the Ready Relay contact 2(102)BL, through the now closed Load-Rewind Button contact 214 and the Run Relay contact 7(107)BU. The Load-Rewind Relay 8(108) again holds itself through its own contacts, and contacts 8(108)BU (Fig. 13) again close to cause the tape to move. Motion of the tape continues until the Right Tape Sense Idler 18a is no longer grounded. At this point the Right Tape Sense Relay (Fig. 12) will be deenergized and contacts 3(103)AL (Fig. 13) will open to stop the tape. At the same time contact 8(108)BL (Fig. 13) will be opened to fully deenergize the Load-Rewind Relay 8(108). If at this time the head cover is closed, the head cover switch 222 will be transferred and the tape may be placed under control of the calculator.

*Sensing the physical end of the tape.*—It is possible that the operator may inadvertently attempt to use more tape than contained on a tape reel. If this contingency should happen at the time the file reel no longer has a supply of tape thereon, the short metal leader in the file reel end of the tape will ground the Left Tape Sense Idler 10a. Since the tape is moving in Forward Status and no metal leader is touching the Right Tape Sense Roller 18a, the Left Tape Sense Relay 228 (Fig. 12) will be deenergized, thereby opening its 9(109)AU point (Fig. 13), thus deenergizing the heavy duty relay HD3 and the Run Relays 7(107) and 6(106), shutting off the vacuum and removing all controls. Thus the calculator will be unable to use the tape, and the visual indication to the operator will be that the calculator is not operating. To manually rewind after this point has been reached, it is only necessary to place the tape in Backward Status, reset the controls by way of the stop bar 179 and depress the Load-Rewind Button 214, thus causing the tape to rewind.

*Tape reel control*

During the time that the tape 14 is actually being fed through the tape head 16, it is under control of the vacuum switches LUV, LLV, RUV and RLV (Fig. 14). As explained heretofore, these switches are sensitive to the pressure within the columns 24 and 26, and control the brake and clutch mechanism shown in Figs. 4 and 5 of the drawings.

Whenever the tape reels 10 or 18 are at rest, they are under control of their respective brakes 42 and 48. In Fig. 14 the coils of the brakes and clutches are indicated by the reference numerals 42a, 44a, 46a 48a, 50a and 52a. Coil 42a is the brake coil for the file reel spindle, coil 44a is the take-up coil for the file reel spindle and coil 46a is the unreeling coil for the file spindle. Coil 48a is the brake coil for the machine reel spindle, coil 50a is the unreeling coil for the machine reel spindle, and coil 52a is the take-up coil for the machine reel spindle.

Whenever the tape reels 10 or 18 are at rest, they are under control of their respective brakes 42 and 48 which are controlled by the coils 42a and 48a, respectively. These brake circuits are energized as soon as power appears on the +40 volt line and even before transfer of the Run Relay. In such case the brake magnet 42a is energized from the +40 volt line through the untransferred R–1 point, the closed left reel release contact LRC and through the brake magnet 42a to ground. The brake magnet 48a is energized by a circuit from the +40 volt line through the untransferred R–2 point, through the right reel release contact RRC, through the brake magnet 148a and to ground.

When the run relay 7(107) is energized, it transfers its R–1 and R–2 points. Thereafter the energizing circuit for the brake magnets 42*a* and 48*a* is through the respective vacuum switch structures. Let it be assumed that the tape loops now occupy a normal, relatively stable position between the vacuum switches LUV and LLV in column 24 and between RUV and RLV in column 26. When the loops are thus positioned, the vacuum switches LUV and RUV are subject to atmospheric pressure, and the vacuum switches LLV and RLV are subject to the rarified atmosphere under the tape bights. Under these conditions the brake magnet 42*a* will be energized by current from the +40 volt supply line, through the now transferred run point R–1, through the normally closed left upper vacuum switch point LUV–1, through the transferred point LLV–2 of the left lower vacuum switch LLV which is now subject to the rarified atmosphere within the column 24, through the left reel release contact LRC, the brake magnet 42*a* and ground.

Energization of the brake magnet 48*a* under these same conditions is effected from the +40 volt line, through the transferred contact R–2, the normally closed RUV–1 contact of the right upper vacuum switch RU, through the transferred point RLV–2 of the right lower vacuum switch RLV, the vacuum switch RLV now being subject to the rarified atmosphere in the vacuum column 24, through the normally closed right reel release contact RRC, the brake magnet 48*a* and ground.

Should the tape loop in the vacuum column 24 rise above the left upper vacuum switch LUV, that switch will be subject to the rarified atmosphere in the vacuum column 24 with the result that its LUV–1 point will be opened and its LUV–2 point will be closed. The energizing circuit to the brake magnet 42*a* is broken when the LUV–1 point is open and the circuit to the unreeling clutch magnet 48*a* is closed. The magnet 46*a* will be energized from the power line through the transferred R–1 point, the now closed LUV–2 point of the left upper vacuum switch LUV to provide a circuit for the energization of the unreeling magnet 46*a*.

When the tape loop in column 24 drops below the left lower vacuum switch LLV, that switch will be subject to atmospheric pressure with the result that its contact LLV–2 will be open and its contact LLV–1 will close. The first effect of this transfer is the breaking of the circuit from the brake magnet 42*a* which is through the LLV–2 point of the switch. Thereafter, upon closure of thee LLV–1 point of the left lower vacuum switch, a circuit is provided for the reeling clutch magnet 44*a*, this circuit being from the +40 volt line through the transferred R–1 point, the normally closed LUV–1 point of the upper vacuum switch LUV, through the now closed LLV–1 point of the left lower vacuum switch LLV to the clutch magnet 44*a* and to ground.

The function of the vacuum switch RUV and RLV in the vacuum column 26 is precisely the same as that described in connection with the switches in the vacuum column 24. It is believed that the description thereof need not be labored in this specification, since an understanding of the operation should be clear from the specific description given in connection with the vacuum switches in the vacuum column 24. It is sufficient to say that as the tape loops in the respective vacuum columns rise, the upper vacuum switch LUV and RUV will be subject to rarified atmosphere in the column, since the tape bights now seal off the column above the upper vacuum switches and permit the vacuum system to rarify the columns below the tape bights and thereby influence the upper vacuum switches. This will cause the transfer of the upper vacuum switch points whereby the unreeling clutches 46*a* and 50*a* are energized to supply tape to the vacuum columns. By the same token, when the tape loops drop below the lower vacuum switches LLV and RLV, these switches which have been subjected to vacuum within the respective columns 24 and 26 will transfer their points to establish an energizing circuit for the reeling clutch magnets 44*a* and 52*a*.

At such time that the reeling or unreeling clutch magnets are deenergized, the circuit is such, as pointed out hereinbefore, that the brake magnets 42*a* and 48*a* are energized to lock the reels 10 and 18 respectively against rotation. It remains to be noted, however, that the reels 10 and 18 may be selectively released from the influence of their brakes by breaking the energizing circuit through the opening of the reel release contact LRC which is provided for the control of the brake magnet 42*a* or the right reel release contact RRC which is provided for the control of the brake magnet 48*a*.

*Automatic tape control—Brief description*

The calculator makes use of the tape units in order to store large amounts of information on tape. The calculator must also be able to call for this information at the proper time in the solution of a problem in order that the tape units be useful as input-output devices. For these requirements to be fulfilled, the tape unit must come under the control of the calculator whenever it is desired to read-out information from the calculator to the tape or to read-in information from the tape to the calculator. Signals which represent logical decisions must be transmitted from the main calculator frame to the individual tape unit and vice versa, in order to synchronize the relatively slow wiring or reading of tape with the high internal operating speed of the main calculator.

A plurality of identical tape units may be employed, as stated, in connection with and controlled by a single calculator. One such unit and its control circuitry is disclosed herein. All tape circuits, which are logically common to each tape unit, and of which no two signal lines which represent logic can be energized +10 volts at the same time to different tape units, are located within the main calculator frame. For example the Prepare To Read instruction goes to all tape units, yet only one unit is selected by the calculator by way of the Tape Unit Select signal. Thus, more than one tape unit cannot be reading under control or writing under control of the calculator at the same time. There are certain circuits within each tape unit which are common to each other but are not found in the main calculator. This is due to the fact that the tape unit may be conditioned to act independently of the calculator and it is necessary for each tape unit to control itself under such conditions.

In order to render the tape unit responsive to control of the calculator a set of conditions and restrictions are placed upon the tape system in order that the calculator and the tape units may function as an integrated unit. Consequently, the calculator is adapted to issue certain instructions to any one of several tape units. These instructions are Prepare To Read, Prepare To Read Backward, Prepare To Write, Prepare To Write End Of File and Rewind. The execution of any one of these instructions by the tape unit presents no difficulty if a tape unit is prepared to accept the instruction, since the sole controls that are involved are the moving clutch coil 148 and the Backward-Forward Bias Relays 146*a* and 146*b*, respectively. However, this simple concept of the control problem does not take into account the fact that the tape unit may have just previously been operating in a direction or may have been in a status which is incompatible with the instruction received. Thus, if the last previous operation of a tape unit has been the reading of tape in a forward direction, the instruction Prepare To Read Backward cannot be accepted until the status of the tape unit controls has been changed. As a result of these conditions each tape unit has a group of logical circuits associated within its frame so that the status of that particular unit is set and remembered. This arrangement is a natural consequence of the overall philosophy of the tape circuits with regard to the main calculator in that they perform as an entity.

The tape unit has the necessary electronic circuits to interpret the five input-output instructions from the calculator circuits and set the tape in motion in preparation for reading, writing, or positioning the tape to a starting position. The specific purpose of these electronic circuits in the tape unit controls logic is three-fold. These are: (1) to initiate the starting and stopping of the tape under the read-write heads; (2) to initiate controls which place the tape in either Forward or Backward Status (when the tape is in Forward Status, the tape moves under the read-write heads from left to right and vice versa when it is in Backward Status); and (3) to emit appropriate signals to inform various circuits that the tape is up to speed or that the tape has stopped.

The complex circuits the Tape Motion Control system are the result of the various stipulations that have been placed upon the tape system. Each one of the five commands that the tape can receive from the calculator has a certain implied direction. They are as follows: Prepare To Write implies a forward direction; Prepare To Write End Of File implies a forward direction; Prepare To Read implies a forward direction; Prepare To Read Backward implies a backward direction and Rewind implies a backward direction. Each of the commands received from the calculator has as its end result the setting of the tape in motion by energization of the Backward and Forward Bias Relays **146*a* and 146*b* and the moving clutch coil 148**.

Figs. 18, 19, 20 and 21 when assembled as indicated in Fig. 22 represent the overall Tape Motion and Status Control circuit in block form. In order to present the invention as simply as possible, initial reference will be made to the overall block diagram represented in Figs. 18 through 21, and thereafter the detail description may proceed in respect to the specific components and circuits involved.

In Fig. 18 is represented a Tape Selector 230 which is adapted to receive, under calculator control, certain functional signals for operation on tape and also certain signals concerning the selection of a particular one of several identical tape units. The source of these signals is no part of this invention, but for the purpose of this discussion they may be deemed to originate in an I/O Interlock and Class Selector insofar as the functional signals are concerned, and in an I/O Unit Selector insofar as the tape unit selection signals are concerned. Thus, the Tape Selector 230 receives the signals Tape Write Select, Tape Read Select, Tape Read Backward Select, Tape Write EOF Select, Tape Rewind Select, and it receives the input-output unit selection signals I/O Select (1), I/O Select (2), I/O Select (3) and I/O Select (4).

Throughout the various control units the circuitry consists in large measure of switching and signal mixing circuits. However, it may be appropriate at this point to state generally that certain triggers and relays are employed to indicate and control tape status and motion. In order to focus attention on these respective devices, attention will be directed to them at this point merely by way of identification and location.

The Tape Motion Control II Unit 240 (Fig. 20) contains the Tape Up To Speed trigger, the Tape Stopped trigger and the Go trigger. The Tape Motion Control III Unit 244 (Fig. 20) contains the moving clutch coil 148 and tape drive conditioning relays. The Tape Motion Control IV Unit 252 (Fig. 20) contains the Right Tape Sense Relay and the Left Tape Sense Relay. The Tape Motion Control V Unit 242 contains the Tape Extremes trigger. The Tape Motion Control VI Unit 246 contains the Backward Status Relay, the Backward Bias Relay and the Forward Bias Relay. The Tape Unit Status network 234 (Fig. 19) contains the Read Status Trigger, the Write Status Trigger and the Write EOF Status Trigger. The Tape Select Unit 232 (Fig. 19) contains the TU Connected Status Trigger.

As hereinbefore stated, the moving clutch coil in the Tape Motion Control III Unit 240 (Fig. 20) results in movement of the tape through the read-write heads, and the Backward Bias Relay and the Forward Bias Relay in the Tape Motion Control VI Unit 246 controls the direction of tape through the rear-write heads.

*The case for rewinding.*—Let it be assumed that the instruction is to Rewind and the tape unit to be selected is #1. Under these conditions the functional signal Tape Rewind Select and the unit select signal I/O Select (1) are simultaneously sent to the Tape Selector Unit 230. Tape Rewind Select causes two signals to be generated in the Tape Select 230. These signals are Set TU Rewind Status Bus and Tape Select. The Tape Select signal samples four input-output unit AND circuits in the Tape Selector 230 to determine which tape unit is to be used. In the case presupposed, TU–1 Select becomes positive and is directed to a Tape Select unit 232, where it combines with signals Tape Unit Ready and Tape Stopped to generate an output signal Select Stopped TU. It is important to note that the signal Select Stopped TU is a necessary pre-requisite for any tape to accept an instruction.

Assuming the tape to be in Backward Status, the signal Set TU Rewind Status combines in a Tape Unit Status Control 234 with a signal Backward Status and an instruction Gate Select Stopped TU to generate an output signal Rewind-Disconnect. The Rewind-Disconnect signal is used to reset the selected tape unit to neutral (neither read nor write status) and to cause a Disconnect signal to be generated in a Tape Disconnect unit 236 for transmission to a Tape Motion Control I Unit 238.

At the same time the signal Set TU Rewind Status is gated through the Tape Motion Control I Unit 238 by the instruction Select Stopped TU. Since the tape unit is in Backward Status, not rewound, and not in the process of changing status, the output resulting from the mixing of the signal Set TU Rewind Status and Select Stopped TU is utilized to cause a 10 millisecond starting delay, which is an output signal Starting Delay from the Tape Motion Control I Unit 238.

The leading edge of the signal Starting Delay fires a 56 microsecond single shot multivibrator in the Tape Motion Control II Unit 240 to provide an instruction entry. At the end of the 56 microsecond delay in the signal Tape Stopped, which is an output of the Tape Motion Control II Unit 240, returns to its negative level. The falling of the Tape Stopped signal produces an output signal Go. It blocks the Select Stopped TU gate in the Tape Motion Control V Unit 242, thus preventing the tape unit from accepting any further instructions until such time as the existing instruction is executed, and it turns On a trigger in the Tape Select Unit 232 to produce an output signal TU Connected. The signal TU Connected plays no part in the rewinding logic, and is soon to be turned Off. In the Tape Motion Control II Unit 242 a Take Up To Speed trigger is turned Off at the termination of the 10 millisecond starting delay to generate an output signal Tape Up To Speed.

To this point the following has been accomplished. The instruction Rewind has been accepted and sent to the proper tape unit, it has started the tape to rewind and at the same time it has prepared to disconnect the tape from the calculator, since it is not desired to cause the calculator to wait during the rewinding operation. It will be noted that the Go signal, which is an output of the Tape Motion Control II Unit 240, has energized the moving clutch coil 148 which is in the Tape Motion Control III Unit 244. Thus, since the previous status of the tape unit was backward, energization of the moving clutch coil 148 has resulted in rewinding movement of the tape. It has been pointed out hereinbefore that the moving clutch coil 148 simply causes the tape to move without reference to its direction and that the energization of the Forward and Backward Bias Relays **146*b*** and 146a, respectively, located in the Tape Motion Control VI Unit 246 determines the direction of tape motion. Since the Backward Bias Relay 146 was conditioned as a result of the existing status of the control system backward or rewinding motion of the tape resulted upon energization of the moving clutch coil 148.

By this time it will have been noticed that all of the tape motion and status control output signals from the Tape Selector 230, together with certain other signals, enter control buses 248. The latter group of signals are mixed in the control buses to produce output signals Tape EOR, Tape EOF, Start Tape Write and TU Disconnect. Thus, the disconnect signal is combined in the control buses 248 with a signal Not Changing Delay to generate an output signal TU Disconnect. The signal TU Disconnect is directed by way of Tape Write Control circuits 250 to units (not shown) which disconnect the tape unit from the calculator, thus freeing the calculator for further input-output operation. It has been seen that the calculator has caused the tape to start the rewinding operation and has disconnected the tape unit from the calculator; it now remains to be seen what happens upon receipt of a rewind instruction when the tape unit has a Forward Status.

With the tape unit in a Forward Status, when the instruction Set TU Rewind Status Bus is emitted from the Tape Selector 230, the signal Set TU Rewind from the control buses 248 is gated through the Tape Motion Control I Unit 238 by the signal Select Stopped TU. Here, since the tape unit is in Forward Status, and since it is not in the process of stopping, a 10 millisecond single shot multivibrator is fired and its output signal Changing Delay is directed to suppress tape motion until the physical change from one motion status to another is completed. In this connection it is to be noted by reference to Fig. 6 that the linkage which controls the position of the tape drive rollers is subject to some inertia so that a change from one direction to another is at least not instantaneous.

The leading edge of the Changing Delay signal, which is an output of the Tape Motion Control I Unit 238, is directed to the Tape Motion Control VI Unit 246, where it fires a 56 microsecond sliver-protection single shot multivibrator and reverses a trigger causing the tape to be removed from Forward Status and placed in Backward Status, i.e. by the energization of the Backward Bias Relay 146a. As noted hereinbefore, the Backward Bias Relay 146a and the Forward Bias Relay 146b in the Tape Motion Control VI Unit 246 are used to position the tape idlers (Fig. 6) in such manner that when a Go signal is supplied to the moving clutch coil 148 in Tape Motion Control III Unit 244, the tape will be driven in the desired direction.

After the 10 millisecond delay (while the tape status is being changed), a circuit in the Tape Motion Control I Unit 238 is conditioned to cause an output signal Starting Delay. This signal, by way of the Tape Motion Control II Unit 240, generates the Go signal which is directed to the Tape Motion Control III Unit 244, where it results in tape motion.

While the calculator is involved in other operations, the tape moves backward until the Right Tape Sense Relay in Tape Motion Control IV Unit 252 is picked up. Tape Motion Control IV Unit 252 is composed of the circuitry shown in Figs. 12 and 13, and includes the Right Tape Sense Idler 18a and the Left Tape Sense Idler 10a. When the long metal leader on the machine reel comes in contact with the Right Tape Sense Idler, the Right Tape Sense Relay 218 is picked up by virtue of the fact that the metal leader on the machine reel causes the Right Tape Sense Idler 18a to assume ground potential. When the Right Tape Sense Relay is energized, an output signal Rewound is emitted from the Tape Motion Control IV Unit 252.

Since the tape is now up to speed and in Backward Status, the Rewound signal, directed to Tape Motion Control I Unit 238, will fire a 7 millisecond Stopping Delay single shot whose output is the signal Stopping Delay. The signal Stopping Delay is transmitted to the Tape Motion Control II Unit 240, where the leading edge will fire a 1.6 millisecond Stopping Delay single shot. At the end of the 1.6 millisecond Stopping Delay signal, the signals Go and Tape Up To Speed, which are outputs of the Tape Motion Control II Unit 240, will fall to a negative value. In addition, since the tape unit is not in Write Status, the Stopping Delay signal will result in the production of the signal Tape Stopped, which is also an output of the Tape Motion II Unit 240. The tape unit is now prepared for the acceptance of the next instruction.

In the Tape Motion Control II Unit 240, the input signals Rewound and Backward Status serve no logical function, and their sole purpose is to insure that the Go signal is never emitted when the tape unit is already rewound and in Backward Status. Likewise, the signal TU Ready is not logically necessary and merely insures that the Tape Stopped, the Go and the Tape Up To Speed signals are not emitted unless the tape unit is under control of the calculator.

At the time the tape unit was disconnected, the signal TU Select impressed on the Tape Selector Unit 232 is used therein to return the TU Connected signal to a negative value. Hence, as noted above, TU Connected serves no logical purpose in the execution of the rewind instruction.

*The case for writing.*—When it is desired to write on tape under control of a calculator instruction, the signal Tape Write Select is sent to the Tape Selector 230. This signal results in the generation of three output signals from the Tape Selector 230, namely Set TU Write Status Bus, TU Go Forward Bus, which are directed to the control buses 248, and the signal Tape Select which is used internally to select the proper tape unit, as before described. As before, the TU Select signal from the Tape Selector 230 is set to the Tape Selector Unit 232, where it causes the instruction entry signal Select Stopped TU to be generated.

It is axiomatic that writing cannot take place if the tape unit is in Read Status. The signal Set TU Write Status Bus generated in the Tape Selector 230 is sent to the control buses 248, where it is emitted as the signal Set TU Write Status and directed to the Tape Disconnect Unit 236 wherein, if the tape unit selected is in Read Status, a Disconnect signal is generated. This signal will act as before to disconnect the tape unit from the calculator.

Assuming the tape unit to be not in Read Status, the signal Set TU Write Status enters the Tape Unit Status network 234 where, since the Select Stopped TU signal is positive and the tape is not in Read Status, the signal Set Write Status Trigger is generated. The signal Set Write Status Trigger is used internally within the Tape Unit Status network 234, where it turns on a Write Status Trigger, and it is also directed to the Tape Motion Control I Unit 238, where since the unit is in Forward Status and since it is not in the process of changing status, and since the signal TU Go Forward is positive, there will be produced therein a 10 millisecond output signal Starting Delay, which is fed to the Tape Motion Control II Unit 240 to produce the signal Go. When the Write Status Trigger in the Tape Unit Status network 234 is turned On, a Write Status Relay in the Tape Unit Status network 234 will be energized. Transferral of the Write Status Relay points will cause −100 volts to be placed on the seven tape Write Tubes and the erasing coil, thus enabling both the Write Tubes and the erasing circuit. It is important to note that a spurious noise pulse may be written in each of the seven tracks on the tape when the Write Tubes are energized. Since the erase head is physically located ahead of the read-write heads in the read-write heads unit 256, this noise will be left on the tape at the point where the Write Tubes are turned On. By the same token, a similar spurious noise field may be found at the point on the tape where the Write Tubes were turned Off.

Had the tape initially been in Backward Status, an internal signal Read/Write Set resulting from either signal Set Read Status Trigger or Set Write Status Trigger in the Tape Motion Control I Unit 238 would have been mixed with the signals TU Go Forward, Backward Status and Stopping Delay to produce a 10 millisecond Changing Delay output signal. Had the tape been rewound prior to the rewind instruction, the signal Rewound entering the Tape Motion Control V Unit 242 would combine with the signal Backward Status to provide an output adapted to pulse a Tape Extremes Trigger within the unit 242. With the initial starting delay signal, the Tape Extremes Status Trigger output will fire a 0.3 second single shot multivibrator. The plate output of this multivibrator will cause a 0.6 second single shot multivibrator to be held in the abnormal condition. At the end of the 0.3 second multivibrator pulse, the 0.6 second multivibrator will be released to start a timing cycle. At the same time the Tape Extremes Status Trigger will be reset by the fall of an internal signal Partial EOF Delay.

An output signal from the Tape Motion Control V Unit 242, EOF Delay, will be a negative pulse of 0.9 second duration. This signal is sent to the control buses 248, where the Start Tape Write output signal is suppressed until the 0.9 second delay is complete. The reason for this initial delay upon the initiation of writing is to insure that the noise pulse written when the write heads were turned On has moved a sufficient distance from the heads before writing commences, thus insuring that the spurious noise pulses will not interfere with the reading operation.

The Start Tape Write signal from the control buses 248 is directed to Tape Write Control circuits 250, where if a Copy instruction is awaiting the writing will commence, but if there is no Copy instruction present, the tape unit will be stopped and disconnected as previously explained. The Tape Write Control circuits and their function in conjunction with the Copy signal are the subject matter of another application and need not be described particularly herein since they form no part of the present invention.

If no writing operation is to be performed, the TU Write Disconnect signal from the control buses 248 will be directed to the Tape Disconnect Unit 236. In the Tape Disconnect unit, because the tape unit is connected, there is present the signal TU Connected. The signal TU Write Disconnect and TU Connected are mixed to produce a signal Disconnect. The mixing of the signals TU Write Disconnect and TU Connected also produces a signal Write Disconnect in the Tape Disconnect Unit 236 which will be directed to the Tape Motion Control I Unit 238, wherein it results in the generation of the signal Stopping Delay, which is fed to the Tape Motion Control II Unit 240 wherein it is effective to remove the Go signal from the latter unit's output line, thus physically stopping tape movement.

In the case of writing on tape, it may be seen that although the Go trigger in the Tape Motion Control II Unit 240 is turned Off at the termination of the Stopping Delay signal, the instruction gate Tape Stopped, which is also an output of the Tape Motion Control II Unit 240, will not be reopened until the termination of the 7 millisecond Stopping Delay signal. Thus, 5.4 milliseconds are allowed for stopping in the case of writing on tape before a new instruction may be accepted. While reading from tape, however, a new instruction may be accepted immediately by virtue of the Tape Stopped Trigger of the Tape Motion Control II Unit 240 being turned On (after 1.6 milliseconds) at the same time that the Go trigger is turned Off. Thus, it will appear that the Tape Motion Control II Unit 240 has a high speed function while reading and a relatively low speed function while writing.

*The case for writing end of file (EOF).*—Upon receipt of the instruction Write End of File, the I/O Interlock and Class Selector will emit a signal Tape Write EOF Select, which is directed to the Tape Selector 230. As in the previous operations the signal Tape Write EOF Select causes selection of the proper tape unit and in addition, as in the case of writing, the Set TU Write Status signal is generated and directed to the Tape Disconnect unit 236 as the signal Set TU Read Status by way of the control buses 248. If the tape unit at this instant is in Read Status, a Disconnect signal is generated in the Tape Disconnect Unit 248.

As in the case of writing, the signal Set TU Write Status is also directed to the Tape Unit Status Control Unit 234 to set the Write Status Trigger if it is not already On, and to cause the motion controls of Motion Control I Unit 238 to be energized as before upon receipt of the signal Set Write Status Trigger which is an output of the Tape Unit Status network 234.

If the tape unit is in a Forward Status when the signal Set Write Status Trigger is received in the Tape Motion Control I Unit 238, the signal will result in the output signal Not Changing Delay. If, however, the tape unit is in Backward Status, the signal Set Write Status Trigger will result in the output signal Changing Delay. In either case, as soon as the tape unit is placed in Forward Status by virtue of the Select Stopped TU signal, the fact that the tape is in Write Status will result in the transmission of the signal Write Status from the Tape Unit Status network 234 which, together with the signal Set TU EOF Status originating in the Tape Selector 230 and applied to the control buses 248, will cause the Write EOF Status trigger in the Tape Unit Status network 234 to be turned On. In addition, since it is neither necessary nor desirable to disable the calculator with respect to other input-output units while the Write EOF instruction is being performed, a Disconnect signal is emitted from the Tape Disconnect Unit 236, resetting the class and unit selectors, thus freeing the calculator.

The Write EOF Status signal, which is an output of the Tape Unit Status network 234, is sent to the Tape Motion Control V Unit 242 where it turns on the Tape Extremes Trigger, thus signalling that the tape is in an extreme status. Then, since the tape is in extreme status, the Tape Extremes Trigger emits an internal signal Tape Extremes Status which is mixed in the Tape Motion Control V Unit 242 with the signal Starting Delay to cause the 0.3 and 0.6 second delay circuitry therein to be initiated. Thus, it may be seen that the Write EOF instruction will test the control circuits for Read Status, set these circuits into Write Status, set the Tape Extremes Trigger, start the motion and disconnect the tape from the calculator.

The tape now proceeds through the 0.9 second Write EOF Delay period (the write heads are still turned On and are writing continuous zeros), the end of which period is signified by the output signal Not EOF Delay from the Tape Motion Control V Unit 242. Since the tape is up to speed and in the Write EOF Status at the termination of the 0.9 second delay, the End Write EOF signal will be generated in the Tape Motion Control V Unit 242. The End Write EOF signal now performs two functions. It is directed to the Tape Unit Status network 234, where it resets the tape unit to neutral (neither read nor write) status by resetting the Read Status Trigger and also the Write Status Trigger in the Tape Unit Status network 234. Furthermore, the End Write EOF signal enters the Tape Motion Control I Unit 238, where it fires the 7 millisecond Stopping Delay single shot multivibrator to produce the signal Stopping Delay which is directed to the tape motion control via unit 242, where it results in the stopping of tape feed.

It is important to note that at the time the tape unit is reset to neutral, the Write Status Relay is returned to normal and the erase coil and Write Tubes are disabled. At this point another spurious noise pulse may be written in each of the tape channels. The signal Stopping Delay, as stated above, resets the Go trigger in the Tape Motion Control II Unit 240 and also the Tape Up To Speed trigger of the same unit. While resetting the Go trigger effects stopping, the resetting of the Tape Up To Speed trigger produces a minus pulse which causes the Write EOF trigger to be reset. Thus, the tape is reset to neutral and all status triggers are turned Off.

*The case for reading.*—As before, when the calculator issues a READ instruction, the signal Tape Read Select is directed to the Tape Selector 230. This again, as in the case of writing, results in the selection of a particular tape unit and generates the Tape Selector output signals Set TU Write Status Bus and TU Go Forward Bus.

The signal Set TU Read Status Bus passes through the control buses 248 as the signal Set TU Read Status which is directed to the Tape Disconnect Unit 236. where the circuits are interrogated to determine whether the tape unit is in Write Status. If the tape unit at this instant is in Write Status, the signal Disconnect will be generated and, by way of the control buses 248 and the Tape Write Control unit 250, the tape unit will be disconnected. If, however, the tape unit is in Read or neutral status, Set TU Read Status signal in the Tape Unit Status network 234 will be mixed with the signal Select Stopped TU and an internal signal Not Write Status within the Tape Unit Status network 234 and the resulting output will be the signal Set Read Status Trigger.

In addition, the signal Set Read Status Trigger will be directed to the Tape Motion Control I Unit 238, and if the tape at this time is in Forward Status the signal Starting Delay will be omitted from the Tape Motion Control I unit 238. Had the tape, however, been in Backward Status, an internal signal within the Tape Motion Control I Unit 238, Read/Write Set, would gate the Set Write Status Trigger signal to effect the output signal Starting Delay. Upon the arrival of the signal Starting Delay, the tape motion would be initiated as before and the Read Status Trigger of the Tape Unit Status network 234 would be turned On, thus conditioning the tape reading circuits to accept information from the tape. This is done through the Tape Information Control-Read circuits 258. The Tape Information Control-Read circuits are fully described in the above identified patent of Bartelt and Femmer, and reference to these circuits is herein restricted to their output signal group pulses which are necessary to the function of the tape motion and status controls forming the subject matter of this application.

Had the tape previously been set into an extreme status as by a preceding rewind instruction, the Tape Motion Control V Unit 242 would allow the signal Starting Delay therein to fire the 0.3 second single shot multivibrator, the negative output of which is directed to the Tape Information Control-Read unit 258 and to the EOR Sense circuits 260 to insure that the spurious noise pulses, written at the time the read-write heads were turned On, are not read.

In recapitulation, as to reading, the read instruction has tested the status circuits to determine whether the tape unit is in Write Status, the tape has been set in motion, the Reader Status Trigger has been set On to produce the signal Partial EOF Delay which is utilized if necessary. The tape is now moving and the read-write heads are searching for information. Should information be read from the tape, the EOR Sense circuits 260 will be energized. Every group pulse from the tape is passed through the EOR Sense circuits 260 by the signal Not Partial EOF Delay, in combination with the signal Read Status. This results in the firing of a 32 microsecond group pulse stretcher in the EOR Sense circuits 260. The normal repetition rate of group pulses is 132 microseconds. Therefore, so long as information continues to be received, the group pulse stretcher will be held in abnormal condition. When the physical end of a record is reached, after a period of 400 microseconds during which no information is received from tape, a 400 microsecond single shot multivibrator in the EOR Sense circuits 260 will complete its timing, and this in turn will produce an end of record output signal EOR.

Upon reaching the end of a record and the generation of the EOR signal, two functions follow: (1) the tape is caused to stop by virtue of passage of the signal EOR through the Tape Motion Control I Unit 238 as the signal Stopping Delay; and (2) the EOR signal is also sent to the control buses 248 where, if the tape is still connected (i.e. the reading process being continued and the tape unit being not disconnected), an output signal Tape EOR will be generated and transmitted to the calculator to cause the tape unit to be disconnected.

It may be stated as a general rule that once information is received from the tape, a discontinuity of such information flow for a period of 400 microseconds will indicate the end of record point, at which time the tape will always be told to stop. The signal Stretched Group Pulses, which is an output of the EOR Sense circuits 260 is sent to the End Of File Sense circuits (EOF) 262 wherein so long as this signal is received a trigger therein will be turned On, causing a 30 millisecond single shot multivibrator within the EOF Sense circuits to be held in the abnormal condition (left side conducting).

Every time the tape is started as a result of the Go signal, the signal Tape Stopped, which is an output of the Tape Motion Control II Unit 240 and is transmitted to the EOF Sense circuits 262, will return to a negative level. This negative shift will cause the trigger within the EOF Sense circuits 262 to be turned Off (right plate conducting), thus feeding the 30 millisecond timer in these circuits. If no information is received from tape within 30 milliseconds, the 50 millisecond timer pulse will be mixed with a signal Read Status, which is an input to the EOF Sense circuits, and if the unit is in Read Status an end of file (EOF) signal will be generated. The EOF signal has two functions: (1) it is transmitted to the Tape Motion Control I Unit 238 to cause the tape to stop, and it is also transmitted to the control buses 248, wherein it generates the signal Tape EOF which causes the tape unit to be disconnected from the calculator.

In summary, once information has been received and the tape is again called upon to start, if the tape is still in Read Status after 30 milliseconds and no information is read from the tape during this period, an EOF signal will be generated which will stop tape motion and disconnect the tape unit from the calculator.

*The case for reading backward.*—If the instruction Read Backward is received, a signal Tape Read Backward Select is set into the Tape Selector 230. As before, this instruction will cause the proper tape unit to be selected as explained heretofore in connection with writing and reading in a forward direction, and it will cause the signal TU Read Backward bus and the signal Set TU Read Status Bus to be generated within the Tape Selector 230 and to be emitted therefrom into the tape control buses 248. The Set TU Read Status Bus signal is transmitted to the Tape Unit Status network 234, where if the status of the tape unit is compatible with the signal, the signal Set TU Read Status Trigger becomes an output of the Tape Unit Status Control network 234. From this point the Set Read Status Trigger signal is transmitted to the Tape Motion Control I Unit 238, where the signal TU Read Backward is used in conjunction therewith to produce the output signal Changing Relay providing the tape unit is in the Forward Status. Were the tape unit in Backward Status, the output signal in the Tape Motion Control I Unit 238 would be Starting Delay. In either event the Backward Bias Relay will be energized to cause backward drive of the tape through the read-write heads. Other than this difference in the direction of tape motion, there is no difference between reading in a forward direction and reading backward, the end of record, the end of file and the information handling circuits functioning precisely in the same manner as before.

The Tape Register 264, the Tape Reader and Shaping Circuits 266, the Tape Information Control-Write circuits 268 and the MQ Register 270 have been fully described in the aforesaid patent of Bartelt and Femmer, in which they form a part of the invention claimed. Since they function in connection with the present invention solely for the purpose of detecting the presence of group pulses during reading from tape, they need not be described in detail herein.

*Component circuits*

Before proceeding to the specific description of the control circuits, a brief description of each of the components appearing in the circuits will be given at this time. Subsequently, during the description of the circuits, the detailed operation of the respective components will be presumed to be understood and only their coordinate action with respect to other components will be described herein.

*Slow speed trigger (Ts)*.—Fig. 23 illustrates the block symbol and the circuitry of a slow speed electronic trigger utilized herein. This trigger comprises a dual triode 272 which may comprise a type 5965 tube, the plate of the right hand triode being connected to a +50 volt source by way of two resistors 274 and 276, respectively. Two resistors, each of 5.1 K–1 w. value may be employed when it is desired to provide a tap, as shown, or a single 10 K–2 w. resistor may be employed when no tap is required. The left plate of the dual triode 272 is similarly connected to the +150 volt source. The right plate is also connected to a condenser 278 in parallel with a resistor 280 whose lower junction is connected to the plate output line 282. This lower connection is also connected by way of a resistor 284 to a —250 volt source. The left plate is provided with a similar output connection for feeding a cathode follower.

The plate of the right triode of dual triode 272 is also coupled to the grid of the left triode via condenser 286 and a resistor 288, in parallel, together in series with a resistor 290. The plate of the left triode is similarly connected to the grid of the right triode to thus provide the now well known cross-coupling of an electronic trigger comprising a pair of triodes. As shown, the trigger is flipped Off, in which condition the right hand triode is conducting as indicated by the small circle to the right of the envelope of the right triode. The grid of the left triode is also connected via the resistor 290 in series with resistors 292 and 294 to a source of —250 volts, the junction of the two resistors being connected to an input labeled Manual On, whereby, by manual application of a plus voltage, the trigger may be flipped On. Similarly, the grid of the right triode is connected to an input labeled Manual Off, whereby, by application of a plus potential the trigger may be turned Off which is the status indicated. The flip-flop operation of an electronic trigger is now well known, the trigger being flipped On or Off as desired, the Off condition, as stated above, being that in which the right triode is conducting and the left triode non-conducting. By the application of a minus voltage to the binary input D, such negative voltage is applied to both grids but is effective only on the grid of that triode which is already conducting, to thus block its conduction and render it non-conducting. When reset as shown, a minus voltage applied to the binary input will render the right triode non-conducting and the left triode conducting.

*Key trigger (Tk)*.—In Fig. 24 the block symbol is labeled T*k* to indicate a key trigger circuit whose circuit details are also illustrated in said figure. Whenever the block symbol T*k* appears in the drawing, the contents of the block labeled T*k* will comprise the circuit as illustrated in Fig. 24.

Key triggers are used primarily in the control circuits for producing pulses with smooth wave fronts from input pulses which are very likely to contain ragged wave fronts. The key trigger is operated by feeding a driving voltage through a 1K grid resistor to one or the other of the grid inputs. The input to the key trigger is a double integrating circuit, composed of two series resistors and two shunt capacitors, as shown. Integrating action helps produce a smooth pulse which promotes positive triggering action if the input pulse remains long enough. Therefore, the integrators help prevent transients from effecting the key trigger. The 100 micromicrofarad coupling capacitor between the grids also desensitizes the key trigger to transients. The plate voltage varies from about +135 volts to +30 volts and the grid swing is from ground to about —30 volts. The rise time of the key trigger is about 9 milliseconds and the fall time is about 0.2 millisecond. The key trigger may be a type 5844 triode.

*And circuits (And)*.—Fig. 25 shows the block symbol and the detailed circuitry of a crystal diode and coincidence AND circuit used throughout the control circuits herein. Whenever the symbol labeled AND appears in the block diagram, the contents of the block labeled AND will comprise the circuit as illustrated in Fig. 24, or one modified simply by the addition of as many input diodes as may be necessary for controlling the circuit under question. The AND circuit of Fig. 25 is a +AND circuit which requires a coincidence of two +10 volt inputs, for example, applied respectively to the lines 294 and 296. Such inputs are effective through diodes 298 and 300, respectively, which diodes may be standard make germanium, such as Sylvania D436A or D437A to produce a +10 volt output, the plates of the diodes being joined and connected by a resistor 302 to a source of +220 volts.

*Or circuits (+OR and —OR)*.—Fig. 26 shows the detailed circuitry and the block diagram of a crystal diode OR circuit comprising a pair of diodes 304 and 306, joined at their cathodes and connected by means of a resistor 308 to a source of —250 volts. The application of +10 volts to either of the inputs 310 or 312 will produce a +10 volt output on the output terminal 314. This is also true when both of the inputs are plus. Thus, the OR circuit of Fig. 25 comprises a +OR circuit which passes a plus voltage on any one of its inputs.

Whereas Fig. 26 is an illustration of the +OR circuit, Fig. 27 illustrates a *—OR* circuit which is designed to pass a minus voltage. Thus, in the circuit of Fig. 27 the application of —10 volts to either of the inputs will produce a —10 volt output on the output terminal. This is also true when both of the inputs are minus. In respect to the +OR circuit, a minus voltage applied to either input will produce no change at the output, while in respect to the —OR circuit of Fig. 27 a plus voltage applied to either input will produce no change at the output.

*Cathode follower (Cf)*.—In Fig. 28 there is shown the detailed circuitry and the block diagram of a cathode follower which may be used either in the form shown in Fig. 28 or in several known variants thereof. Whenever a cathode follower is used in the circuitry herein, it will be indicated by the block diagram labeled CF. The standard cathode follower is primarily a power amplifier, and is therefore used for supplying a stable voltage level for driving resistive loads such as diode AND and OR circuits or capacitive loads such as wiring capacitance. Their high input impedance and their relatively low output impedance makes cathode followers useful for impedance matching and isolation. They do not invert the signal but they may attenuate a signal.

The standard cathode follower shown in Fig. 28 may be used with two types of loading which should be considered: a resistive load and a capacitive load. First, a resistive load will be assumed, and it may be assumed that the input voltage will be +10 volts. The tube, which may be half of a type 5965, will conduct in such manner as to regulate itself, i.e. it will not allow an appreciable voltage change from grid to cathode. As the current increases the tube tends to cut itself Off as the cathode voltage tends to rise. This cut-off action tends to decrease the current. Conversely, if the current tends to decrease, the cathode voltage will tend to drop and thus tend to cause the tube to draw more current. This type of self-regulation is called inverse voltage feedback. Current through the cathode circuit causes a voltage drop across the 100 ohm cathode resistor 314. When the input voltage is +10 volts, this drop should be about equal to the grid-to-cathode rise, so that the output voltage is almost +10 volts. Should the input signal drop, for instance, to −30 volts, then the output voltage will also drop. If one examines tube characteristics, it will be noticed that the current will be less and that the grid-to-cathode bias is more when there is more voltage across the tube. In this case the drop across the 10 ohm cathode resistor 314 is less, and therefore it will not compensate for the grid-to-cathode rise and the output will be more positive than the input. The regulating action still occurs, although at this lower level.

With +10 volts on the grid of an unloaded cathode follower employed an 8.3K cathode resistor, the output is about +9.5 volts, and each added 6 milliamperes of load will increase the drop (from +10 volts) to about 1 volt. Maximum rise of about 3 volts may be expected from a cathode follower with an 8.3K load resistor and no additional loading. For each milliampere of load, this lower level may be expected to rise about ½ volt. If the cathode resistor is increased, the rise in the lower level is increased also. For example, an increase of 3K in the cathode resistor will cause the lower level to rise about an additional volt. This cathode resistance may vary over a considerable range. The gain of a cathode follower when operating class A is about 0.9.

For operation of a cathode follower feeding a capacitive load, assume that there is capacitance connected from the output to ground, and assume the input voltage to be +10 volts. In the steady state condition, the capacitance would be charged to +10 volts. If the input voltage were to drop in zero time to −30 volts, the voltage across the capacitance would not drop immediately, and therefore the cathode will be held up by the capacitance until the grid drops to −30 volts. This action cuts off the tube momentarily. The output voltage will drop at a speed determined by the RC path consisting of the cathode resistor and the capacitance. When the capacitance voltage drops far enough that the tube begins to conduct, current from the tube will begin to halt and drop, and eventually hold the output at a steady state voltage. When the input is suddenly shifted again to +10 volts, the capacitance will be charged by current from the grid and plate circuits of the heavily conducting tube.

For values of input capacity for the next stage or stages generally employed in this system, these RC time constants are compared to the rise and fall time of the input; and, therefore, the extremes of cut-off and heavy conduction may not be reached and the output follows the input. But if a long cable or large capacitive load is attached to the cathode follower output, then the output will not follow the input voltage shifts but will be determined by the RC paths above. The use of several cathode followers, in parallel, helps to minimize the voltage rise through the circuit at the lower level. Parallel connected cathode followers also provide more current for line charging purposes to speed output voltage shifts, and in addition, the paralleling lowers the effective cathode resistance and thus allows faster discharging of line capacitance. When cathode followers are in parallel, the connections are made at the grids and the outputs. The diodes may not be paralleled as will be seen later. A number of half tubes (type 5965) in parallel precedes the symbol CF in the block diagram; thus a whole tube cathode follower is indicated by the symbol 2CF throughout the circuit diagrams.

The standard cathode follower, as shown in Fig. 28, contains two catcher diodes 316 and 318. The diode 318 connected to the −30 volt line protects the other catcher and the diode following this circuit by clamping the output voltage to −30 volts when the tube is removed or when the cathode follower input goes very negative. This negative voltage catcher also helps set the standard output signal.

The diode 316 connected to the +15 volt line clamps the output at +150 volts when the voltage goes very high, and thus protects the other diode or any diodes fed by this circuit from over voltage. These two diodes in effect protect each other. When cathode followers are paralleled, only needed diodes are used. In this case, enough +15 volt returned diodes are used to carry the 24 milliamperes, zero bias current for each 5965 type half tube. The −30 volt returned diodes must handle the clamping current through the equivalent cathode resistors when all tubes are removed. When crystal diodes are paralleled, a resistor (usually 100 ohms) is placed in series with each to tend to equalize the currents through each diode. Otherwise a low forward resistance of one may cause it to pass more than its rated current.

*Power cathode followers* (*PCFa and PCFt*).—In Figs. 29 and 30 are illustrated two power cathode followers which operate in manner quite similar to the standard cathode follower of Fig. 28. These circuits are designated as power cathode followers because they use a type 5687 tube which is a heavy duty tube. The usual value of the cathode resistor in a standard power cathode follower is 6 kilohms. The usual value of the bias resistor is 300 ohms. The voltage rise through a standard power cathode follower is greater than that for a standard cathode follower because of the tolerances in the type 5687 tubes; the rise from a −30 volt input can be as much as 5 volts for an unloaded power cathode follower with a 6K cathode resistor. With a +10 volt input, the input should also be +10 volts under the above condition. The action of the standard power cathode follower under capacitance loading is also similar to that of the standard cathode follower. Power cathode followers may be paralleled, and as in the case of the standard cathode follower, the number of half tubes in parallel preceding the symbol identifying the power cathode follower.

The power cathode follower PCF*a* of Fig. 29 is a special power cathode follower which is essentially a basic power cathode follower with no bias resistor. The cathode follower PCF*t* is a special cathode follower circuit in the circuits used to supply current to the moving clutch coil in the tape unit, and its function will be more fully developed at the point of this specification dealing with this latter subject matter.

*Slow inverter* (*Is*).—Fig. 31 illustrates the block symbol and the detailed circuitry of a slow inverter used at several points throughout the system. The input terminal 316 of the inverter tube 318 (which may be one half of a type 5965 tube) feeds through a 10K resistor 320 to the grid of the triode 318, its plate being connected to a cathode follower output via 15 micromicrofarad condenser 322 in parallel with a 160K resistor 324, whose lower junction is connected through a 330K resistor 326 to a −250 volt source. This lower junction is connected to the output 328 which in turn feeds a following component (usually cathode follower).

The rise time of a slow inverter output pulse is about 0.5 microsecond and the fall time is about 0.3 microsecond. Since the high speed input of a standard inverter is not needed, only a 150 ohm parasitic suppressor resistor may be used in place of the 10K grid current limiting resistor 320 in the input circuit. No tapped plate output is taken from the slow speed inverter but the divider output is identical to that of a standard inverter.

*Special inverters*.—Fig. 32 illustrates the detailed circuitry and the block symbol of a special inverter whose block is labeled I*g*. This inverter is fed a signal of about −30 to +6 volts, and its output is about +102 to +150 volts. The resistance of this inverter is chosen to give the proper voltage drop across the indicator lamps and the like. In some instances this resistance value may be slightly different than that shown for adjusting the brightness of an indicator lamp to a like value. Where indicator lamps are used herein, each lamp requires about 48 milliamperes, and therefore a full type 5687 tube is used.

In Fig. 33 is illustrated the detailed circuitry and the block symbol of a special inverter whose block symbol is I*h*. This inverter is employed in the control circuits to feed slow, single shot multivibrators. It may comprise half a type 5965 triode with the resistance values as shown.

Fig. 34 is the detailed circuitry and the block symbol of a special inverter, whose block symbol is I*r*, and which is employed in the circuits used to supply current to the moving clutch coil in the tape drive system. Its characteristics will be dealt with at the time the moving clutch coil circuit is described in detail hereinafter.

In Fig. 35 is illustrated the detailed circuitry and the block symbol of a pull-over inverter, whose block symbol is I*ps*. This inverter may comprise one half a type 5965 triode with the grid resistance value as shown. The pull-over inverter is used for plate pull-over of trigger or single shot multivibrator circuits. When a pull-over inverter is feeding a single shot multivibrator, and the pulse width of the input is greater than 75% of the single shot pulse width, the inverter input must be RC coupled, otherwise it may be direct-coupled. If the input is fed from a low impedance source and is direct-coupled, it must have a grid-current-limiting circuit added to the point A.

*Single shot multivibrators* (*SS*).—Fig. 36 illustrates the block diagram symbol and the detailed circuitry of a single shot multivibrator identified by the characters SS which is widely used throughout these control circuits. This circuit is used to generate gates or timing pulses of specified delays, and to provide specified delays. A single shot multivibrator resembles a trigger circuit in that it may be flipped into a certain state, but it returns automatically to its previous state after a predetermined time without being pulsed from an external source.

Its normal state may be referred to as its stable state and its abnornal state may be referred to as its quasi-stable state, for it remains stable in this latter state until the predetermined time has elapsed.

The single shot multivibrators used in this control system are cathode-coupled. In the stable state, the left triode is cut off and the right triode is conducting heavily, In this state the cathode and right grid voltages are about +10 volts, and the left plate voltage is +150 volts, and the right plate voltage is about +60 volts. The most common method of firing a single shot is by plate pull-over. When using plate pull-over, the left plate of the single shot is connected to the plate of a pull-over inverter as described in the preceding section, the load resistor for the left plate also acting as the load resistor for the pull-over inverter. When a positive input arrives on the grid of the pull-over inverter, conduction through the common plate resistor drops the voltage of the left plate of the single shot multivibrator. This negative shift is coupled through the capacitor CT to the right grid, cutting off the right triode and the cathode voltage starts to fall. The left grid is held to about −38 volts by a voltage divider, and as the cathode voltage falls the left triode comes into conduction, pulling its plate voltage down. Current flowing through the cathode resistor from the left tube, stops the fall and holds the cathode voltage at −36 volts.

A clamp diode in the cathode circuit prevents component variations from causing the voltage on the cathode to fall below −36 volts. The clamp diode on the left grid prevents the Miller capacitance effect from dropping the left grid voltage below −36 volts. The left tube at this time is conducting, and it is operating near zero bias. The input pulse may be removed at any time after the left triode begins to conduct, and the circuit will remain in the quasi-stable state, for the left plate voltage will be held down by the conduction of the left triode. When the input pulse from the pull-over inverter is removed, the loss in pull-over inverter current flowing through the left plate load resistor may appear as a slight positive shift in the left plate and grid wave forms.

The duration of the single shot output pulse is largely dependent upon the value of the discharging capacitor CT connected between the left plate and the right grid and the value of the resistor RT. On discharge of the capacitor CT the path is from the +220 volt source, through the resistor RT connected to the right grid, said capacitor, the left triode and the cathode resistor to −100 volts. Discharging the capacitor causes the voltage at the grid end to rise. When the voltage at the right grid has risen to −42 volts, the right triode will begin to conduct. The cathode voltage will rise again to its original value, cutting off the left triode as it does so. The left plate voltage, therefore, rises toward its original +100 volt level. All components in this circuit, except the condenser CT and the resistance RT, are fairly constant. RT and CT may be varied to determine the duration of the output pulse, and therefore they are called the timing resistor and the timing capacitor, respectively. The larger RT and CT are, the more time is required for the right grid voltage to rise −42 volts. The duration of the single shot pulse in microseconds is approximately 0.25 RT, CT where RT and CT are in megohms and micromicrofarads, respectively. The value of cut-off for the right tube in this circuit also affects the timing. All these facts, except RT and CT are fairly constant and enter into said 0.25 coefficient of the timing equation. Variance in components and voltages, therefore, may cause the actual value of pulse width to deviate from the calculated value by as much as plus or minus 20%. Although it was mentioned previously that the voltage values at various points in the circuit of Fig. 36 return to their stable values when the single shot timing has ended, such a case is not strictly true. The left plate voltage rises to a new level in about one-half microsecond, but this is lower than +150 volts. This voltage is determined by the balance of voltage in the circuit connected to this plate. The positive shift in the left plate is coupled to the right grid, which becomes positive enough to draw heavy grid current in the right triode. The upper level of the right grid voltage is clamped through the right tube and the +10 volt clamp diode on the cathode, and this clamping action prevents the voltage on the left plate from rising to +150 volts until the coupling capacitor again becomes charged to its original +140 volt charge. The path for charging current is now from +150 volts, through the left plate load resistor, through the capacitor CT, through the grid-to-cathode resistance of the right tube and finally through the cathode resistor to −100 volts.

The time of recovery, i.e. the time required for the left plate voltage to return to +150 volts, can be estimated in microseconds at 0.25 CT, where CT is in micromicrofarads. It may be noted that the timing resistor has no effect on this time. Recovery time is an important consideration in single shot multivibrator operation. If a circuit has not recovered from an operation when a second input pulse arrives, the negative shift on the left plate will be smaller, and thus the time of the single shot pulse will be shorter. Therefore, for stable operation, the period of the input pulses must be greater than the combined output pulses recovery time. If the shift in voltage in the left plate at the time of removal of the input pulse is large, it may have a serious effect upon the timing of the circuit.

A special input may be used to suppress or cancel single shot action. This input is from a cathode follower and is connected to the cathode of the single shot. If the input to the cathode follower is about +10 volts, its output will hold up the cathode of the single shot, even though the single shot is pulsed at the grid. With the cathode follower, no regenerative action can occur in the single shot, and no output pulse will be produced. The left plate voltage of the single shot will be pulled down by the pull-over inverter (if plate pull-over is used) but the plate voltage will rise again after the input pulse is removed. If the single shot is in its quasi-stable state when the positive gate is applied to the cathode, the single shot will immediately be triggered back to its stable state. Thus, the +10 volts applied to the cathode can either suppress or cancel the single shot action.

*Special single shot multivibrator (SSt).*—Fig. 37 is the detailed circuitry of, and also shows the block diagram of, the special single shot multivibrator labeled SS*t* wherever it appears in the control circuits hereof.

The special single shot multivibrator SS*t* is used in the control circuits for adding time. This single shot resembles the standard single shot described immediately hereinabove except for a few modifications. The basic difference in this circuit and the standard single shot is that the special SS*t* is fired by a direct-coupled pull-over inverter connected directly to the timing grid.

If a positive input is applied to the grid of the inverter the SS*t* will flip into its quasi-stable state. As long as this input is retained, the SS*t* will remain in the quasi-stable state and will not begin its timing period because the plate of the inverter holds the timing grid at a constant voltage. Not until the input to the inverter is removed does the SS*t* begin its normal timing period. Whenever the input to the inverter goes positive, the SS*t* will flip to its quasi-stable state, regardless of whether it was in the timing cycle or was in its stable state when the positive input arrived.

To make the circuit operation very stable, all positive voltage returns are to +220 volts and the cathode voltage return is grounded. The cathode output provides a negative signal. If the circuit is to produce a standard-level signal, a voltage divider (indicated at D) is used. No resistor is used in the right plate circuit, because no positive output pulse is needed and stability is improved. The left tube conducts quite heavily and therefore the bypassed low impedance biasing divider is used at the grid of the tube.

The SS*t* finds use principally in the EOR and EOF units of the tape control units. For example, in the EOR circuits, a stretched group pulse of 32 microseconds width will cause the SS*t* to flip so long as a stretched group pulse arrives within 400 microseconds after the fall of the preceding one, and the SS*t* will be flipped back to its quasi-stable state without ever completing its timing period. If the 400 microsecond time is exceeded, however, the SS*t* will return to its normal condition and will thus signal an EOR condition. Since the output of an SS*t* is abnormal for a period equal to the time of an input pulse plus the time of the circuit itself, it can be used conveniently to add time where the total is too large a value for one standard single shot multivibrator circuit alone. This is the function of the SS*t* in the EOF Sense circuits 260.

*Special moving clutch coil circuits.*—Fig. 38 is the detailed circuit and the block diagram for a special inverter identified throughout the block circuit diagram by the characters PI*t*, and Fig. 39 is the detailed circuit and the block diagram of a special clamping circuit identified throughout the circuit diagram by the characters C*t*. Both the special inverter of Fig. 38 and the special clamp circuit of Fig. 39 find use in the circuits designed to supply current to the moving clutch coil 148 in the Tape Motion Control III Unit 244. The characteristics of these circuits will be dealt with at the appropriate point in the detailed circuit description that is to follow.

*Write tube (Wt).*—Fig. 47*a* is the detailed circuit and the block diagram for a Write Tube identified in this figure and in Fig. 47 by the characters W*t*. The Write Tube is used to supply current to the write heads in the read-write head unit 256. This tube is fed a push-pull input from the Tape Write Trigger 504 (Fig. 47) with levels of −15 volts and −68 volts. These levels appear on the grid of the Write Tube as approximately −30 volts and −70 volts. This circuit is actually a cathode follower OR circuit with one tube always cut off in the D.C. state. The inputs are protected from excessive grid current by the 47K resistors. The cathode return is connected through the relay points 10(110)AU to −100 volts when the circuit is turned on and to ground when the circuit is turned off. The tube feeds approximately 10 milliamperes of D.C. current to the write head.

*Detailed circuit description*

The various signals controlling reading from and writing on tape and the direction of tape feed through the read-write heads, together with the signals relating to the selection of a particular tape unit are fed into the Tape Selector 230 (Fig. 40), wherein the functional signals, i.e. those relating to tape operation, are fed into cathode followers and through inverters and cathode follower outputs to produce the signals which are used to control the circuit herein. The Tape Write Select signal, for example, is fed into a cathode follower 330 whose output passes through an OR circuit 332, through a pair of inverters 334 and 336 and finally through a cathode follower 338, where the Tape Write Select signal emerges as the signal TU Write Status Bus.

The cathode followers 330 and 338 are the circuit exemplified in Fig. 28. The OR circuit 332 is the same as that shown in Fig. 26, while the inverters 334 and 336 are slow inverters of the kind shown in Fig. 31. The signal Tape Read Select emerges from the Tape Selector 230 as the signal Set TU Read Status Bus. The signal Tape Read Backward Select emerges from the Tape Selector as the signal TU Read Backward Bus. The signal Tape Write EOF Select emerges from the Tape Selector as the signal TU Go Forward Bus, and the signal Rewind Select emerges from the Tape Selector as Set TU Rewind Status Bus.

The Tape Selector also contains OR circuits 340 and 342 which permit the generation of an output signal on certain of the Tape Selector output buses under control of signals other than those hereinbefore noted. The OR circuit 332 is fed not only by the Tape Write Select signal but also by the signal Tape Write EOF Select. Thus, the presence of either of these signals will result in the output signal Set TU Write Status Bus. The OR circuit 340 is fed not only by the signal Tape Read Select but also by the signal Tape Read Backward Select which, therefore, likewise results in the output signal Set TU Read Status Bus. Finally, the OR circuit 342 is fed not only by the signal Tape Write EOF Select but also by the input signals Tape Write Select and Tape Read Select. Thus, the signals Tape Write Select, Tape Read Select and Tape Write EOF Select when fed into the OR circuit 342 each results in the Tape Selector output signal TU Go Forward Bus.

Each of the signals I/O Select (1), I/O Select (2), I/O Select (3) and I/O Select (4) feeds into an AND circuit, each of which is like the AND circuit of Fig. 24, where these respective input signals are mixed with an internal signal Tape Select. For example, the input signal I/O Select (1) is mixed with the internal signal Tape Select in an AND circuit 344, whose output through a cathode follower 346 is the output signal TU1 Select.

The internal signal Tape Select on the AND circuit sampling line 348 is the result of a multiple input to an OR circuit 350, whose output feeds through a network consisting of an inverter 352, a cathode follower 354 whose output is split, one portion feeding through an inverter 356 which is like the inverter shown in detail in Fig. 35. The output of the inverter 356 feeds a single shot multivibrator 358 whose details are as shown in Fig. 36. The output of the multivibrator 358 feeds through a cathode follower and into an OR circuit 362 whose other input is the pulse split from the output of the cathode follower 354. It will be seen that either inputs to the OR circuit 362 will pass through said circuit, through an inverter 364 and a cathode follower 366 whose output is the signal Tape Select which is used to sample the several AND circuits whose inputs are the respective I/O Select signals, for example I/O Select (1) which is the input to the AND circuit 344. The signal Tape Select is necessary to pass that one of the Tape Unit Select signals I/O Select (1) through I/O Select (4). If a tape unit has been selected, one of the input lines I/O Select (1) through I/O Select (4) will be up with the result that the gating signal Tape Select will pass the tape selection signal to create one of the output signals TU1 Select, TU2 Select, TU3 Select or TU4 Select.

It should be noted that the OR circuit 320 has as an input each of the Tape Selector input signals Tape Write Select, Tape Read Select, Tape Read Backward Select, Tape Write EOF Select and Tape Rewind Select. Thus, each of these input signals will result in the gating of one of the I/O Select signals. Each one of the Tape Selector output signals Set TU Write Status Bus, Set TU Read Status Bus, TU Read Backward Bus, TU Go Forward Bus and Set TU Rewind Status Bus is sent to each of the tape units that may be employed in the system (herein four tape units are supposed), whereas the signal TU1 Select, etc., which serves to select a particular one of a plurality of tape units, is sent only to the particular tape unit that has been selected, i.e. tape unit #1.

In this specification there has been disclosed only those control units which are associated with a single tape unit. It is to be understood that each of the tape units has therein identical control circuits which function in an identical fashion when the unit containing the same has been selected by one of the TU Select signals from the Tape Selector 230.

*Tape rewind operation.*—The signal Tape Rewind Select causes the generation of two signals in the Tape Selector 230. By reference to Fig. 40, it will be seen that the Tape Rewind Select signal enters a cathode follower 350 whose output is the signal Set TU Rewind Status Bus which is directed to the control buses 248 (Fig. 41). As noted above, the signal Tape Rewind Select is also an input to the OR circuit 350 which will result in the internal signal Tape Select which samples the I/O Select triggers 344, etc. to determine which tape unit is to be used. Let it be assumed in this case that tape unit #1 is to be selected. In this case the signal I/O Select (1) will be present in the AND circuit 344, so that upon receipt of the signal Tape Select on line 348 this AND circuit will emit, by way of its cathode follower 346, the signal TU1 Select which is directed to the Tape Select Unit 232 (Fig. 42). In the Tape Select Unit the signal TU Select combines with the signals TU Ready and Tape Stopped within an AND circuit 352 to generate an output signal Select Stopped TU by way of inverters 354, 356 and a two stage cathode follower 358. The signal TU Select is also used to energize a select light 360 by way of an inverter 362 which is like the special inverter shown in Fig. 32.

It is important to note that the signal Select Stopped TU is a necessary prerequisite for any tape unit to accept an instruction. Assuming the tape to be in Backward Status, it will be seen that the signal Set TU Rewind Status, which is an input to the Tape Unit Status network (Fig. 43) is combined with the signal Backward Status and the instruction signal Select Stopped TU within an AND circuit 362 whose output, by way of a cathode follower 364, is the signal Rewind-Disconnect. The Rewind-Disconnect signal is utilized in the Tape Unit Status network (Fig. 43) to reset the Read Status Trigger 364 and the Write Status Trigger 366 to neutral (neither read nor write). This is achieved by an internal use of the signal Rewind-Disconnect by feeding this signal through an OR circuit 368 whose output is fed to the Read Status Trigger 364 and to the Write Status Trigger 366 to reset these triggers to neutral (right side conducting).

The Rewind-Disconnect signal is also transmitted to the Tape Disconnect circuits (Fig. 44) through which this signal passes by way of an OR circuit 370, a pair of slow inverters 372, 374 and a cathode follower 376 as the output signal Disconnect.

At the same time the signal Set TU Rewind Status entering the Tape Motion Control I Unit (Fig. 45) is gated through an AND circuit 378 by the input signal Select Stopped TU. The output of the AND circuit 378 is passed through an OR circuit 380, a cathode follower 382, and into a pair of AND circuits 384 and 386. Since the required status of the unit is the Backward Status (not rewound), and since the unit is not in the process of changing status, the output of the AND circuit 384 is directed through an OR circuit 388 and through a special inverter 390, which is like the inverter shown in Fig. 35, to fire a 10 millisecond single shot multivibrator 392 which, by way of a cathode follower 394, produces the signal Starting Delay.

The signal Starting Delay is transmitted to the Tape Motion Control II Unit 240 (Fig. 46) where, by way of an inverter 398, its leading edge fires a 56 microsecond single shot multivibrator 396. The 56 microsecond single shot delay provides an instruction entry period. At the end of the 56 microsecond delay, a Tape Stopped Trigger 400 is turned Off (right side conducting) and the signal Tape Stopped returns to its negative level to indicate that the tape is not stopped. The falling of the signal Tape Stopped does three things: (1) it turns on the Go Trigger 402; (2) it blocks the AND circuit 352 in the Tape Select Unit 232 (Fig. 42), thus preventing the tape unit from accepting any further instructions until an existing instruction is executed; and (3) the fall of the signal Tape Stopped (Fig. 42) turns On a TU Connected Status Trigger 404 in the Tape Select Unit 232 (Fig. 42), thereby generating the signal TU Connected.

However, it should be noted that the signal TU Connected plays no part in the rewind logic and is soon to be turned Off.

Upon termination of the 10 millisecond starting delay, a Tape Up To Speed Trigger 406 in the Tape Motion Control II Unit 240 (Fig. 46) is turned On, thereby producing, by way of a cathode follower 408, the signal Tape Up To Speed.

By way of recapitulation, it may now be noted that the Tape Rewind instruction has been accepted and has been sent to the proper tape unit. The instruction has initiated the rewinding of tape in that unit, and at the same time it has prepared to disconnect the tape unit from the calculator, since it is not desired to cause the calculator to wait during the rewinding operation.

The output of the Go Trigger 402, by way of a cathode follower 410, is the signal Go, which is transmitted to the Tape Motion Control III Unit 244 (Fig. 13), for the purpose of influencing the moving clutch coil 148. Fig. 13 discloses the special circuits which are used for generating the current needed to operate the moving clutch coil 148. These circuits must accept either $a+10$ or a $+150$ volt input when supplying Go current, or $-30$ or floating inputs when supplying Stop current to the moving clutch coil 148. Go current flows from the Go current line to the Stop current line (from top to bottom in Fig. 13), and Stop current flows from the Stop current line to the Go current line, from bottom to top in Fig. 13. The special inverter power cathode follower circuits consisting of special inverters 198 and **198*a* and power cathode followers 412 and 412*a* are used to supply driving voltage of opposite polarities to the circuits which feed opposite ends of the moving clutch coil 148. The special inverters 198 and 198*a* are disclosed in detail in Fig. 33, whereas the cathode follower circuits 412 and 412*a*** are shown in Fig. 29.

A 40 volt signal produces a swing of about 140 volts at the plate of the inverters 198 and **198*a*** (Fig. 33). The input divider is provided for two purposes: for dividing the two sets of input voltages so that the tube is cut Off for the more negative voltages of each set and conducting for the more positive voltages of each set, the other to provide grid current limiting for the upper voltage levels. With the tube removed, the divider tends to produce voltage of about −94 volts for +10 volts input, +60 volts for +150 volts input and −250 volts for a floating input. The equivalent plate circuit is 24K returned to about +83 volts. The large resistance in the plate circuit is used to provide a large plate swing.

The PCF*a* circuits 412 and **412*a* (Fig. 29) are used to power the output of the inverter circuits 198 and 198*a*, respectively. No bias resistor is used in these power cathode followers since the slight amount of rise through the circuit is not critical. Although there are about +80 volts on the grid of the cathode follower, the tube draws only about 13 milliamperes. The Go current line and the Stop current line are each fed by a special inverter-special power cathode follower circuit. The Go current line is fed by a special inverter 414 and a special power cathode follower 416, whereas the Stop current line is fed by a special inverter 418 which is the same as the inverter 414, and a special power cathode follower 420 which is the same as the power cathode follower 416**.

The special inverters 414 and 418 are shown in detail in Fig. 34, each of these inverters containing two such illustrated units in parallel. The special power cathode followers **2PCF*a* are illustrated in detail in Fig. 30, the networks 216 and 220 containing two such illustrated power cathode followers in parallel. The special I*r* inverters 414 and 418 are used as switches for completing the circuit for the current through the moving clutch coil 148**, and they are also used for fixing the voltage level on the two clutch coil energizing lines. The plate load of each inverter is the coil and the cathode follower feeding the opposite end of the coil. The special PCF*t* cathode followers 416 and 420 supply the current to the coil. The load of these cathode followers is the coil and the inverters and the two **I*r* inverters 414 and 418**, respectively.

When the signal Go is negative or floating, the input to the inverter 414 is positive (about +80 volts), and the input to the power cathode follower 416, which feeds the Go current line, is negative (about −45 volts). Therefore, the inverter is conducting, fixing the voltage level at about −45 volts. This cuts Off the power cathode follower 416, since its input is about −45 volts. At the other end of the coil, an opposite condition exists; the cathode follower 420 is conducting and the inverter 418 is cut Off. The voltage at this point is about +80 volts. Therefore, it can be seen that the cathode follower 420 feeding the Stop current line is supplying current which flows through the coil and through the inverter to ground. This Stop current causes the coil to pull the idler capstan in the tape drive unit toward the drive capstan. The voltage across the coil is, therefore, about 35 volts, the resistance of the coil is about 425 ohms, and the current through the coil should be at least 60 milliamperes, the optimum required for the best operation.

When the Go signal is positive, the conditions are reversed from those noted above. The inverter 414 feeding the Go current line is now cut Off, since its input is about −45 volts. The power cathode follower 416 feeding this line is conducting with both its grid and cathode at about +80 volts. The Stop current line is about +45 volts, since the inverter 418 feeding it is conducting, its input being about +80 volts. In this case current is flowing through the coil from the Go current line to the Stop current line and to ground through the inverter. This Go current causes the coil to pull the idler capstan away from the drive capstan.

From a system standpoint, it is necessary that the clutch coil 148 act more quickly when tape is to be driven than when it is to halt. This action is obtained by increasing the amount of current through the coil when the Go signal initially becomes positive. This additional current is in the nature of an accelerating current. In Fig. 13 it may be seen that three special inverters 422 in parallel, each of which is shown in detail in Fig. 38, are provided with the special inverter 418 in the feed for the Stop current line to help switch this accelerating current for a short interval of time. The inverters 422 are fed a positive shift of approximately 140 volts from a −140 volt level from a differentiating circuit. This pulse returns to −100 volts through a circuit with a time constant of about two milliseconds. When this pulse reaches about −100 volts, the special power inverter 422 will conduct and lower the impedance of the circuit through which the accelerating current must flow, i.e. the action of bringing the special power inverter 422 to zero bias condition from a cut-off condition causes the plate voltage of the tube to be lowered. Since the opposite end of the coil is connected to a cathode follower, that voltage will not change appreciably; therefore, the overall voltage across the moving clutch coil 148 is increased and more current will flow through the coil.

An important effect in the operation of the circuit of Fig. 13 is the effect of the motion of the core in the coil 148. For about the first millisecond after the positive shift at the input to the power inverter 422, the coil remains at rest because of mechanical inertia, and during this time the voltage output of the power inverter 422 is essentially the inverse of the exponential impressed upon the input. After one millisecond the core begins to move so that the idler capstan moves toward the drive capstan. The motion of this core in the coil causes the coil to act as a generator and to produce a back E.M.F. in a direction to increase the voltage across the coil. Since the other end of the coil is fed by a cathode follower, the voltage at that point is practically constant. The effect of this back E.M.F. then is to lower the voltage on the Stop current line. This effect can be seen from about one to about three milliseconds after the initial transition. During this period the special inverter 422 operates at about zero bias. Since the effective plate voltage for these tubes is lowered, the current that will pass will be less. This decreased current has the effect of damping the motion of the core, and thus the motion of the idler capstan toward the drive capstan. This damping is necessary to prevent excessive bounce when the tape capstans move. This bounce is not completely suppressed, and therefore the mechanical motion is reversed and the core moves in the opposite direction. In such case the E.M.F. produced in the coil will raise the voltage of the Stop current line from about three to about six milliseconds after the initial transition. This voltage change will raise the plate voltage of the power inverter 422, and since the tubes are still at zero bias, the current flow will increase. This increase then helps to pull the core back in the initial direction so that the capstans may meet again. A second bounce will rarely follow. The times and voltages stated are all dependent upon the characteristic of the coil and upon mechanical adjustments of the coil-to-capstan linkages and the capstans themselves.

From the above it can be seen that the purpose of the power inverter 422 is two-fold: it allows an additional accelerating current to flow when the signal Go is first made positive, and it provides damping action to the mechanical movements when called upon by the mechanical parts to do so.

If the tape were stopped and then signalled to go again before the output of the power inverter 422 returned to −140 volts, the input pulse amplitude might not be sufficient to bring the inverter into conduction to supply the accelerating current. To prevent such an occurrence, the negative output of the differentiator is clamped at about −410 volts by the *Ct* circuit 424, details of which are shown in Fig. 39. The drop across the diode clamp 424 disappears in about one millisecond. A Go line may be made positive within 56 microseconds after it falls, and if it is made positive between 56 microseconds and one millisecond, the accelerating current will not be quite so large. This loss in accelerating current is not serious, since there is about a one millisecond mechanical delay in beginning to stop the tape, and therefore the current would not be needed at this time.

Within the control buses (Fig. 41) the signal Disconnect is combined with the signal Not Changing Delay in an AND circuit 426, the output of which passes through an OR circuit 428 and through a cathode follower 430 as the signal TU Disconnect.

The signal TU Disconnect is transmitted to the Tape Write Control Unit 250 and out of this unit as the signal Tape Disconnect which is used by the calculator to free the calculator for further input-output operation.

As explained up to this point, the instructions from the calculator have caused the selected tape to start its rewinding operation, and it has disconnected the tape unit from the calculator. To be considered now is the case wherein the tape was initially in a Forward Status.

If the tape is in a Forward Status, the signal Set TU Rewind Status is gated through the AND circuit 378 (Fig. 45) by the signal Select Stopped TU. The gated signal is transmitted by way of OR circuit 380 and the cathode follower circuit 382 to the AND circuit 386. Since the unit is in Forward Status, and since it is not in the process of stopping, AND circuit 384, upon which the normally plus output of a cathode follower 428 is likewise impressed, will become positive and the OR circuit 386 will conduct to produce a signal Changing Delay. By reference to Fig. 45 it will be seen that the output of the AND circuit 386 is fed through an OR circuit 430 and through the special inverter circuit 432 to fire a 10 millisecond single shot multivibrator 434 whose output, by way of a cathode follower 436, is the signal Changing Delay. It is to be noted that the cathode output of the Changing Delay single shot 434 is directed by way of a cathode follower 438 to the AND circuit 384 and to an AND circuit 440 to suppress any starting until the physical change in the tape drive linkage is complete.

The signal Changing Delay generated, as just described, in the Tape Motion Control I Unit 238 (Fig. 45) is transmitted to the Tape Motion Control IV Unit 252 (Fig. 15) where its leading edge fires a 56 microsecond single shot multivibrator 442, the signal Changing Delay being fed to said multivibrator through a special inverter 444 of the character described in connection with Fig. 35. The trailing edge of the single shot multivibrator 442 output, by way of a cathode follower 446, reverses the status of the binary Tape Direction Status Trigger 200, thus causing the tape to be removed from the Forward Status and placed in Backward Status.

It has been noted hereinbefore that the Tape Motion Control VI Unit 246 (Fig. 15) contains the Backward Bias Relay **146*a* and the Forward Bias Relay 146*b*. It has also been stated that the Backward Bias Relay and the Forward Bias Relay are used to position the tape idlers in such manner that when a Go signal is given to the moving clutch coil 148, the tape will be driven in the desired direction. In addition, the Backward Status Relay is also used to supply power to a Backward Status Line 448** and to provide switch action for vacuum switch control and manual control.

Thus, after the 10 millisecond delay provided by the single shot multivibrator 434 (Fig. 45), the AND circuit 384 in that figure is now conditioned to generate the signal Starting Delay. The output of the AND circuit 384, by way of an OR circuit 388, the special inverter 390, the single shot multivibrator 392 and the cathode follower 394 (Fig. 45) constitutes the signal Starting Delay. This signal causes the tape to move backward, which movement continues until the Right Tape Sense Relay 218 in the Tape Motion Control IV Unit 252 (Fig 12) is picked up by virtue of the long metal leader on the machine reel, causing the Right Tape Sense Idler **18*a* to assume ground potential. Transfer of the Right Tape Sense Relay 218 causes transfer of the Right Tape Sense Relay points 3(103)AU (Fig. 12) to turn On the Right Tape Sense Trigger 220** to generate the signal Rewound.

In the Tape Motion Control I Unit 234, since the tape is up to speed and in Backward Status, the signal Rewound will be gated through an AND circuit 448, the output of which passes through an OR circuit 450, a special inverter 452, a single shot multivibrator 454 and a cathode follower 456 as the signal Stopping Delay. It may be noted at this point that the time constant of the single shot multivibrator 454 is seven milliseconds.

The signal Stopping Delay, which is an output of the Tape Motion Control I Units (Fig. 45) is transmitted to the Tape Motion Control II Unit 240 (Fig. 46) wherein the leading edge will fire a 1.6 millisecond single shot multivibrator 458, the Stopping Delay signal being entered into said single shot by way of a special inverter 460. Firing of the 1.6 millisecond single shot 458 produces an internal signal Stop Delay on the output of a cathode follower 462. The Stop Delay signal is fed to the Go trigger 402 and also to the Tape Up To Speed Trigger 406, both of which will be turned off upon the fall of the signal Stop Delay. Furthermore, since the unit is not in Write Status, the Stop Delay signal will be passed through an AND circuit 464 which, by the trailing edge of its output passing through an OR circuit 466 and a cathode follower 468, will turn On the Tape Stopped Trigger 400, thus causing a cathode follower 470 to emit the signal Tape Stopped. This, then, prepares the tape unit for accepting the next instruction.

In Fig. 46 the AND circuit 472, whose inputs are the signals Rewound and Backward Status, has as its sole purpose the conditioning of the Go Trigger 402, so that it is never turned On by calculator control when the tape unit is already rewound and also in Backward Status. It will be noted that the output of the AND circuit 472 is fed into the Go trigger 402 to hold said trigger from emitting the Go signal when either of these tape conditions are present. Likewise, the signal TU Ready in the tape motion controls of Fig. 46, which is connected to the Tape Stopped Trigger 400 and the Go trigger 402 as well as to the Tape Up To Speed Trigger 406, insures that these triggers are not operated unless the tape unit is under control of the calculator.

At the time the tape unit is disconnected the signal TU Select in the Tape Select Unit 234 (Fig. 42) is directed into a −OR circuit 474 which is the same as the circuit shown in detail in Fig. 27. It will be remembered that a negative input to a −OR circuit will result in an output from such circuit. Thus, the presence of the TU Select signal by way of the −OR circuit 474 will turn Off the TU Connected Status Trigger 404 to drop the signal TU Connected which otherwise would be the positive output of the cathode follower 476, which is the same as the cathode follower of Fig. 28 with the exception that two such units are employed in parallel. As noted above the signal TU Connected serves no logical function in the execution of the Rewind instruction.

*Tape writing operation.*—As developed in connection with the description of the rewind operation, upon receipt of an instruction to write on tape, a signal Tape Write Select will be transmitted to the Tape Selector 230 (Fig. 40). The signal Tape Write Select will result in the generation of three signals in the Tape Selector Unit. From an examination of Fig. 40 it will be seen that the signal Tape Write Select passes through the cathode follower 330, the OR circuit 332, the inverter circuits 334 and 336 and the cathode follower 338 as the signal Set TU Write Status Bus which is transmitted to the control buses 248 (Fig. 41). The signal Tape Write Select also is passed through the OR circuit 342, inverters 476, 478 and cathode follower 480 as the signal TU Go Forward Bus, which is also transmitted to the control buses (Fig. 41). Furthermore, the signal Tape Write Select is passed through the OR circuit 350 and through the Tape Select network heretofore described, causing the generation of the Tape Select signal. This signal, as explained before, interrogates the tape unit selection AND circuits 344, etc. causing selection of the specified tape unit. As before, receipt of the signal TU Select in the Tape Selector Unit 232 (Fig. 42) will cause the instruction entry gate Select Stopped TU to be conditioned positive by way of the —OR circuit 474, the trigger 404 and the cathode follower combination 476.

It is a basic concept that writing on tape cannot take place if the tape unit is in Read Status. Therefore, the signal Set TU Write Status is transmitted to the Tape Disconnect circuits 236 (Fig. 44) where it is mixed in an AND circuit 482 with the input signals Select Stopped TU and Read Status. Therefore, if the tape unit were in Read Status and since the signal Select Stopped TU is positive, the AND circuit 482 will transmit a signal through the OR circuit 370, the inverter circuits 372 and 374 and the cathode follower circuit 376 as the signal Disconnect. This Disconnect signal will act as before, disconnecting the tape unit from the calculator.

Assuming the tape unit not to be in Read Status, the signal Set TU Write Status (Fig. 43) is an input signal to an AND circuit 484, and since the select Stopped TU signal is positive and since the tape is not in Read Status, the output of the Read Status Trigger 364, by way of a cathode follower 490, will be the signal Set Write Status Trigger.

The signal Set Write Status Trigger has several functions. In the first place it turns On the Write Status Trigger 366 and in the second place this signal is transmitted to the Tape Motion Control I Unit 238 (Fig. 45), where it is passed through an OR circuit 492, through slow inverters 494, 496 and through a cathode follower 498 to the AND circuit 440 as an internal signal Read/Write set.

Assuming the tape unit to be in Forward Status, and since the unit is not in the process of changing status, and since the signal TU Go Forward is positive, the output of the AND circuit 440 will be directed through the OR circuit 388 and the special inverter 390 to fire the 10 millisecond Starting Delay single shot multivibrator 392; thus, by way of the cathode follower 394 there is generated an output signal Starting Delay which is used to cause the tape to move forward.

When the Write Status Trigger 366 (Fig. 43) is turned On, the output thereof, passing through a cathode follower 492, constitutes the signal Write Status. The Write Status signal is passed through a pair of Ir inverters 494 to energize a Write Status Relay 496. The Write Status Relay 496 controls a pair of Write Status relay points 10(110)AU and 10(110)BU in the Tape Write circuits 254 (Fig. 47), causing −100 volts to be placed on the cathodes of the seven Write Tubes 498, one of which is shown in Fig. 47 and the details of which are shown in Fig. 47*a*, and on the erase line 500, thus enabling both the Write Tubes and the erase circuits. In addition, a Write Light 502 is turned On.

It has been noted before that a spurious noise pulse may be written in each of the seven tracks on the tape when the Write Tubes 498 are first enabled, since the erase head is located physically ahead of the read-write heads. This noise will be left on the tape at the point where the Write Tubes were turned On. By the same token the presence of noise may also be found at the point where the Write Tubes 498 are turned Off.

Had the tape unit initially been in Backward Status, the internal Read/Write Set signal from the cathode follower 498 (Fig. 45) would have enabled an AND circuit 506 by reason of the presence of the TU Go Forward signal, the Backward Status signal and the cathode of the Stop Delay single shot 454 being positive. The output of the AND circuit 504 would, under these conditions, be directed through the circuit 430 and through the inverter circuit 432 to fire the 10 millisecond single shot multivibrator 434 to produce, by way of cathode follower 436, the signal Changing Delay. This would result in effecting a change in tape status as described hereinbefore.

Had the tape been rewound prior to receipt of the instruction to write, the signal Rewound, which is the output of the key trigger 220 (Fig. 17), by way of a cathode follower 510, would combine with the signal Backward Status, which is the output of the Tape Direction Status trigger 200 (Fig. 15) in an AND circuit 512 located in the tape Motion Control V Unit 242 (Fig. 48) to produce an output which by way of an OR circuit 514 and a cathode follower circuit 516 would turn On (left plate conducting) the Tape Extremes Trigger 518 which is adapted to produce, by way of a cathode follower 520, an internal signal Tape Extremes Status. The internal signal Tape Extremes Status is mixed in an AND circuit 522 in the Tape Motion Control V Unit (Fig. 48) with the signal Starting Delay to permit the output of the AND circuit 522 to fire the 0.3 second single shot multivibrator 524, the signal proceeding to the single shot 524 by way of the inverter 526. The plate output of the single shot 524 will pass via an inverter 528 to a special single shot multivibrator 530 whose details are illustrated in Fig. 37. The signal resulting from the 0.3 second single shot multivibrator 524 passes by way of a cathode follower 530 as the signal Partial EOF Delay.

The signal Partial EOF Delay which is produced and fed to the single shot multivibrator 530, as described, serves to hold this single shot in the abnormal condition. At the end of the 0.3 second single shot time period, the 0.6 second single shot 530 will be released to start its timing period. At the same time, i.e. at the end of the 0.3 second pulse of the single shot 524, the Tape Extremes Trigger 518 will be reset by the fall of the signal Partial EOF Delay. The output signal of the 0.6 second single shot 530, by way of a cathode follower 534, is the signal Not EOF Delay, which will be a negative pulse of 0.9 second duration. This signal, i.e. Not EOF Delay, is directed to an AND circuit 536 which is not concerned with the execution of the write instruction, and will therefore not be dealt with particularly at this point. This signal (Not EOF Delay) is also transmitted to the control buses (Fig. 41) where it suppresses the generation of the signal Start Tape Write by applying a negative pulse to an AND circuit 538 during the 0.9 second delay period, thus preventing an output pulse from the AND circuit 538.

Suppression of the signal Start Tape Write is to insure that the noise pulse written when the tape heads are turned on is moved a sufficient distance from the heads before writing commences, thereby insuring that the spurious noise pulses will not interfere with the reading operation.

When the signal Not EOF Delay returns to its positive value, the AND circuit 538 (Fig. 41), conditioned by the signals TU Connected and Tape Up To Speed, will, by way of an OR circuit 540 and a cathode follower 542, transmit the signal Start Tape Write to the Tape Write Control circuits 250 (Fig. 18) where, if the MQ Register 270 (Fig. 21) has been loaded by a Copy instruction, the writing process will commence. If, however, there is no Copy instruction present, the tape will be stopped and the tape unit will be disconnected as previously explained.

The Tape Write Control circuits 250 (Fig. 18) and the function of loading and writing from data in the MQ Register 270 (Fig. 21) under control of a Copy signal forms no part of this invention and is described in detail in our aforesaid Patent No. 2,850,234.

If no writing on tape is to be performed, the TU Write Disconnect signal, which is the output of the cathode follower 430 in the control buses (Fig. 41) by way of the Tape Write Control circuits 250 (Fig. 18) in the form of the signal TU Write Disconnect Bus, is sent to the Tape Disconnect unit 236 (Fig. 44), where it is one input to an AND circuit 544, wherein, because the TU Connected signal is present, the output by way of a cathode follower 546 will be directed to the OR circuit 370 to produce the signal Disconnect. Furthermore, the signal Write Disconnect will be directed to the Tape Motion Control I Unit 238 (Fig. 45) where it passes through the OR circuit 450 to initiate the signal Stopping Delay, thus physically stopping the tape when the Stopping Delay signal becomes effective in the Tape Motion Control II Unit 240 (Fig. 46) to suppress the signal Go.

By reference to the Tape Motion Control II Unit of Fig. 46 it may be seen that for the writing status it may be seen that although the Go trigger 420 is turned Off at the termination of the Stopping Delay signal, the instruction gate Tape Stopped will not be reopened until the termination of the seven millisecond Stopping Delay signal through an AND circuit 548, which passes its output through the OR circuit 466 and through the cathode follower 468 to operate the Tape Stopped trigger 400. Thus, 5.4 milliseconds are allowed for stopping, during the writing operation, before a new instruction may be accepted. During the process of reading, however, a new instruction may be accepted immediately by virtue of the fact that the Tape Stopped Trigger 400 is turned On through the AND circuit 464, by way of the OR circuit 466 and the cathode follower 468, after 1.6 milliseconds, at the same time that the Go trigger 402 is turned Off. Hence, the AND circuit 464 may be regarded as giving rise to a high speed function in contrast to the AND circuit 546, which gives rise to a relatively low speed function of the Tape Stopped Trigger 400 and the resulting output of the signal Tape Stopped.

*Operation of writing end of file (EOF).*—Upon receipt of a calculator instruction to write an end of file notation upon the tape, a signal Tape Write EOF Select is sent to the tape Selector (Fig. 40). As before, this signal is passed through the OR circuit 350 to result in selection of the proper tape unit. In addition, the signal Tape Write EOF Select (as in the case of writing) is directed to the OR circuit 332 to generate the signal Set TU Write Status Bus, which is passed through the control buses (Fig. 41) as the signal Set TU Write Status and into the Tape Disconnect unit 236 (Figs. 19 and 44), where it enters the AND circuit 482 (Fig. 44). Were the unit in Read Status upon the arrival of the signal Set TU Write Status in the AND circuit 482, and since the signal Select Stopped TU is also present, the AND circuit 482 would pass a signal through the OR circuit, the inverters 372 and 374 and the cathode follower 376 to produce the signal Disconnect.

As with writing, the signal Set TU Write Status enters the Tape Unit Status network (Fig. 43), where it is directed through the AND circuit 484, and since the other conditioning pulses are present on this AND circuit, the AND circuit will transmit a pulse through the cathode follower 490 which is effective to set the Write Status Trigger 366 if it is not already On and to cause the Tape Motion Control I Unit (Fig. 45) to be energized as before by virtue of the Set Write Status Trigger signal which is transmitted from the Tape Unit Status network to the Tape Motion Control I Unit (Fig. 45), where it passes the OR circuit 492, the inverters 494 and 496 and is emitted from the cathode follower 498 as the signal Read/Write Set. The signal Read/Write Set is directed to the AND circuit 440 which, if the signal Forward Status is present (all other conditioning pulses on this AND circuit being present), the signal will be passed through the OR circuit 388, the inverter 390 to fire the single shot multivibrator 392 which, through the cathode follower 394, will generate the signal Starting Delay.

If, however, the tape unit were in Backward Status upon arrival of the Set Write Status Trigger signal, the Set Write Status Trigger signal would be directed through the AND circuit 506, since the Backward Status signal would gate the Set TU Write Status Trigger signal through this AND circuit (all the other conditioning pulses being present) and through the OR circuit 432 and the inverter 433 to fire the single shot multivibrator 434 whose output through the cathode follower 436 is the signal Changing Delay.

In either case, as soon as the tape unit is placed in Forward Status the signal Forward Status is impressed on an AND circuit 548 in the Tape Unit Status network (Fig. 43). And since the stopped tape unit has been selected and the Select Stopped TU signal is also present in the AND circuit 548 together with the signal Write Status and the signal Set TU Write EOF Status, the AND circuit 548 will emit a pulse, by way of a cathode follower 550, to turn On a Write EOF Status Trigger 552. In addition, since it is neither necessary nor desirable to disable the calculator with respect to other input-output units while the Write EOF instruction is being performed, a Disconnect signal is produced by virtue of the AND circuit 548 output Set Write EOF Status Trigger which is transmitted to the Tape Disconnect unit (Fig. 44), wherein the Set Write EOF Status Trigger signal is passed through the OR circuit 370, the inverters 372, 374 and the cathode follower 376 as the signal Disconnect. This signal is used, as before, to free the tape unit from the calculator.

The signal Write EOF Status will be directed to the Tape Motion Control V unit (Fig. 48), where it passes through the OR circuit 514 to turn On (left plate conducting) the Tape Extremes Trigger 518, thus signalling that the tape is in an extreme status. Then, since the tape is in an extreme status, the signal Starting Delay will be gated through the AND circuit 522 and, passing through the inverter 526, will fire the single shot multivibrator 524 causing the 0.3 and the 0.6 delay circuitry to be initiated, as described before.

Thus, it may be seen that the Write EOF instruction has tested to determine whether the unit is in Read Status, and it has set the unit to Write Status, it has set he Tape Exremes Status, started tape motion, and disconnected the tape unit from the calculator.

The unit then proceeds through the 0.9 second Write EOF Delay (the reading heads are turned On and are writing continuous zeros), the end of which is signified by the output of the cathode follower 534 becoming positive to produce the signal Not EOF Delay. Since the tape is up to speed and in Write EOF status at the termination of the 0.9 second delay, the signal Not EOF Delay will be gated through the AND circuit 536, and through a cathode follower 554 to generate the signal End Write EOF.

The End Write EOF signal is transmitted to the Tape Motion Control I Unit (Fig. 45) and to the Tape Unit Status network (Fig. 43). In the Tape Unit Status network, the End Write EOF signal is effective to reset the tape unit to neutral (neither read nor write status), by virtue of passage of the signal through the OR circuit 368 and to the Read Status Trigger 364 and the Write Status Trigger 366, which are reset to the condition shown in Fig. 43. In the Tape Motion Control I Unit (Fig. 45), the End Write EOF signal is passed through the OR circuit 450 and through the inverter 452 to fire the seven millisecond Stopping Delay single shot multivibrator 454 causing an output of the signal Stopping Delay by way of the cathode follower 456. The signal Stopping Delay is directed to the Tape Motion Control II Unit (Fig. 46) where it operates the Tape Stopped Trigger 400 to cause stopping of tape movement as hereinbefore described. It is important to note that at the time the tape unit is reset to neutral, the Write Status Relay is returned to normal and the erase coil and Write Tubes are disabled. At this point another spurious noise pulse may be written in each of the seven tracks of the tape.

The internal signal Stop Delay, which is the result of the input signal Stopping Delay to the Tape Motion Control II Unit (Fig. 46) by way of the inverter 460, the 1.6 millisecond single shot multivibrator 458 and the cathode follower 462, will reset the Go Trigger 402 and also the Tape Up To Speed Trigger 406. While resetting the GO trigger 402 effects stopping, the resetting of the Tape Up To Speed Trigger 406 produces a minus pulse which causes the Write EOF Trigger in the Tape Unit Status network (Fig. 43) to be reset. In this regard it will be noted that the cathode follower 480 (Fig. 46) will emit the signal Tape Up To Speed which is directed to the Tape Unit Status network (Fig. 43) where it is entered into the Write EOF Status Trigger 552. Thus, the tape unit is truly reset to neutral with none of the status triggers remaining on.

*Tape reading operation.*—As in the case of writing, the calculator may issue a reading instruction which, through the I/O Interlock and Class Selector circuitry, is impressed on the Tape Selector unit (Fig. 40) as the signal Tape Read Select. This signal results in the selection of a particular tape unit and in the generation of the signals Set TU Read Status and TU Go Forward. In this regard it will be noted that the signal Tape Read Select (Fig. 40) passes through a cathode follower 556, the OR circuit 340, inverters 558 and 560 and a cathode follower 562 as the output signal Set TU Read Status Bus. Furthermore, the output of the cathode follower 556 is transmitted to the OR circuit 342 and passes through the inverters 476, 478 and the cathode follower 480 as the signal TU Go Forward Bus. Finally, the Tape Read Select signal is also passed through the OR circuit 350 and into the Tape Select network for producing the signal Tape Select which is used to sample the several I/O selection AND circuits 344, etc. as previously described.

The signal Set TU Read Status Bus is transmitted to the control buses (Fig. 41) through which it is passed as the signal Set TU Read Status. This latter signal is transmitted to the Tape Disconnect Unit (Fig. 44) where it tests an AND circuit 564. If the unit is in Write Status, and since the Stopped TU has been selected, the AND circuit 564 will pass a pulse through the OR circuit 370, the inverters 372, 374 and the cathode follower 376, to produce the signal Disconnect which is utilized as hereinbefore described to disconnect the calculator from the tape unit.

If a tape unit is in Read or in neutral status as indicated by the Tape Unit Status network (Fig. 42) the Set TU Read Status signal will be directed through an AND circuit 566 by the presence of the signal Select Stopped TU and by the fact that the tape unit is not in Write Status. The output of the AND circuit 566, which is the signal Set Read Status Trigger, will condition one side of an AND circuit 568 whose other input is the signal Starting Delay in preparation for setting the Read Status Trigger 364.

The signal Set Read Status Trigger is also transmitted to the Tape Motion Control I Unit (Fig. 45) where it passes through the OR circuit 492, inverters 494 and 496 and the cathode follower 498, as the signal Read/Write set. If the tape had initially been in forward status, the TU Go Forward signal would pass through the AND circuit 440, the OR circuit 388 and the inverter 390 to fire the Starting Delay single shot multivibrator 392, thus, by way of the cathode follower 394, producing the signal Starting Delay.

Had the tape unit previously been in Backward Status, the signal Read/Write Set, which is the output of the cathode follower 498 (Fig. 45), would pass through the AND circuit 406 (the other conditions on this AND circuit being fulfilled), and through the OR circuit 430, through the inverter 432, to fire the Changing Delay single shot 434 which, by way of the cathode follower 436, produces the signal Changing Delay. In either case, with the advent of the Starting Delay signal, tape motion would be started as before, and the Read Status Trigger 364 (Fig. 43) would be turned On by coincidence of the signal Starting Delay and the signal Set Read Status Trigger in the AND circuit 568 whose output sets the Read Status Trigger 364.

The output of the Read Status Trigger 364, by way of a cathode follower 568, produces the signal Read Status, and by way of the inverter 570, energizes a Read Light 572. The Read Status output signal enables the information transfer circuits to accept information from the tape. This latter feature is performed in the Tape Information Control-Read circuits (Fig. 49) where the tape inputs are conditioned by the signal Read, and the selected group pulse output is prepared by the conditioning of an AND circuit 580. The Tape Information Control-Read circuits are the subject matter of the aforementioned patent of Bartelt and Femmer, and need not be described herein other than to the extent that the signal Group Pulses emitted therefrom must be used in the EOR Sense unit, as to be described hereinafter.

Had the tape been previously set to a Tape Extremes position (preceding the instruction to rewind), the AND circuit 522 in the Tape Motion Control V Unit (Fig. 48) would allow the Starting Delay signal to fire the 0.3 second single shot multivibrator 524. The negative cathode output of the single shot 524 passes through the cathode follower 532 as the signal Not Partial EOF Delay. This signal is directed to an AND circuit 582 in the Tape Information Control-Read Unit (Fig. 49) and also to the EOR Sense Unit (Fig. 50), where the signal Not Partial EOF Delay is an input to an AND circuit 584 to insure that the spurious noise pulses written at the time the writing head was turned On, are not read. To recapitulate—the instruction to read has resulted in the test for Write Status of the unit, started tape motion, set the Reading Satus Trigger, and caused the Partial EOF Delay circuits to be activated, if necessary.

Under the conditions just described, the tape is now in motion through the read-write heads which are searching for information. Any information read from the tape will now energize the EOR Sense circuit (Fig. 50). Each Group Pulse from tape is passed into the AND circuit 584 by the concurrent presence of the signals Not Partial EOF Delay and Read Status. A pulse passing through the AND circuit 584, by way of an inverter 586, effectively fires a 32 microsecond Group Pulse Stretching single shot multivibrator 588. It may be seen by reference to Fig. 50 that each 32 microsecond Stretched Group Pulse passing, by way of a cathode follower 590 and an inverter 592, will swing a 400 microsecond single shot multivibrator 594 to its abnormal condition (left plate conducting). The normal repetition rate of the group pulses is 132 microseconds. Therefore, so long as group pulses are being received from the tape, the 400 microsecond single shot multivibrator 594 will be held in the abnormal condition. When the physical end of a record is reached, so that no tape information is read for a period of 400 microseconds, the single shot multivibrator 594 will complete its timing. Upon completion of its timing, the single shot 594 by way of an inverter 596, will fire a 50 microsecond End Of Record single shot multivibrator 598.

Upon reaching the end of a record and the production of the signal EOR as a result of the operation of the single shot 598 and its output, by way of a cathode follower 600, two functions are performed by virtue of the fact that the signal EOR is transmitted to the Tape Motion Control I Unit (Fig. 45) and the control buses (Fig. 41): (1) In the Tape Motion Control I Unit (Fig. 45) the Tape Stopped signal is initiated by the EOR signal being passed through the OR circuit 450 which, by way of the inverter 452, fires the seven microsecond single shot multivibrator 454 to produce, by way of the cathode follower 456, the signal Stopping Delay; (2) In the control buses (Fig. 41), the signal Tape EOR (if the tape unit is still conected and the reading process is still being continued and the tape has not been disconnected from the calculator) will be generated by virtue of the fact that the EOR signal is passed through an AND circuit 602, and OR circuit 604 and a cathode follower 606, as the signal Tape EOR. The Tape EOR signal is transmitted to the calculator to cause the tape unit to be disconnected from the calculator. This latter function, however, is not part of this invention, and the course of the Tape EOR signal will not be traced in detail beyond its generation. It may be stated as a maxim that once information is received from the tape, a discontinuity of such information flow for 400 microseconds will signify the end of a record, at which time the tape will be caused to stop.

The signal Stretched Group Pulses which is the output of the cathode follower (Fig. 50) is transmitted to the EOF Sense circuits (Fig. 51) where it will turn On a trigger 608. Turning on of trigger 608 will, by way of cathode follower 610 and an inverter 612, cause a 30 millisecond single shot multivibrator 614 to be held in the abnormal condition. Every time the tape is started upon generation of the Go signal, the Tape Stopped signal will return to a negative level. The negative pulse influencing the trigger 608 (Fig. 51) will cause this trigger to be turned Off (right plate conducting), thus freeing the 30 millisecond single short 614. If no information is received from tape (Stretched Group Pulses) within 30 milliseconds, a 50 millisecond single short multivibrator 616 will be fired and its impulse will be directed to an And circuit 618 by way of a cathode follower 620 where, together with the Read Status signal, it will cause the emission of a pulse through a cathode follower 622 which is the signal EOF (end of file). The EOF signal is transmitted to the Tape Motion Control I Unit (Fig. 45), and also to the control buses (Fig. 41). In the Tape Motion Control I Unit (Fig. 45), the EOF signal is passed through the OR circuit 450, through the inverter 452 and into the single short multivibrator 454 to cause an output through the cathode follower 456 of the signal Stopping Delay. The signal Stopping Delay is used, as before, to cause the tape to stop.

In the control buses (Fig. 41), the signal EOF is passed into an AND circuit 622 which is gated by the signal TU connected to produce the signal Tape EOF by way of the OR circuit 624 and the cathode follower 626. The Tape EOF signal is transmitted to the calculator where it causes the calculator to disconnect itself from the tape unit. It may be seen, therefore, that once information has been received and the tape is again called upon to start, if the taper is still in the Read Status after 30 milliseconds during which no information is received from the tape, an EOF signal will be generated which will always stop tape motion and cause the tape unit to be disconnected from the calculator.

*Operation of reading tape backward.*—If the calculator issues the instruction Tape Read Backward Select, this signal will be transmitted to the Tape Selector (Fig. 40) as before. Again this instruction will cause the proper tape unit to be selected by its passage through the OR circuit 350 (Fig. 40) and into the Tape Select network. The signal Tape Read Backward Select will also result in the generation of the signal Set TU Read Status Bus by virtue of the fact that the Tape Read Select signal output of the cathode follower 628 passes through the OR circuit 340, the inverters 558 and 560 and the cathode follower 562 as the signal Set TU Read Status Bus. Furthermore, the signal Tape Read Backward Select will generate the signal TU Read Backward Bus, since the output of the cathode follower 628 is also fed through inverters 630, 632 and through a cathode follower 634 as the signal TU Read Backward Bus.

The signal Set TU Read Status Bus, as in the case of reading, causes the tape status to be interrogated, and the signal Set TU Read Status to be generated and emitted from the control buses (Fig. 41). At this point it may be noted that in the Tape Motion Control I Unit (Fig. 45), the signal Set Read Status Trigger in the form of the internal signal Read/Write Set, generated by way of the OR circuit 492, the inverters 494, 496 and the cathode follower 498, is one of the inputs to an AND circuit 636 whose other input is the signal TU Read Backward. The output of the AND circuit 336 passes through the OR circuit 380 and the cathode follower circuit 382 to constitute an input to the AND circuits 384 and 386.

Had the tape previously been in the Forward Status, AND circuit 386 would be conditioned to emit a pulse which, by way of the OR circuit 430, the inverter 432, the single shot multivibrator 434 and the cathode follower 436, is the signal Changing Delay. If, however, the tape had originally been in the Backward Status, the AND circuit 384 would be conditioned to generate the Starting Delay signal by passing the output of the cathode follower 382 into the OR circuit 388, the inverter 390, the single shot multivibrator 392 and the cathode follower 394. As before, the signal Changing Delay of the Tape Motion Control I unit (Fig. 45) is directed to the Tape Motion Control VI unit (Fig. 15) where, had the tape unit been in Forward Status, the signal Changing Delay would cause the energization of the Backward Bias Relay *146a*.

In the case supposed, however, wherein the tape unit is in Backward Status, upon receipt of the instruction to read backward, the signal Starting Delay is sent to the Tape Unit Status network (Fig. 43) to test the Read Status Trigger 364, to the Tape Motion Control II Unit (Fig. 46) and to the Tape Motion Control V Unit (Fig. 48), in all of which the function of the signal is the same as heretofore described in respect to reading in a forward direction. Other than the difference in the direction of tape motion, there is no difference between reading in a forward direction and reading tape in a backward direction, since the end of record and end of file sensing circuits and the information handling circuits function in exactly the same manner.

*Miscellaneous electronic circuits*

In the Tape Selector circuits (Fig. 40), it is to be noted that any time an instruction input to the OR circuit 350 assumes a negative level, the inverted output from the cathode follower 354 will cause the 160 microsecond single shot multivibrator 358 to fire. This signal is then applied to the OR circuit 362, thus operating the inverter 364 to force the output signal Tape Select from the cathode follower 366 to assume a negative level for the duration of 160 microseconds regardless of whether an instruction has arrived or not. The reason for this suppresion between instructions is to prevent the attempted execution of two instructions when an instruction gate is open, which could possibly occur due to instructions such as Rewind and Write EOF being disconnected immediately (assuming the proper conditions to exist).

In the Tape Motion Control II Unit (Fig. 46) the Write EOF Status signal is entered into the OR circuit 466 because of the fact that if the instruction signals should include the signal Write EOF at the end of this instruction the signal End Write EOF intiates the signal Stopping Delay and resets the tape to neutral. If for some reason the signal Stopping Delay should assume its upper level before the tape is taken out of the Write status, at the time Write Status fails to a negative level, the Tape Stopped would be turned On through the AND circuit 546 and the OR circuit 466. This will allow a new instruction to be received.

Then when Stopping Delay signal falls, the tape will be in neutral status and the signal Tape Stopped will again be turned On through the AND circuit 464 and the OR circuit 466. This will happen without regard to what the tape is doing and a new instruction may be received and will be executed. To prevent this logical error, the signal Write EOF Status is used to overlap any sliver conditions. Since the Write EOF Status Trigger is rest by the signal Tape Up To Speed, as discussed above, it will be the fall of the signal Write EOF Status which turns On the Tape Stopped Trigger 400, thus permitting the next instruction to be received properly.

It has been seen that the tape can accept instructions only serially and will not accept a new instruction until it has completed executing a prior instruction. It is also important to note that the tape controls never actually know where the tape is in response to instructions, since no physical indication of the action of the tape (other than in the extreme position) is manifest to the tape controls. In other words, tape direction and position is controlled by knowledge of a previous tape status and the operation of a present command together with the timing functions provided to insure the full and proper execution of any directions given by the calculator.

The principles of the invention have been described and illustrated in a single operative system for the purpose of teaching those skilled in the art how the invention may be performed. Changes in the components, units and assemblies will appeal to those skilled in the art, and it is contemplated that such changes may be employed, but yet fall within the spirit and scope of the claims that are to follow.

What is claimed is:

1. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means for selecting said input-output unit for operation only if the same is stopped, a bi-stable trigger in said unit to indicate when the unit is conditioned for reading tape, a second bi-stable trigger in said unit to indicate when the unit is conditioned for writing on tape, a third bi-stable trigger in said unit for indicating the condition of said forward and backward drive control circuits, a coincidence switching circuit in said unit for accepting calculator originated signals to write on tape, to read from tape while the tape is being driven either forward or backward, to rewind tape, or to write an end of record file indication on tape, connections between said triggers and said coincidence switching circuit whereby said condition indications are tested upon the receipt in said circuits of any of said calculator originated signals, a single shot multivibrator connected to accept output signals from said coincidence circuit for producing a starting delay signal whenever said unit is conditioned to respond to a calculator originated signal, a second single shot multivibrator connected to accept output signals from said coincidence circuit for producing a changing delay signal when said unit is unable to respond to a calculator originated signal, a clutch coil in said tape drive control circuits responsive to a starting delay signal to energize said drive for supplying tape to said heads, and means responsive to a changing delay signal to condition the unit for reading or writing and to condition the tape drive control means for forward or backward drive as required for the performance of said calculator originated signals.

2. In a data processing system which includes a calculator and a magnetic tape record input-output unit and wherein the input-output unit comprises tape reading and writing heads, an electrically controlled tape drive for supplying tape to said heads, a forward tape drive control and backward tape drive control for determining the direction of tape movement through said heads; means for controlling operation of said input-output unit comprising means under control of said calculator for electrically connecting said input-output unit to said calculator for operation, a bi-stable trigger in said unit adapted to emit a signal when the unit is conditioned for reading from tape, means in said unit for accepting a calculator originated signal to write on tape, and a coincidence switch adapted to receive a signal from said calculator originated signal receiving means and a signal from said bi-stable trigger and thereupon emit a signal to disconnect said unit from said calculator.

3. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, a first bi-stable trigger in said unit adapted to emit a signal when the unit is conditioned for reading from tape, means in said unit for accepting a calculator originated signal to write on tape, a second bi-stable trigger in said unit adapted to emit a signal when the unit is conditioned to write on tape, a coincidence switch adapted to receive a signal from said calculator originated signal receiving means and a signal indicating the condition of said first bi-stable trigger and thereupon emit a control signal effective to operate said second bi-stable trigger, and means responsive to a signal output of said second bi-stable trigger for controlling said writing heads.

4. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, a first bi-stable trigger in said unit adapted to emit a signal when the unit is conditioned for reading from tape, means in said unit for accepting a calculator originated signal to write on tape, a second bi-stable trigger in said unit adapted to emit a signal when the unit is conditioned to write on tape, a coincidence switch adapted to receive a signal from said calculator originated signal receiving means and a signal indicating the condition of said first bi-stable trigger and thereupon emit a control signal effective to operate said second bi-stable trigger, and a relay responsive to a signal output of said second bi-stable trigger for controlling said writing heads.

5. In a data processing system which includes a calculator and a magnetic tape record input-output unit and wherein the input-output unit comprises tape reading and writing heads, an electrically controlled tape drive for supplying tape to said heads, a forward tape drive control and backward tape drive control for determining the direction of tape movement through said heads; means for controlling operation of said input-output unit comprising means under control of said calculator for electrically connecting said input-output unit to said calculator for operation, a bi-stable trigger in said unit adapted to transmit a signal when said backward tape drive control is conditioned for operation, means in said unit for accepting a calculator originated signal to write on tape, a second bi-stable trigger in said unit adapted to emit a signal when the unit is conditioned to write on tape, a coincidence switch adapted to receive a signal from said calculator originated signal receiving means and from said bi-stable triggers and thereupon emit a signal adapted to turn said first bi-stable trigger to its other stable state, and a connection between said first bi-stable trigger and said forward tape drive control adapted to render operative said control in response to a signal output of said first bi-stable trigger when the same is turned to its other stable state.

6. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, a bi-stable trigger in said unit adapted to transmit a signal when said backward tape drive control is conditioned for operation, means in said unit for accepting a calculator originated signal to write on tape, a second bi-stable trigger in said unit adapted to emit a signal when the unit is conditioned to write on tape, a coincidence switch adapted to receive a signal from said calculator originated signal receiving means and from said bi-stable triggers and thereupon emit a signal adapted to turn said first bi-stable trigger to its other stable state, a relay in said forward tape drive control circuit, and a connection between said relay and said first bi-stable trigger whereby said relay is energized by a signal output of said first bi-stable trigger when the same is turned to its other stable state.

7. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, a bi-stable trigger in said unit adapted to emit a signal when the unit is conditioned for backward tape drive, means in said unit for accepting a calculator originated signal to write on tape, a second bi-stable trigger in said unit adapted to emit a signal when the unit is conditioned to write on tape, a coincidence switch adapted to receive a signal from said calculator originated signal receiving means and from said bi-stable triggers and emit thereupon a signal adapted to turn said first bi-stable trigger to its other stable state, a signal output from said second bi-stable trigger when turned to its other stable state, and a connection from said signal output to said forward tape drive control circuit and said backward tape drive control circuit whereby said backward drive control circuit is deenergized and said forward drive control circuit is energized.

8. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, a bi-stable trigger in said unit adapted to emit a signal when the unit is conditioned for backward tape drive, means in said unit for accepting a calculator originated signal to write on tape, a second bi-stable trigger in said unit adapted to emit a signal when the unit is conditioned to write on tape, a backward drive relay in said backward tape drive control circuit adapted to control drive of tape in a backward direction, a forward drive relay in said forward tape drive control circuit adapted to control tape in a forward direction, a coincidence switch adapted to receive a signal from said calculator originated signal receiving means and from said bi-stable triggers and emit thereupon a signal adapted to turn said first bi-stable trigger to its other stable state, a signal output from said second bi-stable trigger when turned to its other stable state, and a connection from said signal output to said relays whereby said backward drive relay is deenergized and said forward drive relay is energized.

9. In a data processing system which includes a calculator and a magnetic tape record input-output unit and wherein the input-output unit comprises tape reading and writing heads, an electrically controlled tape drive for supplying tape to said heads, a forward tape drive control and a backward tape drive control for determining the direction of tape movement through said heads; means for controlling the operation of said input-output unit comprising means under control of said said calculator for electrically connecting said input-output unit to said calculator for operation, a bi-stable trigger for producing in one of its stable states a signal indicating that said unit is conditioned to drive tape in a forward direction and in its other stable state a signal indicating that said unit is conditioned to drive tape in a backward direction, means in said unit for accepting a calculator originated signal to rewind tape, a coincidence switch to receive the rewind signal output from said rewind signal accepting means and a signal from said bi-stable trigger indicating the tape drive status of said unit, a single shot multivibrator responsive to the output of said coincidence switch, and means responsive to the signal output of said multivibrator to reverse the tape drive status of said tape drive controls.

10. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling the operation of said input-output unit comprising means for selecting said input-output unit for operation, a bi-stable trigger for producing a signal indicating the status of said forward tape drive control, means in said unit for accepting a calculator originated signal to rewind tape, a coincidence switch to receive the rewind signal output from said rewind signal accepting means and a signal from said bi-stable trigger indicating forward status, a backward drive control relay in said backward tape drive control circuit, a forward drive control relay in said forward tape drive control circuit, a single shot multivibrator responsive to the output of said coincidence switch, and means responsive to the signal output of said multivibrator to disable said forward drive control relay and condition said backward drive control relay for operation.

11. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling the operation of said input-output unit comprising means under control of said calculator for electrically connecting said input-output unit for operation, a bi-stable trigger for producing a signal indicating the status of said backward tape drive control circuit, means in said unit for accepting a calculator originated signal to rewind tape, a coincidence switch adapted to receive the rewind signal output from said rewind signal accepting means and a signal from said bi-stable trigger indicating backward status, a single shot multivibrator responsive to the output of said coincidence switch, and means responsive to the signal output of said multivibrator to condition said backward drive control circuit for operation.

12. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling the operation of said input-output unit comprising means under control of said calculator for electrically connecting said input-output unit for operation, a bi-stable trigger for producing a signal indicating the status of said backward tape drive control, means in said unit for accepting a calculator originated signal to rewind tape, a coincidence switch adapted to receive the rewind signal output from said rewind signal accepting means and a signal from said bi-stable trigger indicating backward status, a single shot multivibrator responsive to the output of said coincidence switch, and a relay in said backward tape drive control circuit responsive to the signal output of said multivibrator to condition said backward drive control for operation.

13. In a data processing system which includes a calculator and a magnetic tape record input-output unit and wherein the input-output unit comprises tape reading and writing heads, an electrically controlled tape drive for supplying tape to said heads, a forward tape drive control circuit, and a backward tape drive control circuit for determining the direction of tape movement through said heads; means for controlling the operation of said input-output unit comprising means for selecting said input-output unit for operation, a bi-stable trigger for producing a signal indicating the status of said forward tape drive control circuit, means in said unit for accepting a calculator originated signal to rewind tape, a coincidence switch to receive the rewind signal output from said rewind signal accepting means and a signal from said bi-stable trigger indicating forward status, a single shot multivibrator responsive to the signal output of said coincidence switch, and means responsive to the signal output of said single shot multivibrator to disable said forward drive control circuit and condition said backward drive control circuit for operation.

14. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling the operation of said input-output unit comprising means for selecting said input-output unit for operation, a bi-stable trigger for producing a signal indicating the status of said forward tape drive control, means in said unit for accepting a calculator originated signal to rewind tape, a coincidence switch to receive the rewind signal output from said rewind signal accepting means and a signal from said bi-stable trigger indicating forward status, a single shot multivibrator responsive to the signal output of said coincidence switch, and relays in said tape drive control circuits responsive to the signal output of said single shot multivibrator to disable said forward drive control circuit and condition said backward drive control circuit for operation.

15. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, a bi-stable trigger in said unit for indicating that said unit is conditioned to write on tape, means in said unit for accepting a calculator originated signal to read tape, and a coincidence switch adapted to receive therein a signal from said calculator originated signal accepting means and a signal from said bi-stable trigger indicating that said unit is conditioned to write on tape and emit a signal to said calculator to disconnect said unit therefrom.

16. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, a bi-stable trigger in said unit for indicating that said unit is conditioned to drive tape in a backward direction, means in said unit for accepting a calculator originated signal to read tape, a coincidence switch adapted to receive therein a signal from said calculator originated signal accepting means and a signal from said bi-stable trigger indicating that said unit is conditioned to drive tape in a backward direction and emit a signal, a connection between the signal output of said coincidence switch and said bi-stable trigger whereby the status of said trigger is reversed, means responsive to the reversal of said trigger to disable said backward tape drive control circuit, and means also responsive to the reversal of said trigger to condition said forward tape drive control circuit for operation.

17. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, a bi-stable trigger in said unit for indicating that said unit is conditioned to drive tape in a backward direction, means in said unit for accepting a calculator originated signal to read tape, a coincidence switch adapted to receive therein a signal from said calculator originated signal accepting means and a signal from said bi-stable trigger indicating that said unit is conditioned to drive tape in a backward direction and emit a signal, a connection between the signal output of said coincidence switch and said bi-stable trigger whereby the status of said trigger is reversed, a coil bridging said tape drive control circuits, means responsive to the reversal of said trigger to deenergize said backward tape drive control circuit, and means also responsive to the reversal of said trigger to energize said forward tape drive control circuit whereby the direction of current flow through said coil is reversed and said unit is conditioned to drive tape in a forward direction.

18. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, a bi-stable trigger in said unit for indicating that said unit is conditioned to drive tape in a backward direction, means in said unit for accepting a calculator originated signal to read tape, a coincidence switch adapted to receive therein a signal from said calculator originated signal accepting means and a signal from said bi-stable trigger indicating that said unit is conditioned to drive tape in a backward direction and to emit a signal, a connection between the signal output of said coincidence switch and said bi-stable trigger whereby the status of said trigger is reversed, a forward drive control relay in said forward tape drive control circuit, a backward drive control relay in said backward tape drive control circuit, and connections between said bi-stable trigger and said relays whereby said backward drive control relay is deenergized and said forward drive control relay is energized by the signal emitted from said bi-stable trigger.

19. In a data processing system which includes a calculator and a magnetic tape record input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, a bi-stable trigger in said unit for indicating that said unit is conditioned to drive tape in a backward direction, means in said unit for accepting a calculator originated signal to read tape, a coincidence switch adapted to receive therein a signal from said calculator originated signal accepting means and a signal from said bi-stable trigger indicating that said unit is conditioned to drive tape in a backward direciton and to emit a signal, a connection between the signal output of said coincidence switch and said bi-stable trigger whereby the status of said trigger is reversed, a forward drive control relay in said forward tape drive control circuit, a backward drive control relay in said backward tape drive control circuit, a clutch coil under the control of said relays, and connections between said bi-stable trigger and said relays whereby said backward drive control relay is deenergized and said forward drive control relay is energized by the signal emitted from said bi-stable trigger.

20. In a data processing system which includes a calculator and a magnetic tape record input-output unit and wherein the input-output unit comprising tape reading and writing heads, and electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said input-output unit to said calculator for operation, means for accepting a calculator originated signal to read tape, means responsive to a signal to read tape adapted to energize said forward tape drive control circuit, a coincidence switch to detect the reading of data from tape, a multivibrator responsive to the output of said coincidence switch, and means responsive to said multivibrator device for deenergizing said forward tape drive control circuit.

21. In a data processing system which includes a calculator and a magnetic tape record input-output unit, and wherein the input-output unit comprises tape reading and writing heads, and electrically controlled tape drive for supplying tape to said heads, a forward tape drive control and a backward tape drive control for determining the direction of tape movement through said heads; means for controlling operation of said input-output unit comprising means under control of said calculator for electrically connecting said input-output unit to said calculator for operation, a bi-stable trigger for indicating when said unit is conditioned for reading from tape, a multivibrator responsive to the reading of data from tape and adapted to emit a signal indicating the end of a file of tape data upon failure to receive data from tape, and a coincidence switch adapted to receive an end of file signal from said multivibrator and a signal from said bi-stable trigger indicating that the unit is conditioned to read from tape, said coincidence switch having a signal output indicating to said calculator that said unit is to be disconnected therefrom.

22. In a data processing system which includes a calculator and a magnetic tape input-output unit, and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under the control of said calculator for electrically connecting said input-output unit to said calculator for operation, a bi-stable trigger in said unit adapted to indicate that said unit is conditioned to drive tape in a forward direction, means in said unit for accepting a calculator originated signal to read tape while the same is being driven in a backward direction through said heads, a coincidence switch in said unit adapted to receive from said means a signal that tape is to be read while the same is being driven in a backward direction through said heads and a signal output from said bi-stable trigger that said unit is conditioned to drive tape in a forward direction and emit a signal therefrom, a connection between said last named coincidence switch and said bi-stable trigger to reverse the stable state of said trigger when the last named coincidence switch emits a signal, and connections between said trigger and said forward and backward tape drive control circuits whereby said forward tape drive control circuit is deenergized and said backward tape drive control circuit is energized when the stable state of said trigger is reversed.

23. In a data processing system which includes a calculator and a magnetic tape input-output unit, and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under the control of said calculator for electrically connecting said input-output unit to said calculator for operation, a bi-stable trigger in said unit adapted to indicate that said unit is conditioned to drive tape in a forward direction, means in said unit for accepting a calculator originated signal to read tape while the same is being driven in a backward direction through said heads, a coincidence switch in said unit adapted to receive from said means a signal that tape is to be read while the said is being driven in a backward direction through said heads and a signal output from said bi-stable trigger that said unit is conditioned to drive tape in a forward direction and emit a signal therefrom, a connection between said last named coincidence switch and said bi-stable trigger to reverse the stable state of said trigger when the last named coincidence switch emits a signal, a backward drive control relay and a forward drive control relay in said drive control circuits, and connections between said trigger and said control relays whereby said forward drive control relay is deenergized and said backward drive control relay is energized when the stable state of said trigger is reversed.

24. In a data processing system which includes a calculator and a magnetic tape input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said unit to said calculator for operation, a bi-stable trigger in said unit adapted to indicate when said backward tape drive control circuit is conditioned for operation, a coincidence switch in said unit for accepting a calculator originated signal to read tape while the same is being driven in a backward direction through said heads, a second coincidence switch connected to the output of said first coincidence switch and to said bi-stable trigger adapted to emit a starting signal when signals are received from said first coincidence switch and from said trigger, and means responsive to the output of said second coincidence switch adapted to energize said unit for backward drive of tape therein.

25. In a data processing system which includes a calculator and a magnetic tape input-output unit and wherein the input-output unit comprises tape reading and writing heads, an electrically controlled tape drive for supplying tape to said heads, a forward tape drive control circuit and a backward tape drive control circuit for determining the direction of tape movement through said heads; means for controlling operation of said input-output unit comprising means under control of said calculator for electrically connecting said unit to said calculator for operation, a bi-stable trigger in said unit adapted to indicate when said backward tape drive control circuit is conditioned for operation, a coincidence switch in said unit for accepting a calculator originated signal to read tape while the same is being driven in a backward direction through said heads, a second coincidence switch connected to the output of said first coincidence switch and to said bi-stable trigger adapted to emit a starting signal when signals are received from said first coincidence switch and from said trigger, and a magnetic clutch coil responsive to the output of said second coincidence switch adapted to energize said unit for backward drive of tape therein.

References Cited in the file of this patent

UNITED STATES PATENTS

| | | |
|---|---|---|
| 2,335,277 | Heller | Nov. 30, 1943 |
| 2,782,398 | West | Feb. 19, 1957 |
| 2,797,862 | Andrews | July 2, 1957 |

FOREIGN PATENTS

| | | |
|---|---|---|
| 144,676 | Australia | Jan. 7, 1952 |

OTHER REFERENCES

Publication: Review of Input and Output Equip. used in Computing Systems, AIEE-IRE-ACM Computer Conf., March 1953, pages 31–36, 44–46.

Publication: The Uniservo-Tape Reader and Recorder, AIEE-IRE-ACM Computer Conf., March 1953, pages 47–53.

Publication: The Raydac System and Its External Memory, AIEE-IRE-ACM Computer Conf., March 1953, pages 63–80.